United States Patent
Younggren et al.

(10) Patent No.: US 9,322,461 B2
(45) Date of Patent: Apr. 26, 2016

(54) CONTINUOUSLY VARIABLE TRANSMISSION WITH INPUT/OUTPUT PLANETARY RATIO ASSEMBLY

(71) Applicant: TEAM Industries, Inc., Bagley, MN (US)

(72) Inventors: Bruce H. Younggren, Bemidji, MN (US); John E. Hamrin, Bemidji, MN (US); Joel Dunlap, Bemidji, MN (US)

(73) Assignee: TEAM Industries, Inc., Bagley, MN (US)

(*) Notice: Subject to any disclaimer, the term of this patent is extended or adjusted under 35 U.S.C. 154(b) by 540 days.

(21) Appl. No.: 13/826,896

(22) Filed: Mar. 14, 2013

(65) Prior Publication Data

US 2014/0274551 A1 Sep. 18, 2014

(51) Int. Cl.
 *F16H 15/52* (2006.01)
(52) U.S. Cl.
 CPC ........................ *F16H 15/52* (2013.01)
(58) Field of Classification Search
 CPC ........ F16H 15/52; F16H 15/50; F16H 15/503
 See application file for complete search history.

(56) References Cited

U.S. PATENT DOCUMENTS

| | | | |
|---|---|---|---|
| 2,526,435 A | 10/1950 | Teigman | |
| 2,727,396 A | 12/1955 | Haugwitz | |
| 4,270,415 A | 6/1981 | Dickinson et al. | |
| 4,345,486 A | 8/1982 | Olesen | |
| 4,391,156 A | 7/1983 | Tibbals, Jr. | |
| 6,120,399 A | 9/2000 | Okeson et al. | |
| 6,322,475 B2 | 11/2001 | Miller | |
| 6,569,043 B2 | 5/2003 | Younggren et al. | |
| 6,733,406 B2 | 5/2004 | Kitai et al. | |
| 6,813,553 B2 | 11/2004 | Nakamura et al. | |
| 7,074,154 B2 | 7/2006 | Miller | |
| 7,204,777 B2 | 4/2007 | Miller et al. | |
| 7,581,467 B2 | 9/2009 | Peterman et al. | |
| 7,632,203 B2 * | 12/2009 | Miller ...................... | B60K 6/36 475/149 |
| 7,727,106 B2 | 6/2010 | Maheu et al. | |
| 7,762,919 B2 | 7/2010 | Smithson et al. | |

(Continued)

FOREIGN PATENT DOCUMENTS

WO    WO 02/088573 A2    11/2002

OTHER PUBLICATIONS

Model N360 NuVinci® CVP, Bicycle Drivetrain. Fallbrook Technologies Inc. 2010, 2 pages.

(Continued)

*Primary Examiner* — David M Fenstermacher
(74) *Attorney, Agent, or Firm* — IPLM Group, P.A.

(57) ABSTRACT

A continuously variable transmission is provided. The continuously variable transmission includes an input assembly, an output assembly, an input/output planetary ratio assembly and a torque feedback assembly. The input/output planetary ratio assembly is configured and arranged to set an input to output speed ratio. The input/output ratio assembly has a first portion that is in rotational communication with the input assembly and a second portion that is in rotational communication with the output assembly. The torque feedback control assembly provides an axial load force in response to a torque of a load coupled to the output assembly. Moreover, the torque feedback control assembly is coupled to provide torque feedback to the input/output planetary ratio assembly to at least in part control the input to output speed ratio of the input/output planetary ratio assembly.

20 Claims, 50 Drawing Sheets

(56) References Cited

U.S. PATENT DOCUMENTS

| | | | |
|---|---|---|---|
| 7,762,920 B2 | 7/2010 | Smithson et al. | |
| 7,770,674 B2 | 8/2010 | Miles et al. | |
| 7,963,880 B2 | 6/2011 | Smithson et al. | |
| 7,976,426 B2 | 7/2011 | Smithson et al. | |
| 8,087,482 B2 | 1/2012 | Miles et al. | |
| 8,313,405 B2* | 11/2012 | Bazyn | F16H 15/52 475/185 |
| 8,360,917 B2 | 1/2013 | Nichols et al. | |
| 8,496,551 B2 | 7/2013 | Mueller et al. | |
| 8,585,528 B2 | 11/2013 | Carter et al. | |
| 8,668,623 B2 | 3/2014 | Vuksa et al. | |
| 8,900,085 B2* | 12/2014 | Pohl | F16H 15/50 475/189 |
| 2002/0123400 A1 | 9/2002 | Younggren et al. | |
| 2004/0171452 A1 | 9/2004 | Miller et al. | |
| 2004/0224808 A1* | 11/2004 | Miller | B62D 5/0409 475/21 |
| 2005/0117983 A1* | 6/2005 | Miller | B62M 9/08 408/124 |
| 2007/0270265 A1 | 11/2007 | Miller et al. | |
| 2007/0270267 A1 | 11/2007 | Miller et al. | |
| 2007/0270272 A1 | 11/2007 | Miller et al. | |
| 2007/0270278 A1 | 11/2007 | Miller et al. | |
| 2009/0164076 A1 | 6/2009 | Vasiliotis et al. | |
| 2010/0056322 A1* | 3/2010 | Thomassy | F16H 15/28 476/39 |
| 2010/0093480 A1 | 4/2010 | Pohl et al. | |
| 2010/0267510 A1 | 10/2010 | Nichols et al. | |
| 2010/0314184 A1 | 12/2010 | Stenberg et al. | |
| 2011/0034284 A1 | 2/2011 | Pohl et al. | |
| 2011/0088503 A1 | 4/2011 | Armstrong et al. | |
| 2011/0092325 A1 | 4/2011 | Vuksa et al. | |
| 2011/0172050 A1 | 7/2011 | Nichols et al. | |
| 2011/0218072 A1* | 9/2011 | Lohr | F16H 15/503 475/185 |
| 2011/0220453 A1 | 9/2011 | Mueller et al. | |
| 2011/0230297 A1* | 9/2011 | Shiina | F16H 15/52 475/196 |
| 2012/0115667 A1 | 5/2012 | Lohr et al. | |
| 2012/0238386 A1 | 9/2012 | Pohl et al. | |

OTHER PUBLICATIONS

NuVinci Deltaseries Supercharger Drive. Fallbrook Technologies Inc. 2012, 2 pages.

NuVinci® N360 CVP Drivetrain Owner's Manual. Fallbrook Technologies Inc. Jul. 2010, 6 pages.

NuVinci® Parts Catalog, NuVinci N360 and NuVinci Harmony Parts Catalog—*B35-N360-12* Fallbrook Technologies Inc. 2012, 11 pages.

NuVinci® N360 Technical Manual. *B35-N360-02* Fallbrook Technologies Inc. 2012, 15 pages.

NuVinci® N360 Test Summary. Fallbrook Technologies Inc. 2010, 1 page.

NuVinci® Range and Gear Inch Comparison, NuVinci N360. Date unknown. 1 page.

Pohl, Brad, et al. "Configuration Analysis of a Spherical Traction Drive CVT/IVT". Fallbrook Technologies. Date unknown, 6 pages.

Non-Final Office Action of Corresponding U.S. Appl. No. 13/828,902 mailed on Feb. 26, 2014.

Non-Final Office Action of Corresponding U.S. Appl. No. 13/804,287 mailed on Mar. 13, 2014.

Final Office Action, U.S. Appl. No. 13/804,287 mailed Jun. 30, 2014.

Notice of Allowance (PTO-892) Notice of References cited. U.S. Appl. No. 13/828,046, mailed Jun. 16, 2014, 9 pages.

Search Report/ Written Opinion of International Application Serial No. PCT/US2014/021849 mailed Jun. 4, 2014.

Search Report/ Written Opinion of International Application Serial No. PCT/US2014/021861 mailed Jun. 4, 2014.

* cited by examiner

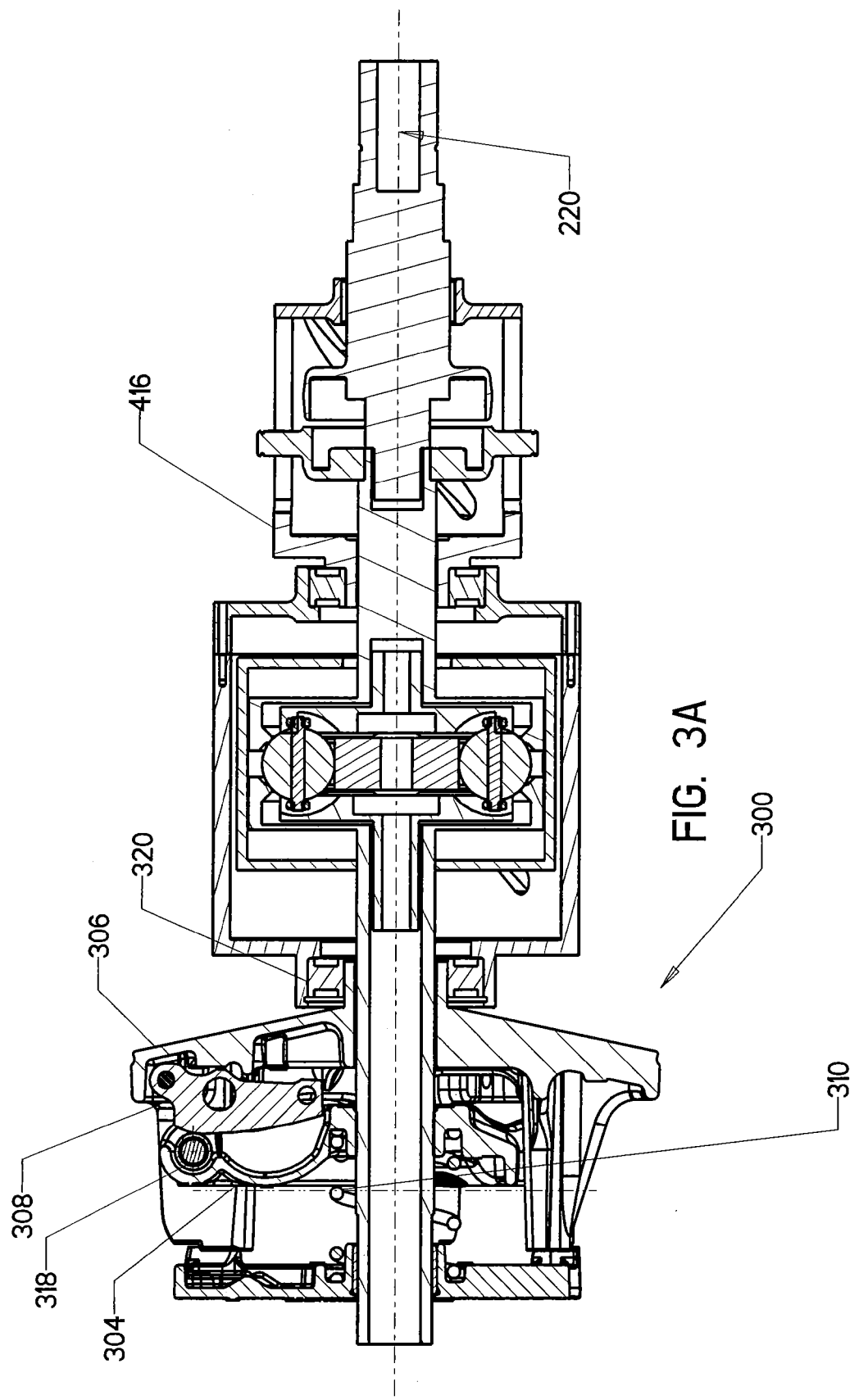

US 9,322,461 B2

CONTINUOUSLY VARIABLE TRANSMISSION WITH INPUT/OUTPUT PLANETARY RATIO ASSEMBLY

BACKGROUND

A continuously variable transmission (CVT) is a transmission that continuously varies a speed ratio between an output speed and an input speed. One type of a CVT is a belt-type that varies the speed ratio by varying the distance between sheaves of a pulley so the distance of the belt to a rotational axis of the pulley varies. Another type of CVT is a spherical-type that utilizes spherical speed adjusters, such as power adjusters, balls, planets, spherical gears or rollers. The spherical speed adjustors in this embodiment have tiltable axis of rotation that are adapted to be adjusted to achieve a desired ratio of input speed to output speed.

For the reasons stated above and for other reasons stated below which will become apparent to those skilled in the art upon reading and understanding the present specification, there is a need in the art for an effective and efficient method of controlling the variable shifting of a CVT.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, a continuously variable transmission is provided. The continuously variable transmission includes an input assembly, an output assembly, an input/output planetary ratio assembly and a torque feedback assembly. The input assembly is configured to be coupled to receive input rotational motion. The output assembly provides a rotational output and is rotationally coupled to a load. The input/output planetary ratio assembly is configured and arranged to set an input to output speed ratio. The input/output ratio assembly has a first portion that is in rotational communication with the input assembly and a second portion that is in rotational communication with the output assembly. The torque feedback control assembly provides an axial load force in response to a torque of a load coupled to the output assembly. Moreover, the torque feedback control assembly is coupled to provide torque feedback to the input/output planetary ratio assembly to at least in part control the input to output speed ratio of the input/output planetary ratio assembly.

In another embodiment, another continuously variable transmission is provided. The continuously variable transmission includes an input assembly, an output assembly, an input/output planetary assembly, a torque feedback control assembly, and input speed feedback control assembly and a helical shift control assembly. The input assembly is configured to be coupled to receive input rotational motion. The output assembly provides a rotational output. The output assembly is configured to be rotationally coupled to a load. The input/output planetary ratio assembly is configured and arranged to set an input to output speed ratio. The input/ output ratio assembly has a first portion that is in rotational communication with the input assembly and a second portion that is in rotational communication with the output assembly. The input/output planetary ratio assembly includes a first stator, a second stator and a plurality of planets movably engaged between the first and second stator. The input output ration is based on a rotation of the second stator and the first stator in relation to each other. The torque feedback control assembly is configured and arranged to provide an axial load force in response to a torque of a load coupled to the output assembly. The input speed feedback control assembly is configured and arranged to provide an axial force in response to a rotation from the input assembly. The helical shift control assembly is configured and arranged to set the input to output speed ratio of the input/output ratio assembly based on the balancing of the axial force of the input speed feedback control assembly force with the axial force of the torque feedback control assembly. The helical shift control assembly includes a first track and second track system to control the rotation of the second stator in relation to the first stator of the input/ output ratio assembly.

In still another embodiment, another continuously variable transmission is provided. The continuously variable transmission includes an input assembly, an output assembly, an input/output planetary assembly, a torque feedback control assembly, and input speed feedback control assembly and a helical shift control assembly. The input assembly is configured to be coupled to receive input rotational motion. The output assembly provides a rotational output. The output assembly is configured to be rotationally coupled to a load. The input/output planetary ratio assembly is configured and arranged to set an input to output speed ratio. The input/ output ratio assembly has a first portion that is in rotational communication with the input assembly and a second portion that is in rotational communication with the output assembly. The input/output planetary ratio assembly includes a first stator, a second stator and a plurality of planets movably engaged between the first and second stator. The input output ratio is based on a rotation of the second stator and the first stator in relation to each other. The torque feedback control assembly is configured and arranged to provide an axial load force in response to a torque of a load coupled to the output assembly. The input speed feedback control assembly is configured and arranged to provide an axial force in response to a rotation from the input assembly. The helical shift control assembly is in mechanical communication with an axial position of the torque feedback control assembly. The helical control assembly is configured and arranged to set the input to output speed ratio of the input/output ratio assembly based on the balancing of the axial force of the input speed feedback control assembly force with the axial force of the torque feedback control assembly. The helical shift control assembly includes a straight track and helical track system to control the rotation of the second stator in relation to the first stator of the input/output ratio assembly.

BRIEF DESCRIPTION OF THE DRAWINGS

The present invention can be more easily understood and further advantages and uses thereof will be more readily apparent, when considered in view of the detailed description and the following figures in which:

FIG. 3A is a cross-sectional side view of a input speed feedback control assembly of the CVT of FIG. 1;

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Figure 1:
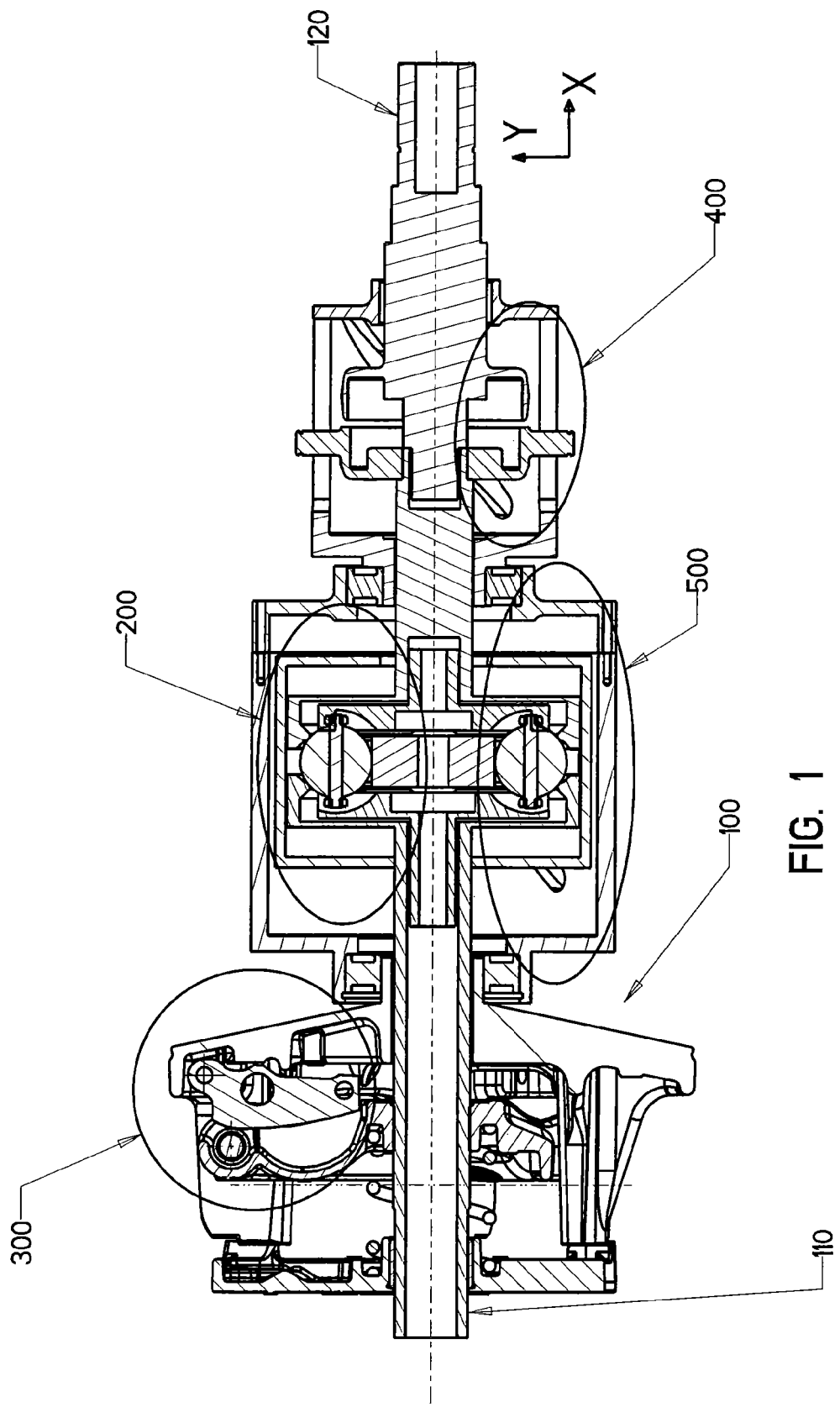
FIG. 1 is a cross-sectional diagram of a continuously variable transmission (CVT) of one embodiment of the present invention.
Figure 6:
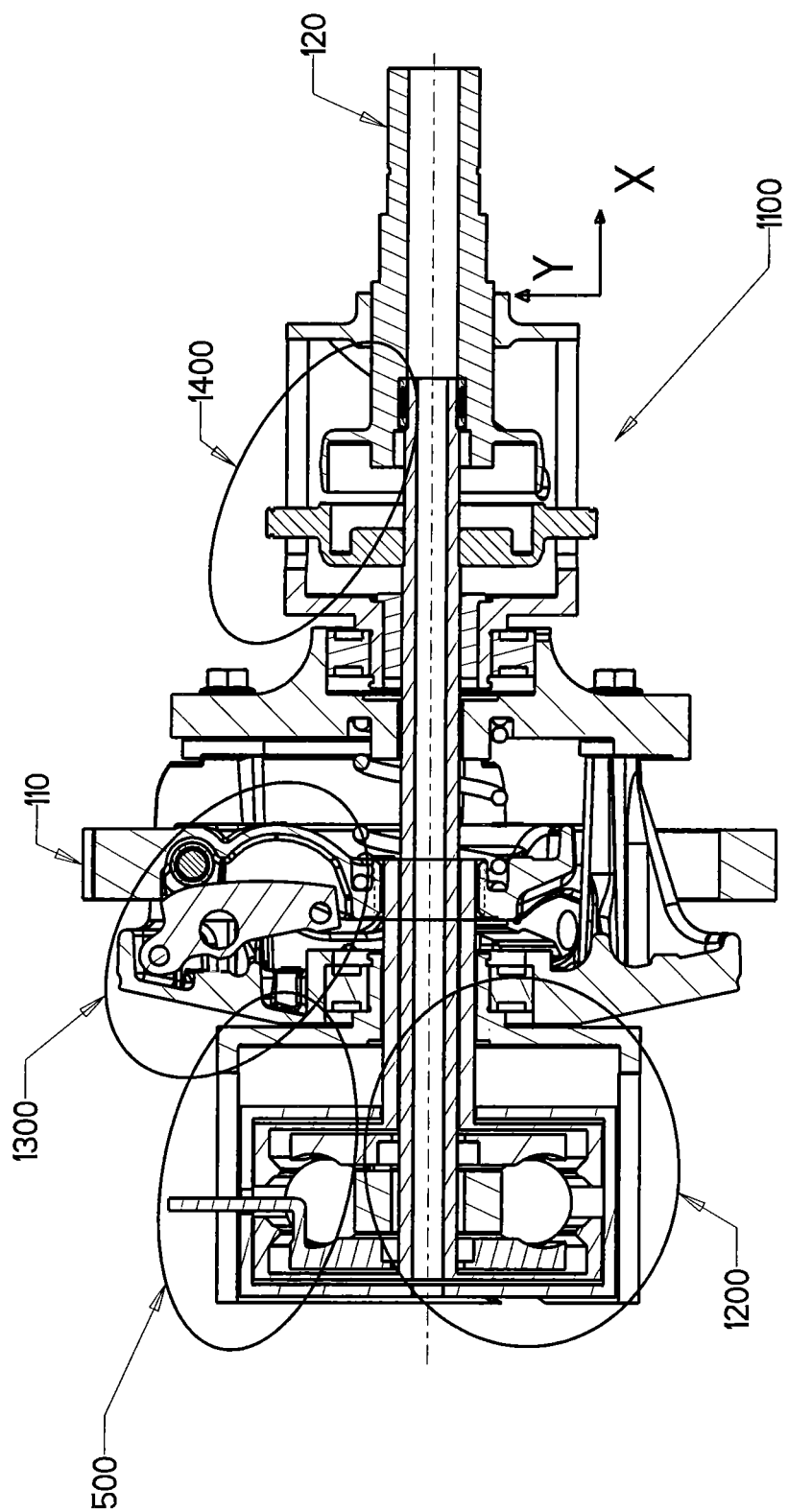
FIG. 6 is a cross-sectional diagram of a continuously variable transmission (CVT) of one embodiment of the present invention.
Figure 11:
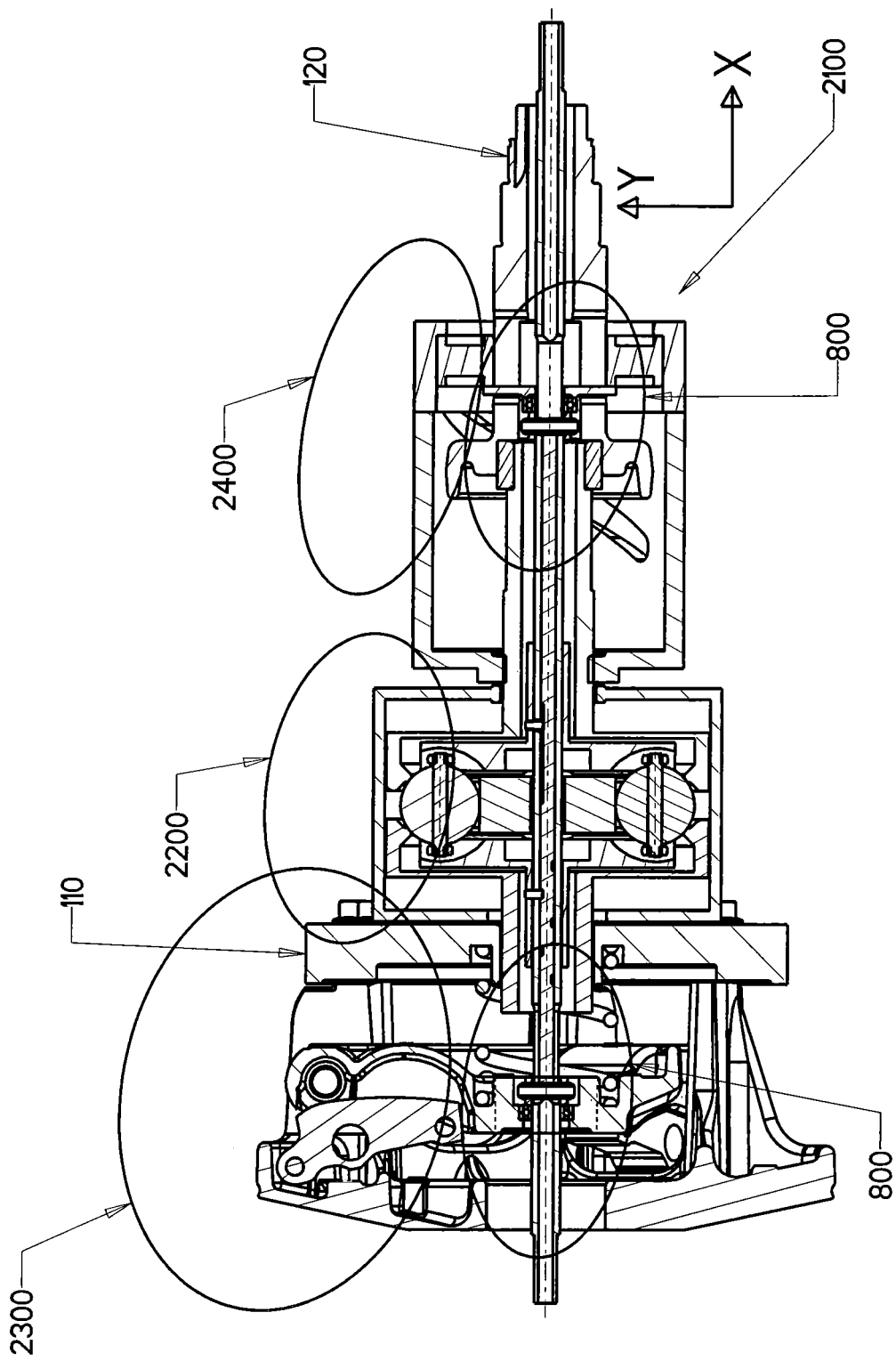
FIG. 11 is a cross-sectional diagram of a continuously variable transmission (CVT) of one embodiment of the present invention.
Figure 16:
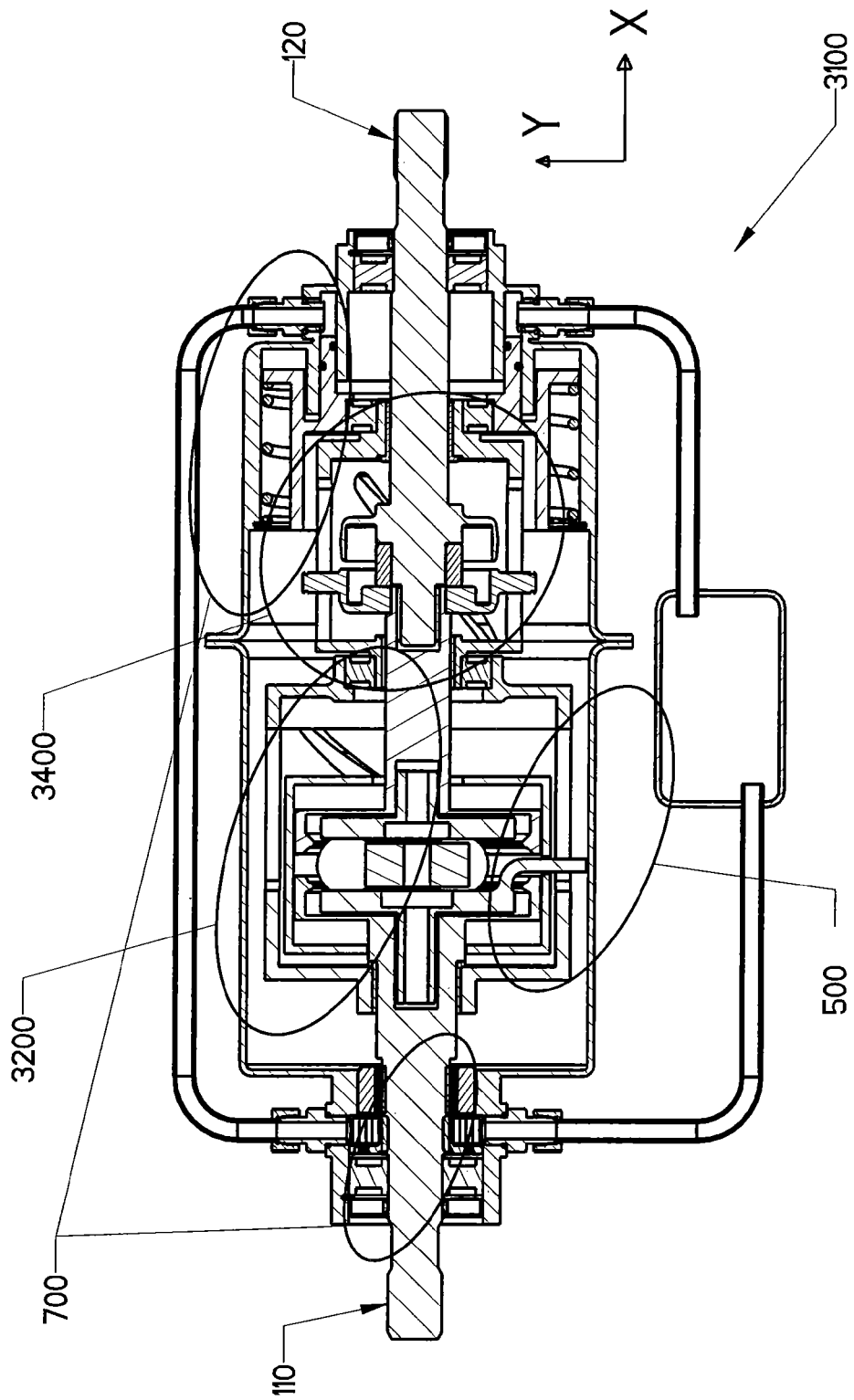
FIG. 16 is a cross-sectional diagram of a continuously variable transmission (CVT) of one embodiment of the present invention.

Embodiments of the present invention provide a continuously variable transmission (CVT) 100, 1100, 2100, and 3100 that includes a novel shifting mechanism. A cross-sectional side view of the CVT 100 is illustrated in FIG. 1. A cross-sectional side view of the CVT 1100 is illustrated in FIG. 6. A cross-sectional side view of the CVT 2100 is illustrated in FIG. 11. A cross-sectional side view of the CVT 3100 is illustrated in FIG. 16. CVTs 100, 1100, 2100, and 3100 of these embodiments are also known as a continuously variable planetary. Elements of CVTs 100, 1100, 2100, and 3100 include an input assembly 110 which is connected directly or indirectly to a crankshaft of an engine to receive rotational motion. CVTs 100, 1100, 2100, and 3100 also includes an output assembly 120 that is connected directly or indirectly to a load, such as, tires of a vehicle. Input speed feedback control assembly 300, 1300, 2300 and 700 include part of a shifting mechanism that is connected directly or indirectly to the crank shaft of the engine. Torque feedback control assembly 400 includes part of the shifting mechanism that is connected directly or indirectly to the load. Further, torque feedback control assembly 400 is part of the shifting mechanism that takes the phase relationship of two subsequently detailed spiders to control the axial position of the helical shift control assembly 500 of the CVT 100, 1100, and 3100 and of the helical shift control assembly 800 of the CVT 2100. Helical shift control assembly 500 (of the CVT embodiment of FIG. 1) is part of the shifting mechanism that takes the axial position of the torque feedback control assembly 400 to control the shifting mechanism inside the input/output planetary ratio assembly 200 of the CVT 100. Helical shift control assembly 500 (of the CVT embodiment in FIG. 6) is part of the shifting mechanism that takes the axial position of the torque feedback control assembly 1400 to control the shifting mechanism inside the input/output planetary ratio assembly 1200 of the CVT 1100. Helical shift control assembly 800 (of the CVT embodiment of FIG. 11) is part of the shifting mechanism that takes the axial position of the torque feedback control assembly 2400 to control the shifting mechanism inside the input/output planetary ratio assembly 2200 of the CVT 2100. Helical shift control assembly 500 is part of the shifting mechanism that takes the axial position of the torque feedback control assembly 3400 to control the shifting mechanism inside the input/output planetary ratio assembly 3200 of the CVT 3100 of FIG. 16. An input/output planetary ratio assembly 200, 1200, 2200, or 3200, of the respective CVT, transfers rotational motion from the input assembly 110 to the output assembly 120. In an embodiment, the input/output ratio assembly 200 is an input/output planetary assembly 200. In an embodiment, the input/output ratio assembly 1200 is an input/output planetary assembly 1200. In an embodiment, the input/output ratio assembly 2200 is an input/output planetary assembly 2200. Further, in an embodiment, the input/output ratio assembly 3200 is an input/output planetary assembly 3200. The CVT 100, 1100, 2100, and 3100 changes the rotation input at the input assembly 110 to a rotational output at the output assembly 120 by a select ratio. Common example ratios for CVT devices have a range of 2:1 under-drive to 0.5:1 overdrive. What this means is that if the input has 2,000 RPM and 200 ft-lbs of torque, at the 2:1 underdrive, the output will have 1,000 RPM and 400 ft-lbs of torque. Conversely at a 0.5:1 overdrive, the output will have 4,000 RPM and 100 ft-lbs of torque. These numbers are provided without consideration of efficiency losses. Also, although the ratios set out above are common examples, other ratios can be used depending on the application.

Figure 2A:
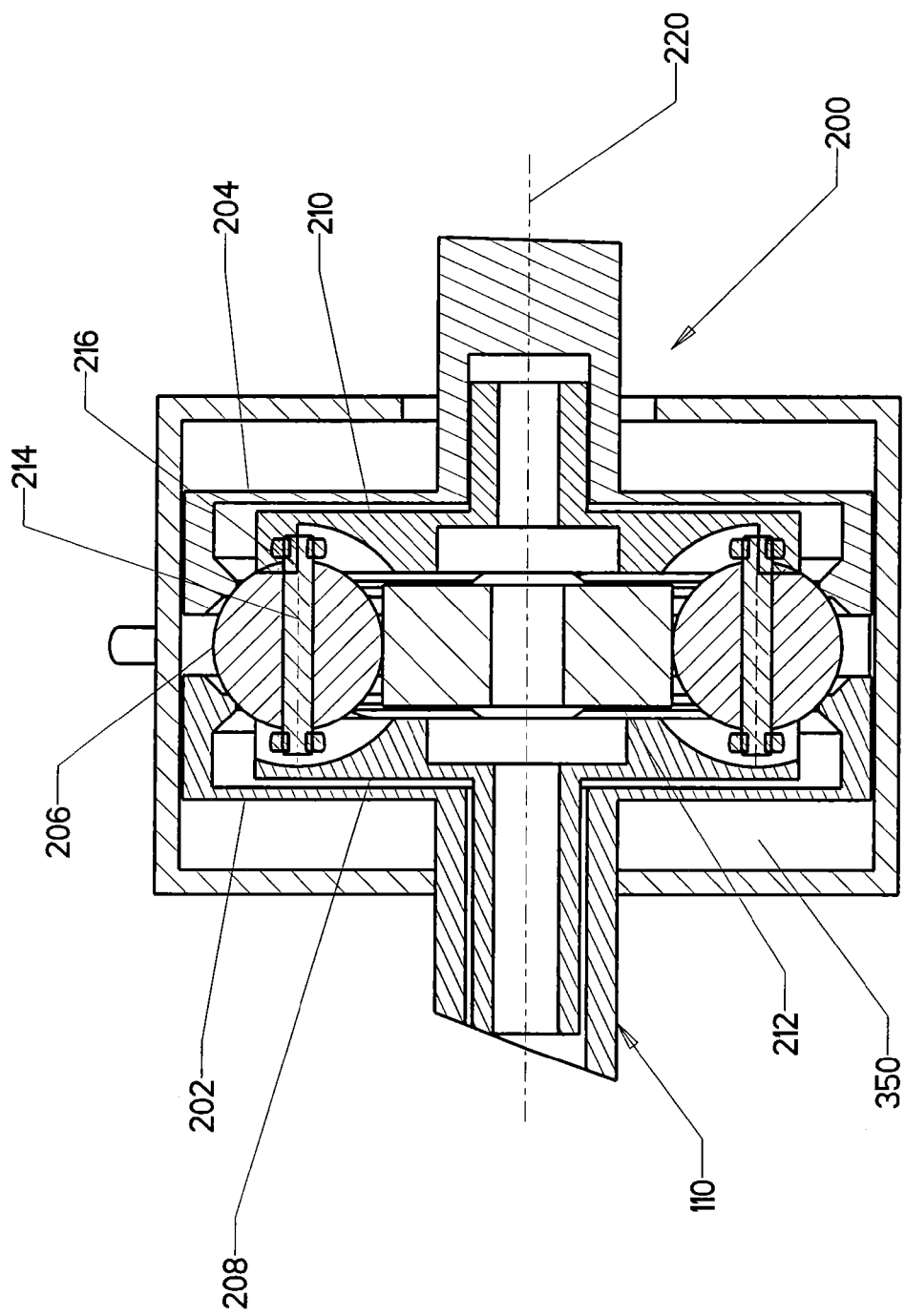
FIG. 2A is a cross-sectional side view of the input/output planetary ratio assembly of the CVT of FIG. 1.
Figure 2B:
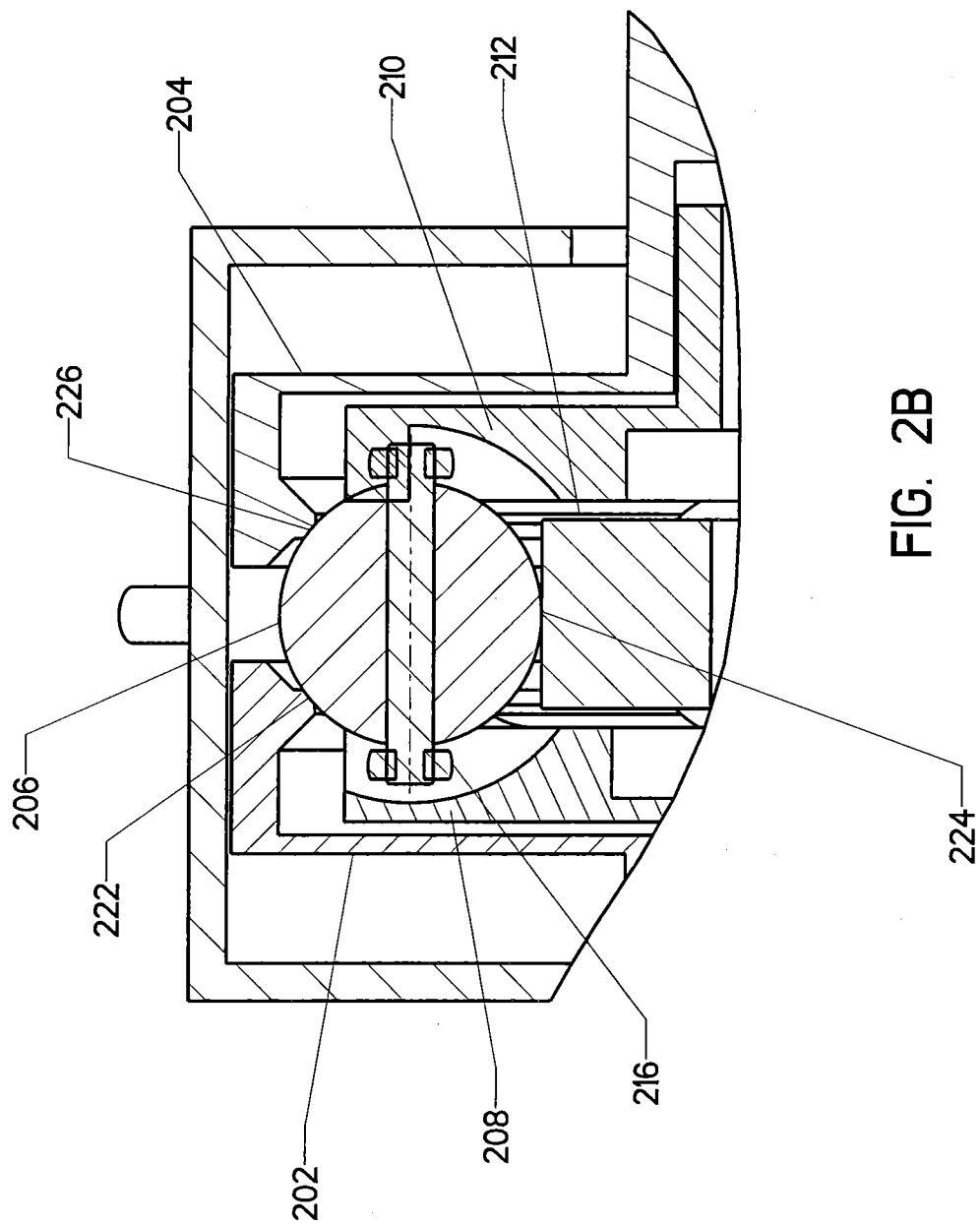
FIG. 2B is a cross-sectional side view of a portion of the input/output planetary ratio assembly of FIG. 2A.
Figure 7A:
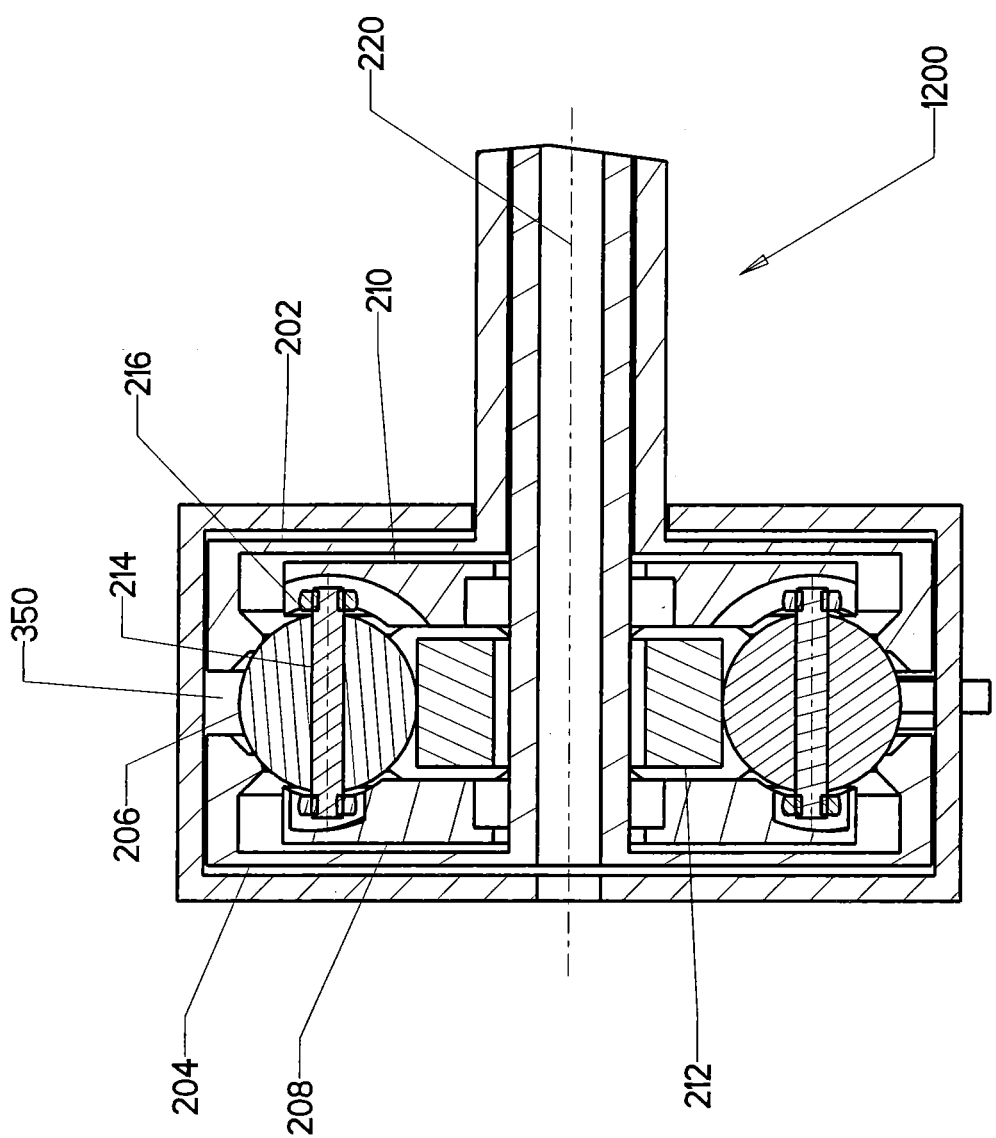
FIG. 7A is a cross-sectional side view of the input/output planetary ratio assembly of the CVT of FIG. 6.
Figure 7B:
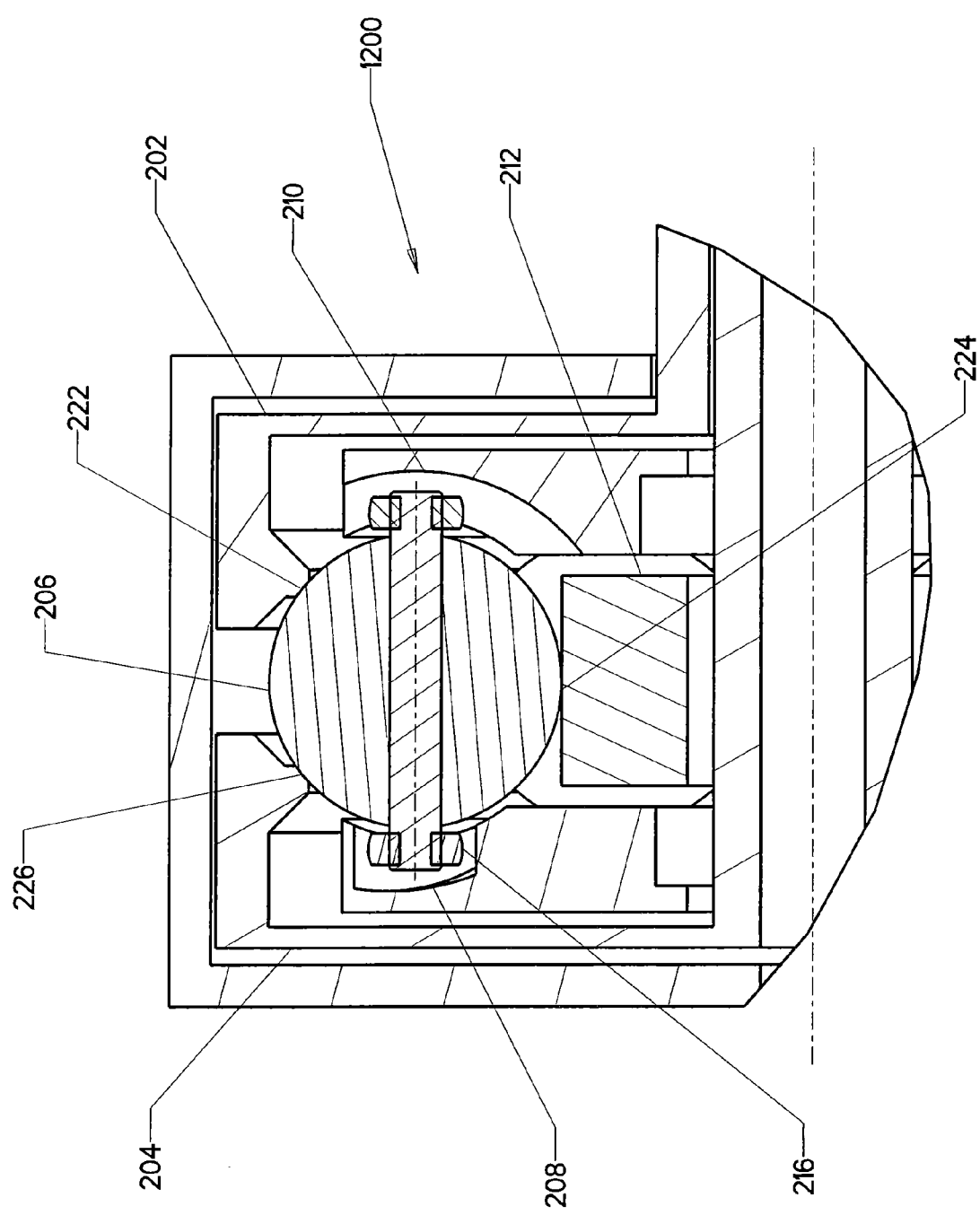
FIG. 7B is a cross-sectional side view of a portion of the input/output planetary ratio assembly of FIG. 7A.
Figure 7C:
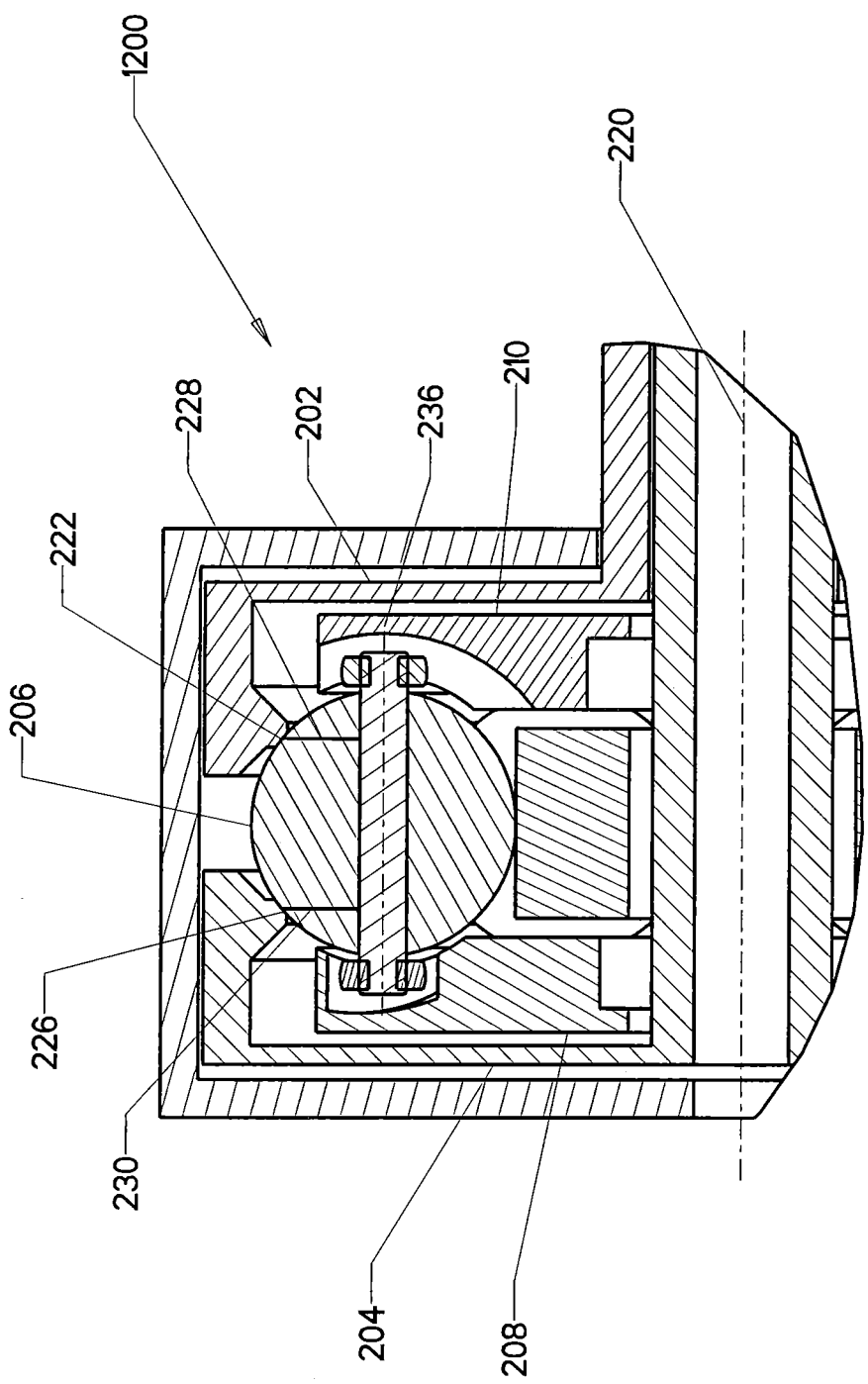
FIG. 7C is a cross-sectional side view of a portion of input/output planetary ratio assembly of FIG. 7A with an axle axis of the planet set to provide a first speed ratio.
Figure 7D:
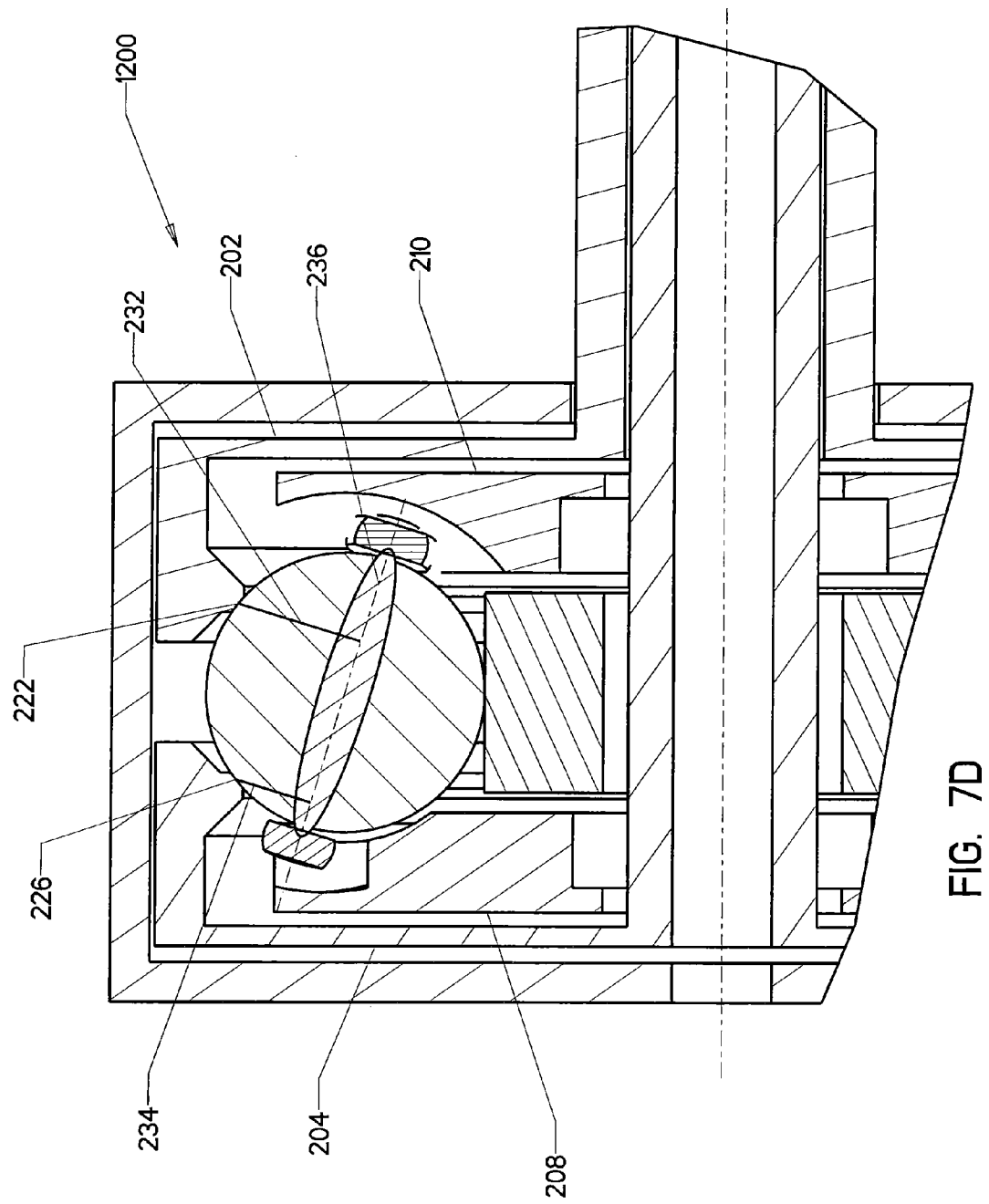
FIG. 7D is a cross-sectional side view of a portion of the input/output planetary ratio assembly of FIG. 7A with an axle axis of the planet set to provide a second speed ratio.
Figure 12A:
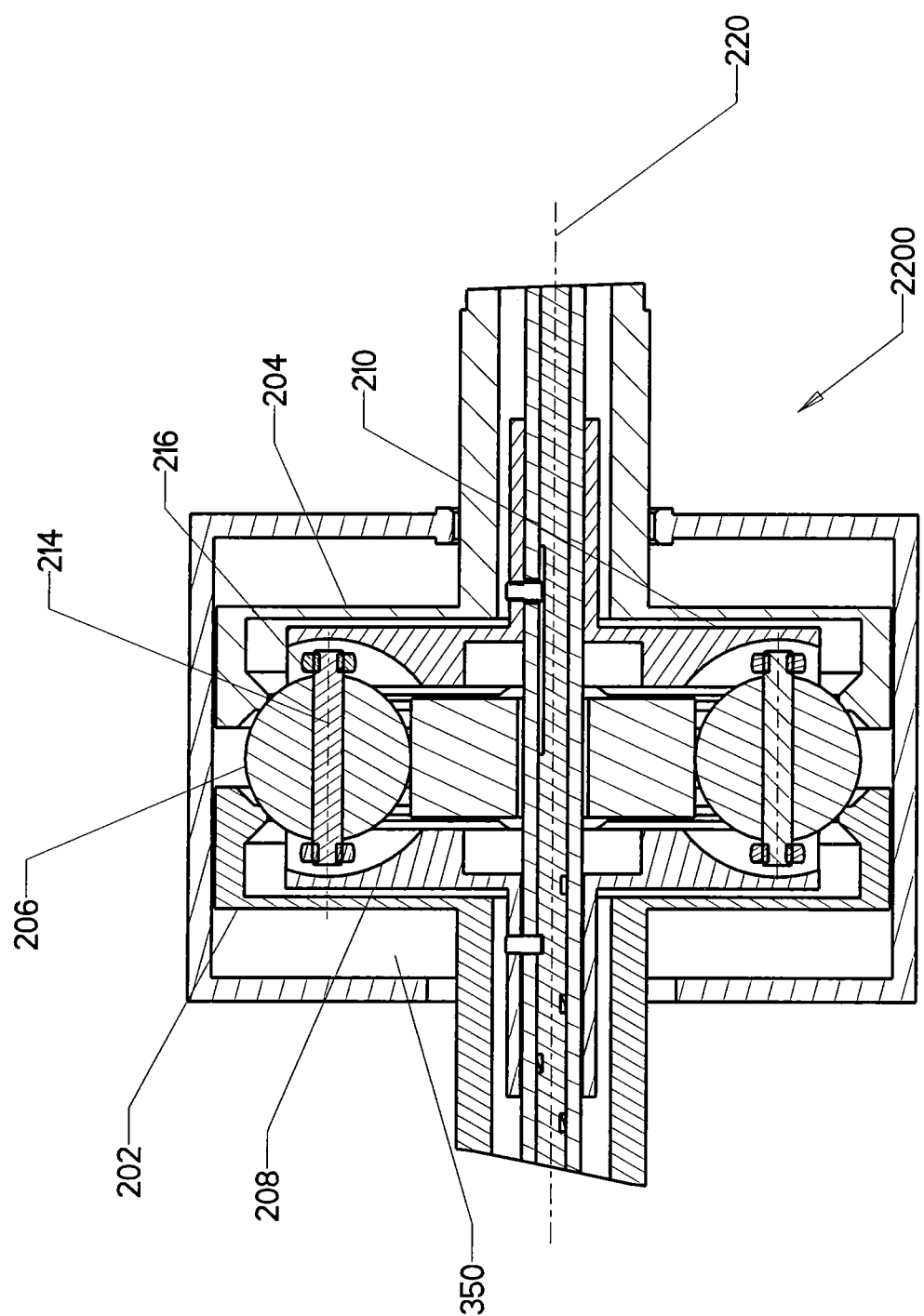
FIG. 12A is a cross-sectional side view of the input/output planetary ratio assembly of the CVT of FIG. 11.
Figure 12B:
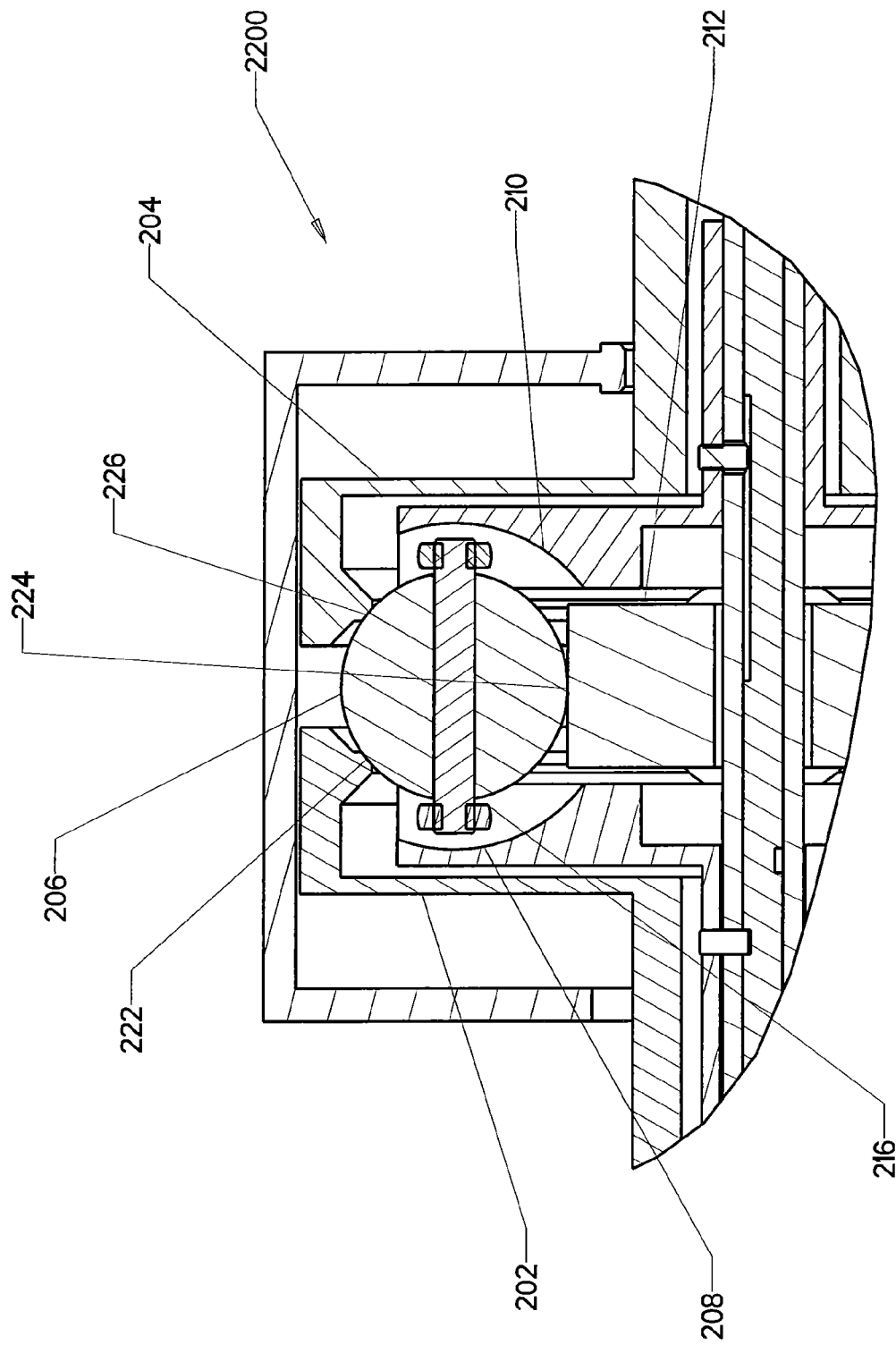
FIG. 12B is a cross-sectional side view of a portion of the input/output planetary ratio assembly of FIG. 12A.
Figure 12C:
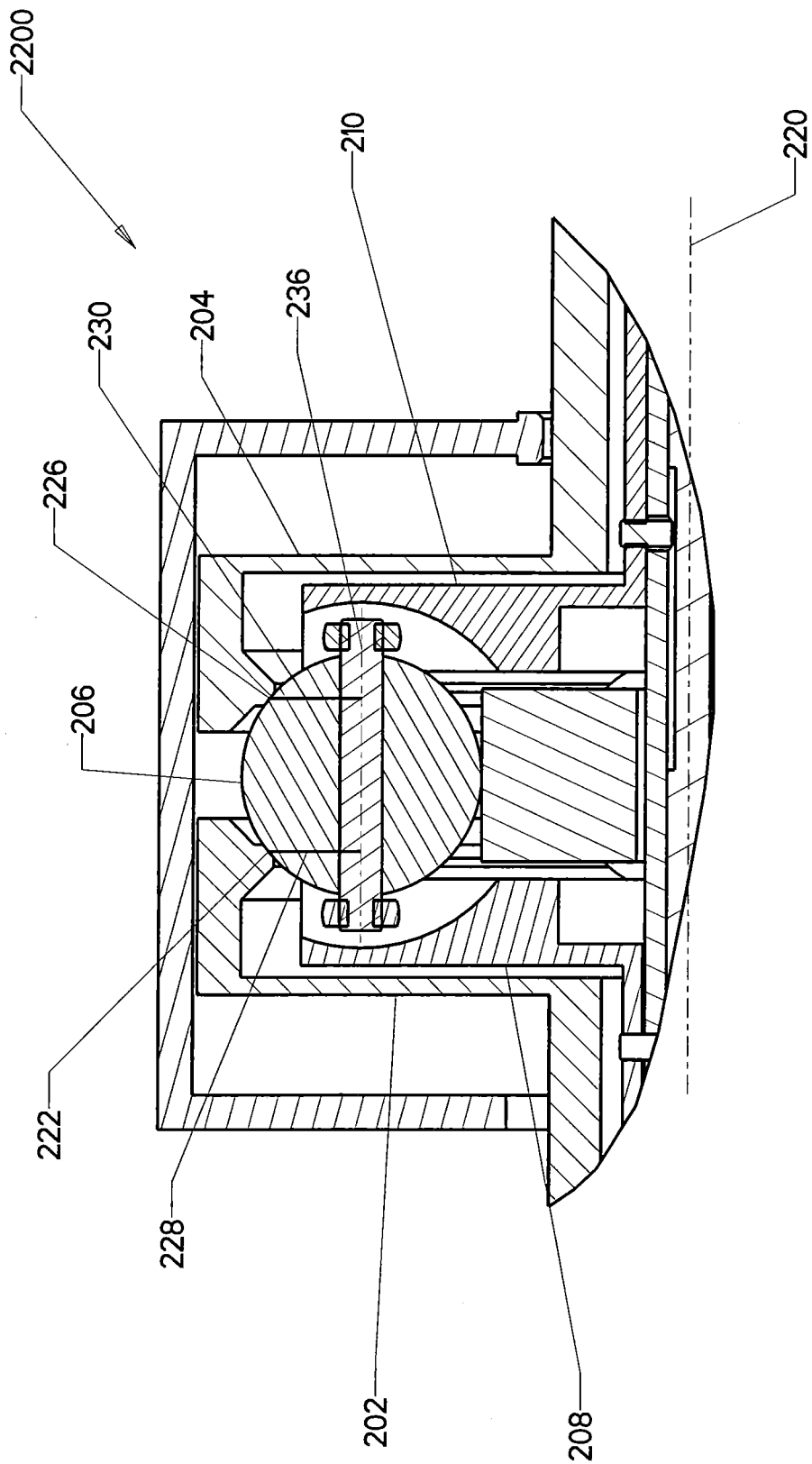
FIG. 12C is a cross-sectional side view of a portion of input/output planetary ratio assembly of FIG. 12A with an axle axis of the planet set to provide a first speed ratio.
Figure 12D:
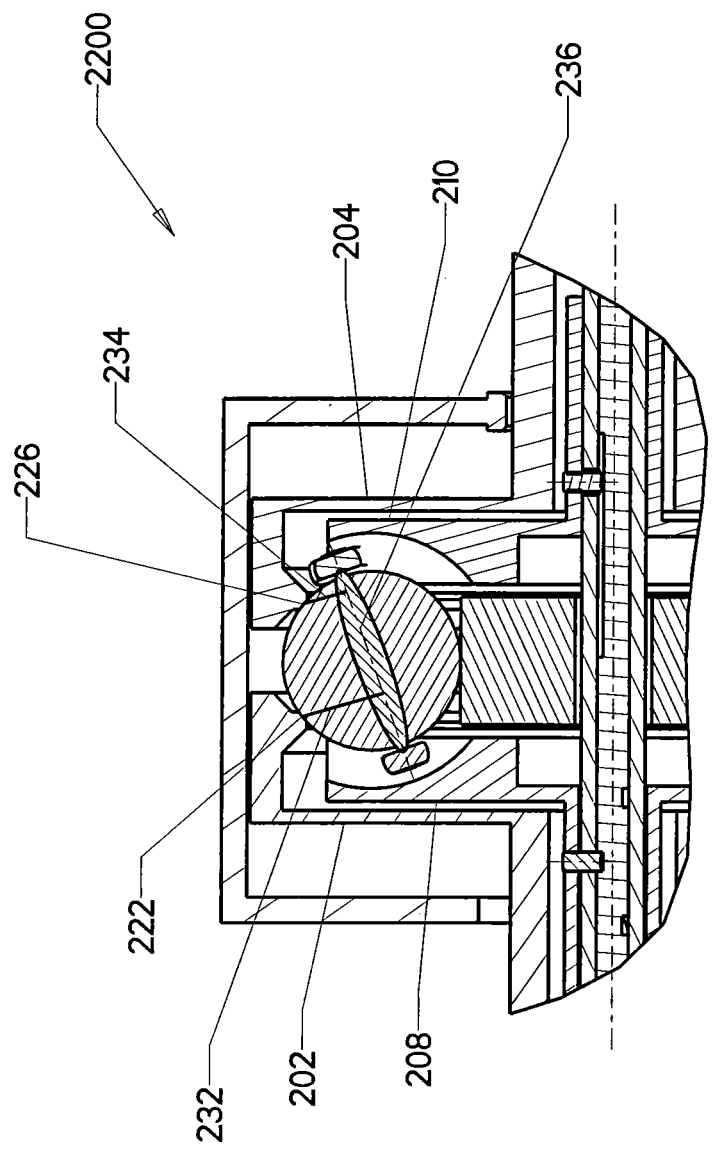
FIG. 12D is a cross-sectional side view of a portion of the input/output planetary ratio assembly of FIG. 12A with an axle axis of the planet set to provide a second speed ratio.
Figure 17A:
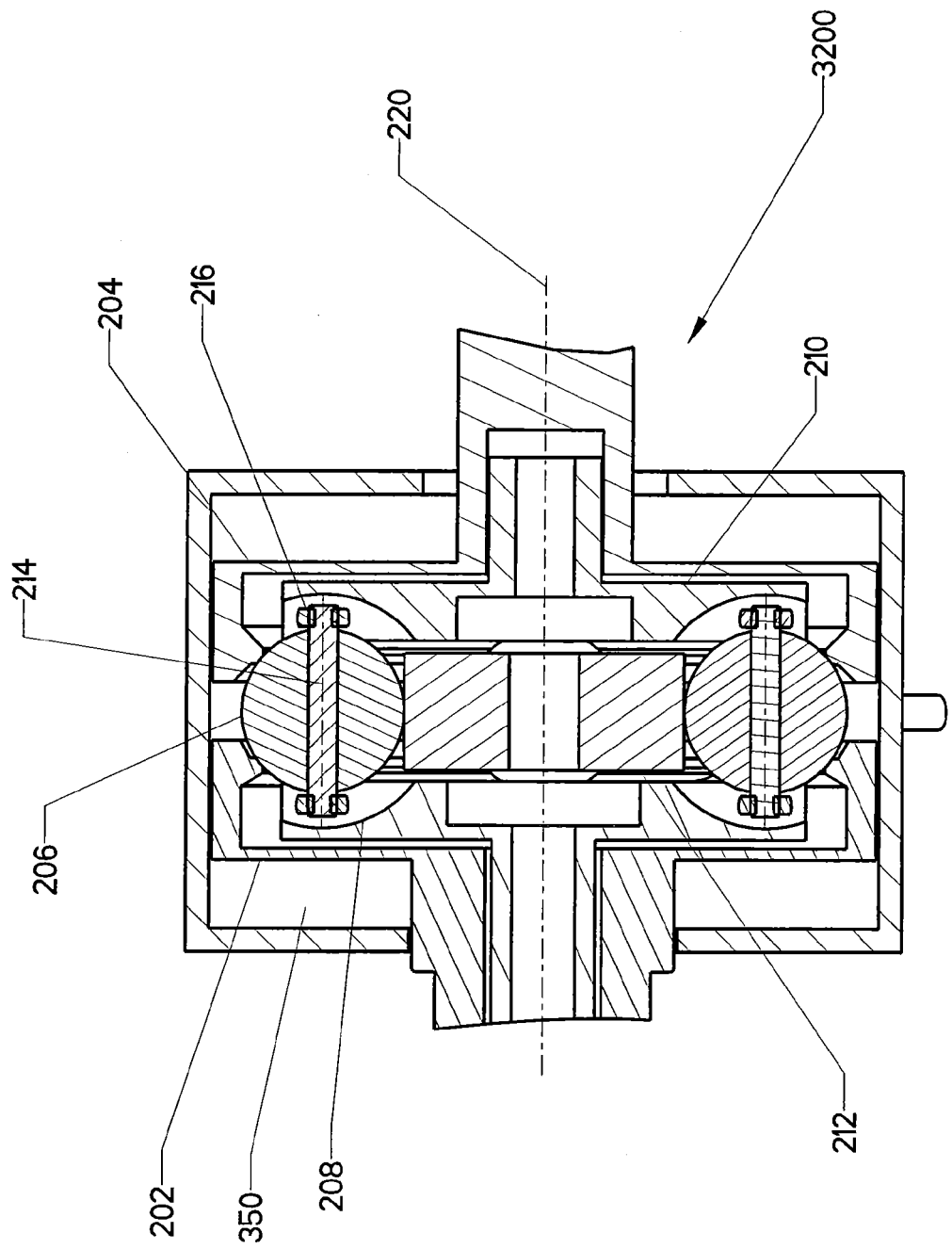
FIG. 17A is a cross-sectional side view of the input/output planetary ratio assembly of the CVT of FIG. 16.
Figure 17B:
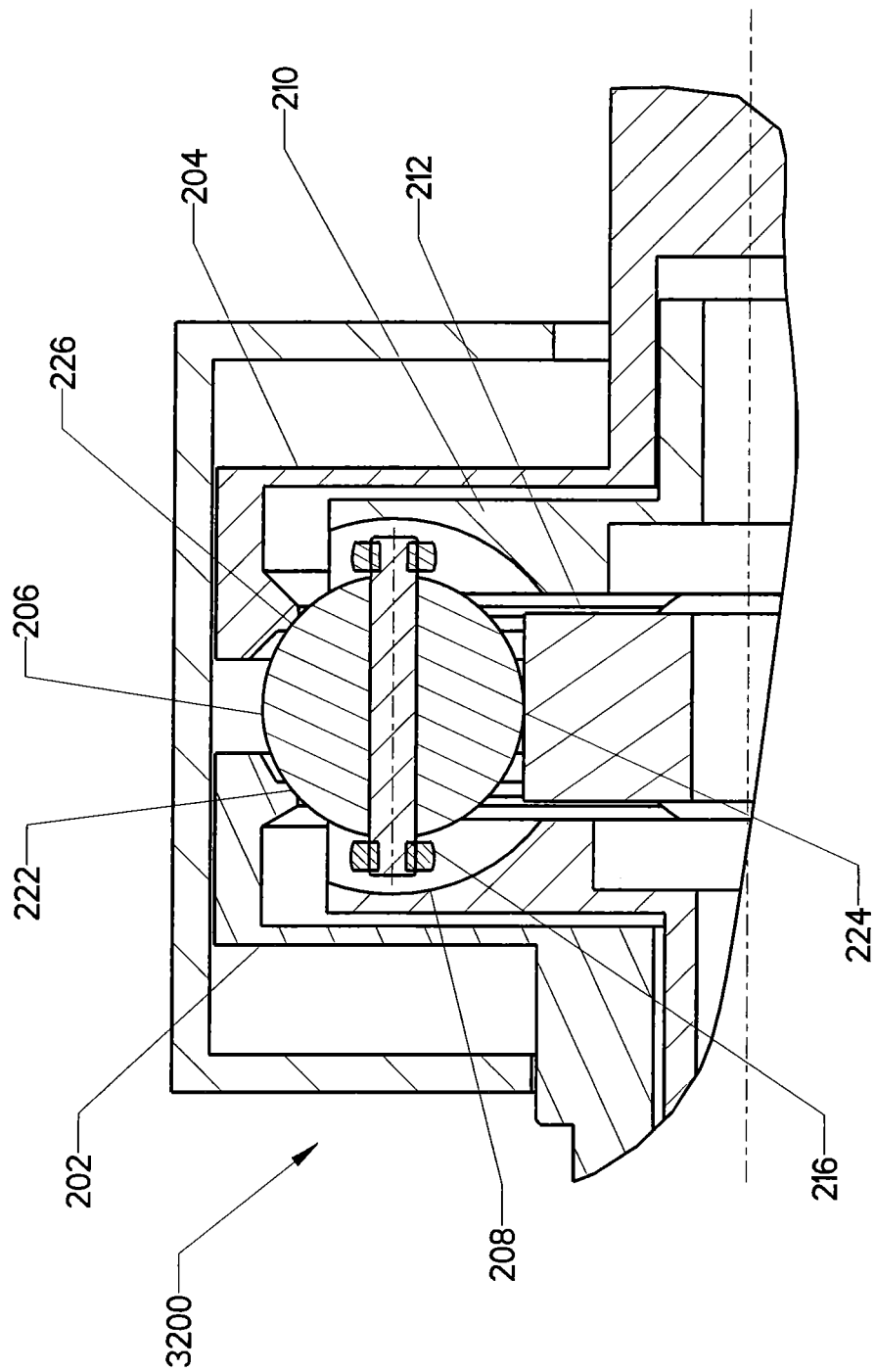
FIG. 17B is a cross-sectional side view of a portion of the input/output planetary ratio assembly of FIG. 17A.
Figure 17C:
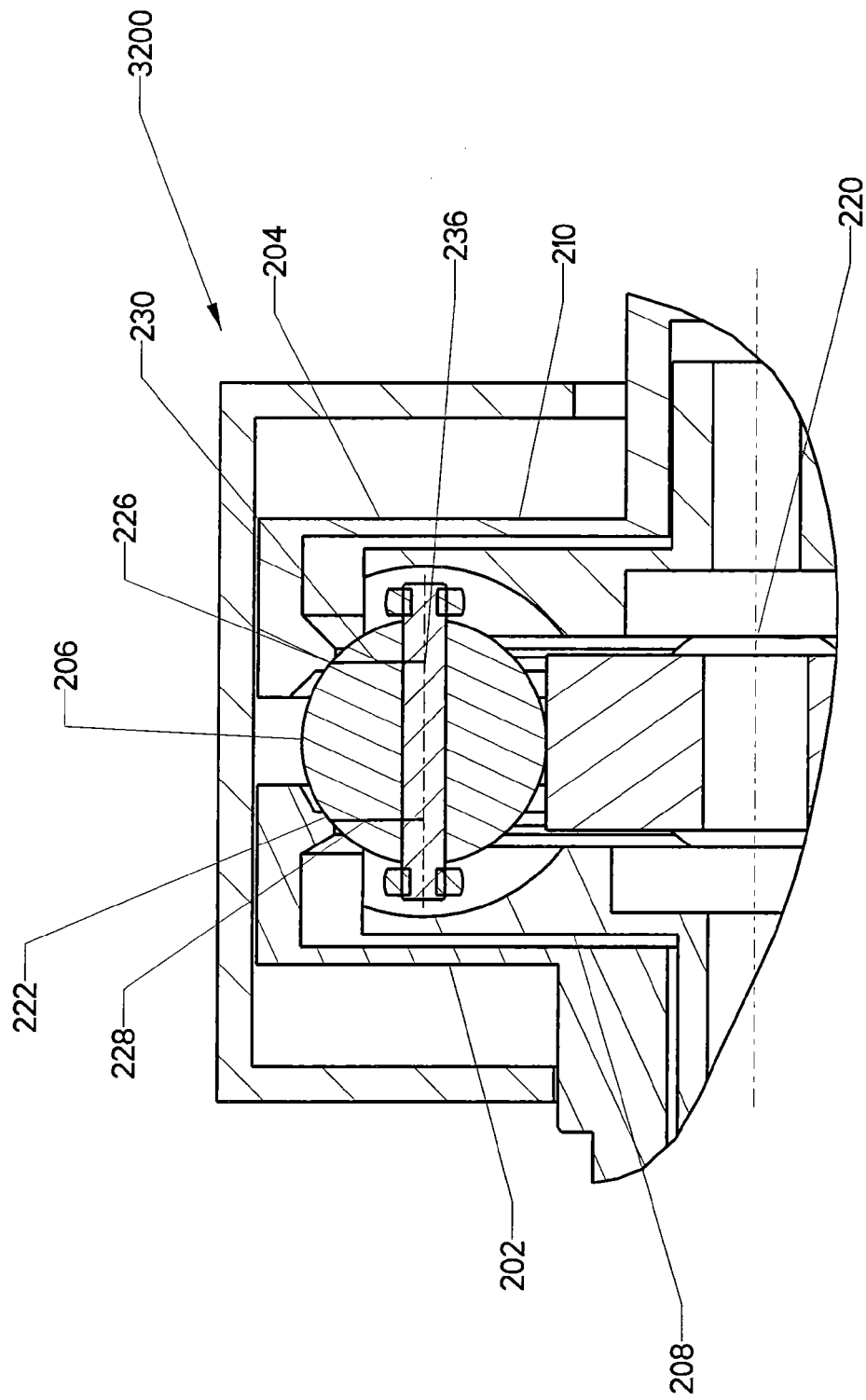
FIG. 17C is a cross-sectional side view of a portion of input/output planetary ratio assembly of FIG. 17A with an axle axis of the planet 206 set to provide a first speed ratio.
Figure 17D:
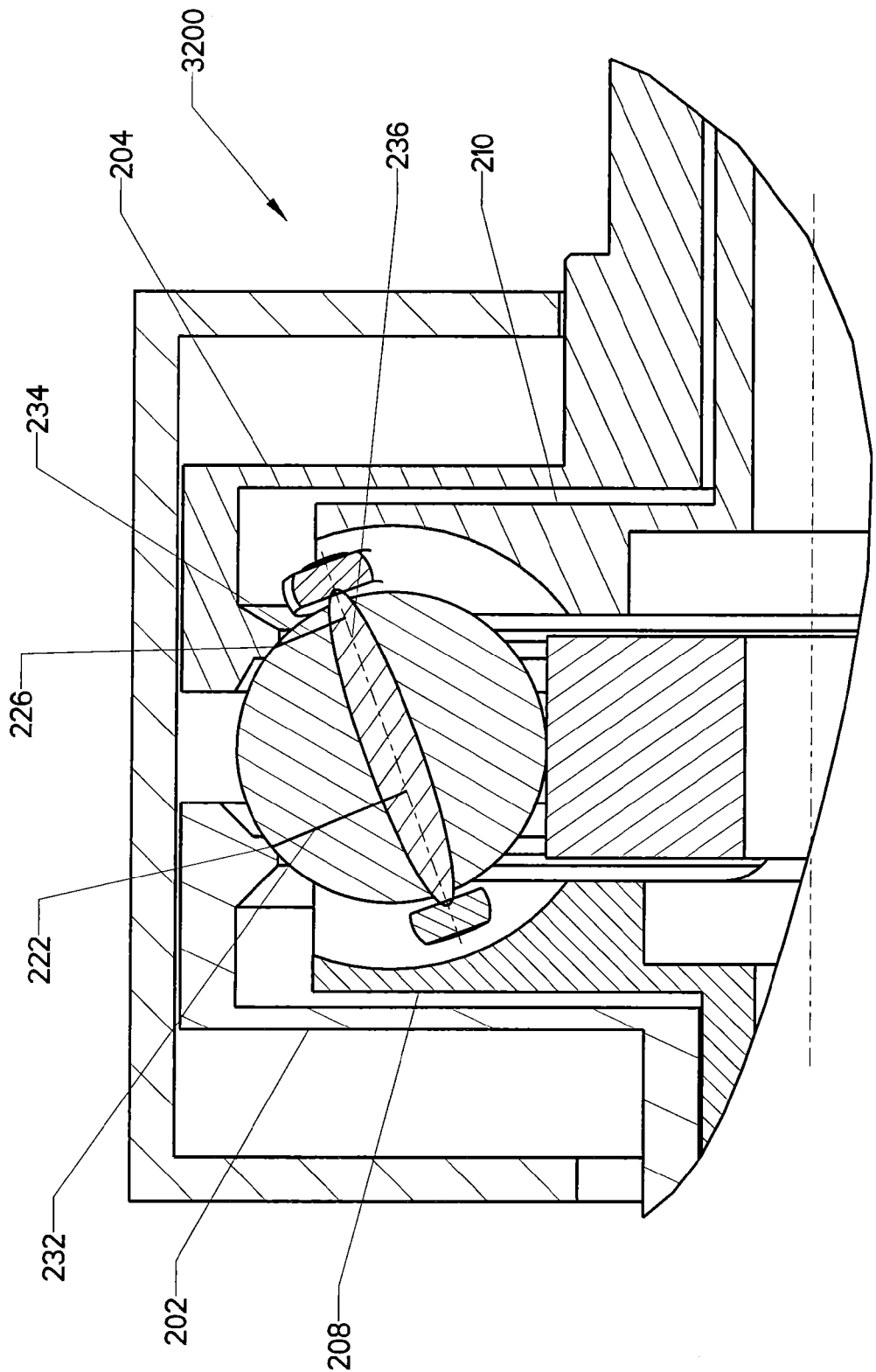
FIG. 17D is a cross-sectional side view of a portion of the input/output planetary ratio assembly of FIG. 17A with an axle axis of the planet 206 set to provide a second speed ratio.

FIG. 2A illustrates the input/output planetary ratio assembly 200 of the CVT 100. FIG. 7A illustrates the input/output planetary ratio assembly 1200 of the CVT 1100. FIG. 12A illustrates the input/output planetary ratio assembly 2200 of the CVT 2100. FIG. 17A illustrates the input/output planetary ratio assembly 3200 of the CVT 3100. Torque comes into the respective input/output planetary ratio assembly 200, 1200, 2200 and 3200 from the input assembly 110 via the first traction ring 202. The input shaft assembly 110 and the first traction ring 202 are operatively connected. The first traction ring 202 contacts a planet 206 at contact point 222 as illustrated in the close up view provided in FIGS. 2B, 7B, 12B and 17B. The planets 206 individually spin about their axles 214 and as a group about the input/output assembly axis 220. At contact point 224, the planet 206 contacts a sun 212 and spins the sun 212 about the axis 220 of the respective input/output planetary ratio assembly 200, 1200, 2200, 3200. The input/output planetary ratio assemblies 200, 1200, 2200 and 3200 have a relatively large clamping load that clamps the two traction rings 202 and 204 together. The reaction force from this clamping load goes through the traction rings 202 and 204 into the planets 206 and eventually to the sun 212. With multiple planets 206 this load gets equalized about the axis 220 of the respective input/output planetary ratio assembly 200, 1200, 2200 and 3200. At contact point 226 the planet 206 contacts and spins the second traction ring 204 which is operatively coupled to the output assembly 120 of the CVT 100, 1100, 2100, and 3100. The torque path of the CVT 100, 1100, 2100, and 3100 is from the input assembly 110 to the first traction ring 202, to the planet 206, then to the second traction ring 204, through the cam mechanism 400, 1400, 2400, and 3400 (described below), and eventually out of the device through the output assembly 120. The points of contact between the parts are 222 to 224 to 226 as illustrated in the close up view of FIGS. 2B, 7B, 12B, and 17B. Traction fluid 350 in the input/output planetary ratio assemblies 200, 1200, 2200 and 3200 along with the clamping load between the traction rings 202 and 204 allows torque and RPM to be transmitted from the input assembly 110 to the output assembly 120.

Figure 2C:
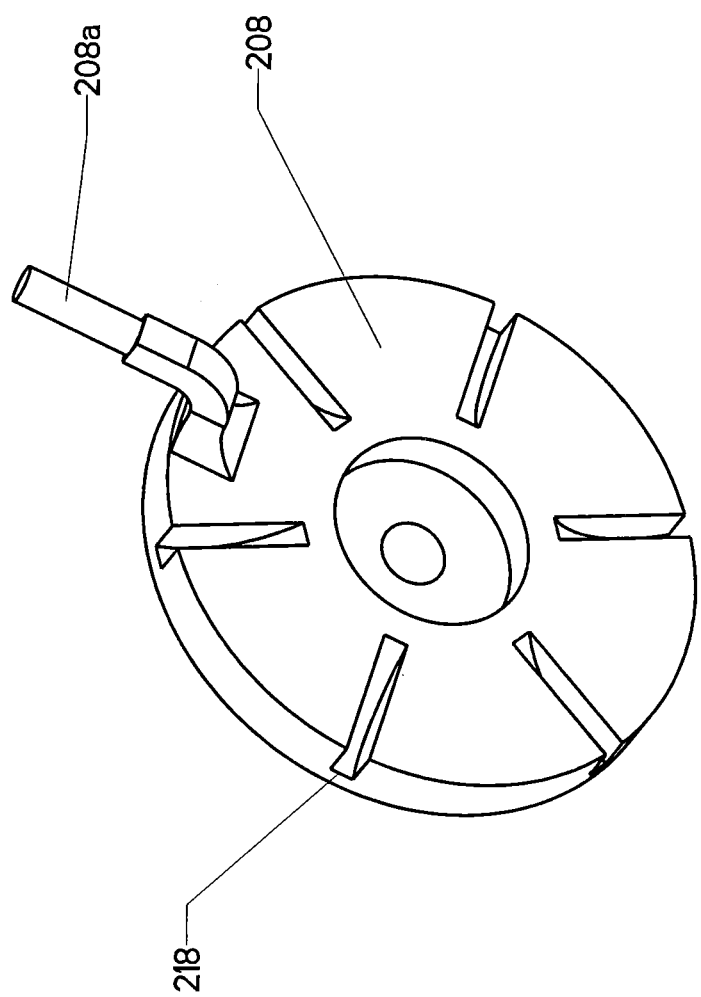
FIG. 2C is a front perspective view of a first stator of the input/output planetary ratio assembly of FIG. 2B.
Figure 2D:
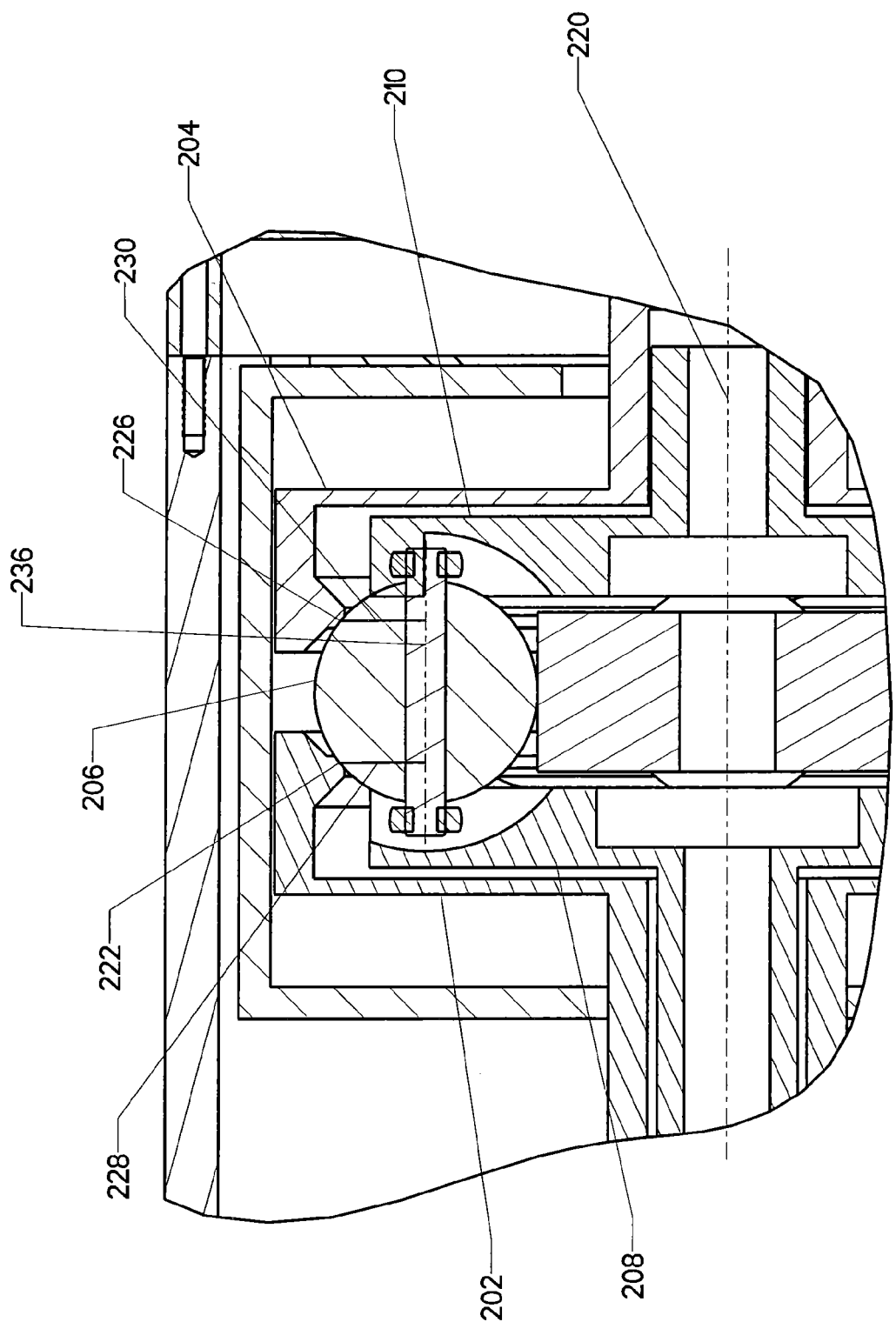
FIG. 2D is a cross-sectional side view of a portion of the input/output planetary ratio assembly of FIG. 2A with an axle axis of the planet set to provide a first speed ratio.
Figure 2E:
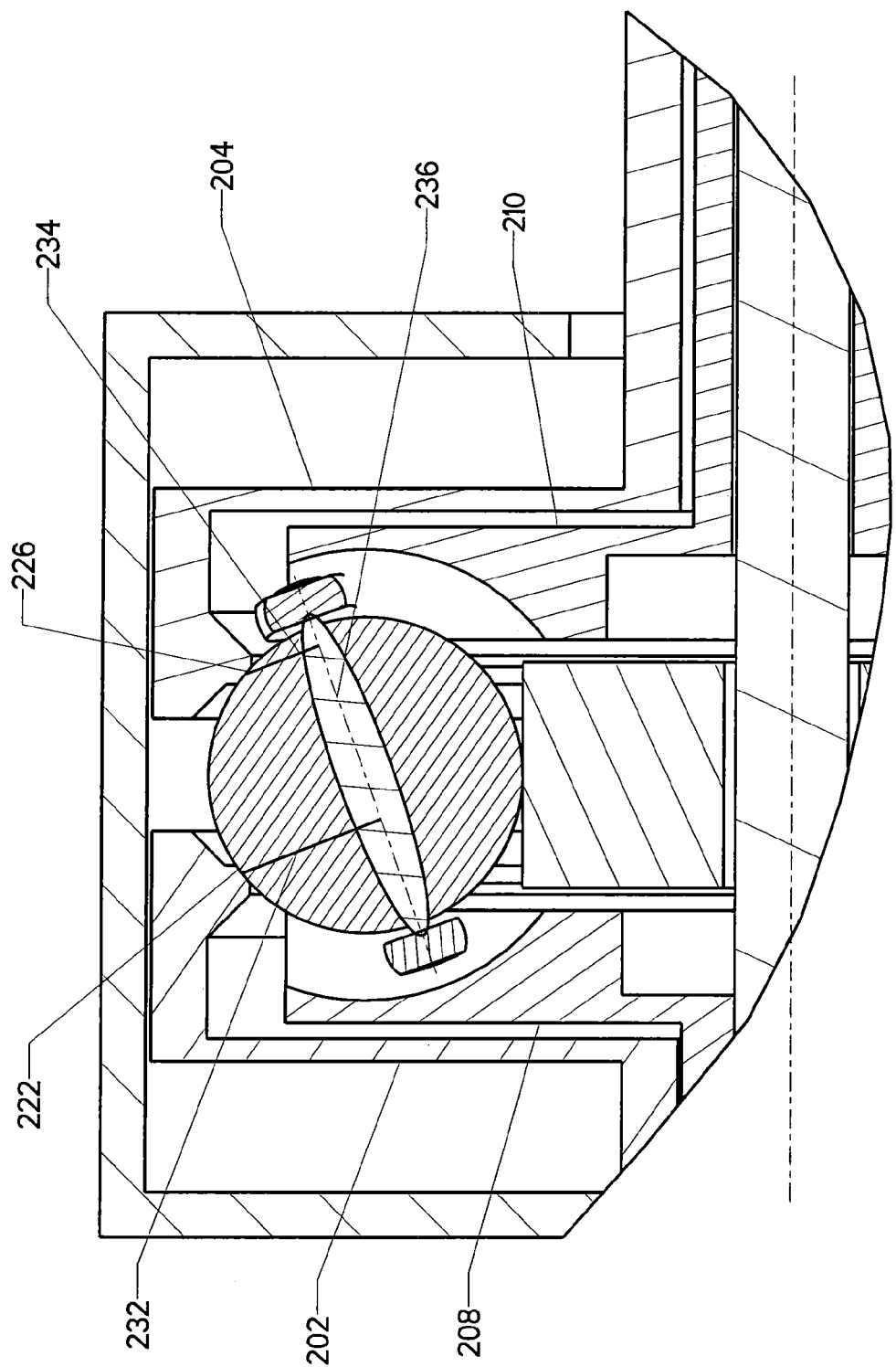
FIG. 2E is a cross-sectional side view of a portion of the input/output planetary ratio assembly of FIG. 2A with an axle axis of the planet set to provide a second speed ratio.

As discussed above, the planet 206 spins about its axle 214. Rollers 216 (or bearings or caps) are positioned on ends of axle 214. The rollers 216 fit in tracks 218 (best illustrated in FIG. 2C) in a first stator 208. The second stator 210 has similar tracks that the rollers 216 fit into, but the tracks, in one embodiment, are offset from the tracks in the first stator, 208. In this embodiment, the first stator 208 is fixed to ground and does not rotate at all. The second stator 210 can rotate relative about axis 220 and hence relative to the first stator 208. As the second stator, 210 rotates, the planet axle 214 is restricted to follow the tracks 218 in the first stator 208 and will find a new equilibrium. Thus the angle of the axle 214 changes and the axle twists and tips relative to the X, Y, Z axis of the device changing the ratio of the CVT. As illustrated in FIG. 2C, the first stator 208 has a positioning arm 208a and the second stator 110 has a similar positioning arm 210a (illustrated in FIG. 4C). Arm 208a is positioned within straight track 504 and arm 210a is positioned within helical track 506 in a helical cam 502. The straight track 504 and the helical track 506 in the helical cam 502 make up a straight track and helical track system of the helical shift control assembly 500, as further discussed below, that creates a relative phase change in the stators 208 and 210 of the respective input/output planetary ratio assemblies 200, 1200 and 3200 in response to a change in axial position of the helical shift control assembly 500.

As discussed above, the CVT 100, 1100, 2100, and 3100 can change ratio from the input to the output. The ratio is calculated by dividing a distance 228 from the contact point, 222 to the axis 236 of the axle 214 by the distance 230 from the second contact point 226 to the axis 236 of the axle 214. As shown in FIGS. 2D, 7C, 12C, and 17C, the device is in a 1:1 ratio, with the length of 228 and 230 being equal. Therefore, the first traction ring 202 is going the same RPM as the second traction ring 204 when the second stator 210 rotates relative to the first stator 208, the planet 206 and its axle rotates in the X, Y, and Z planes as partially shown in simplified FIGS. 2E, 7D, 12D, and 17D. When this happens, the distance 232 from the first contact point 222 to the axis 236 of the axle 214 gets longer and the distance 234 from the third contact point 226 to the axis 236 of the axle 214 gets shorter resulting in an under-drive ratio. In this configuration, the second traction ring 204 is going slower than the first traction ring 202. Rotating the second stator 210 in the opposite direction will give you an overdrive with the planet 206 and its accompanying parts rotating such that 232 gets shorter and 234 gets longer and the second traction ring 204 will be going faster than the first traction ring, 202.

Figure 3B:
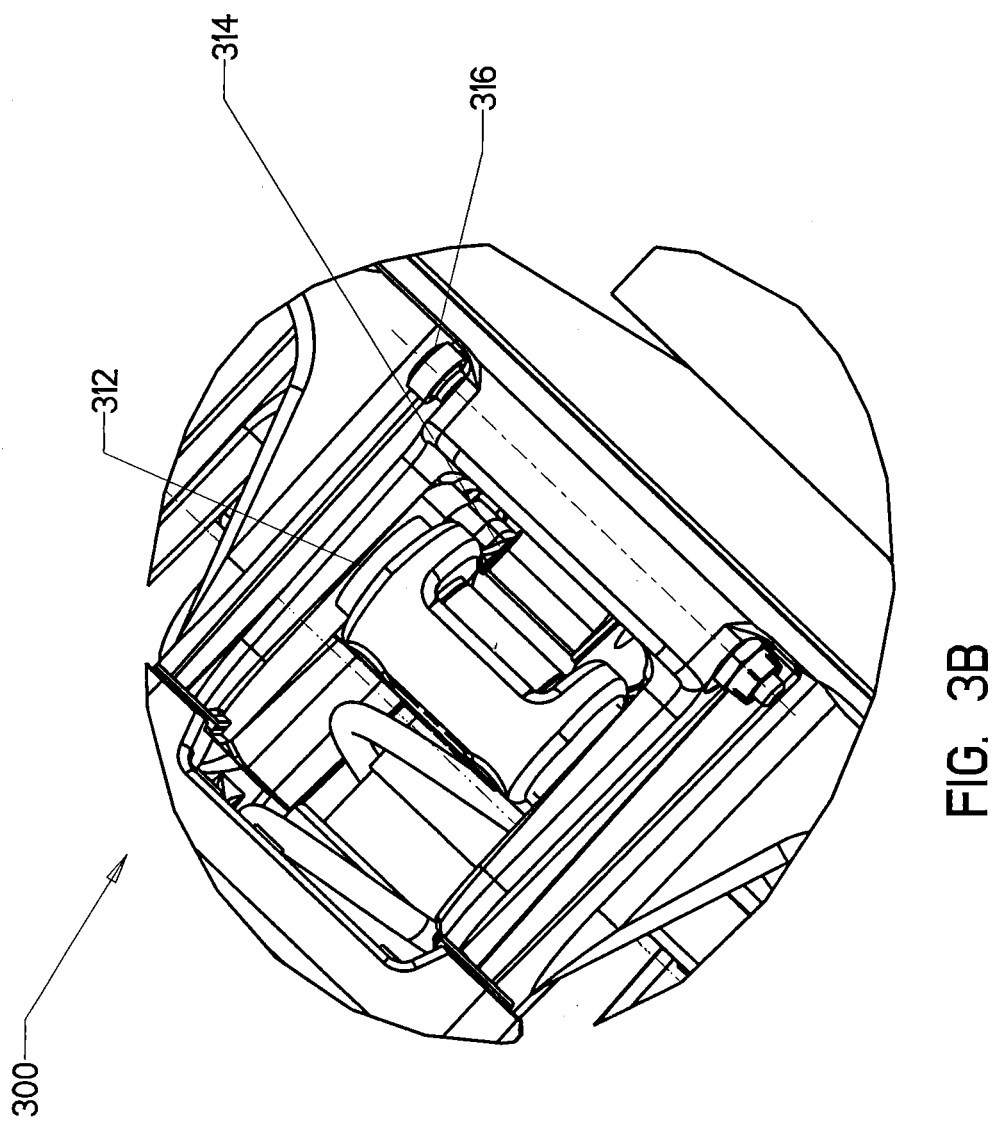
FIG. 3B is a perspective view of a portion of the input speed feedback control assembly of FIG. 3A.
Figure 3C:
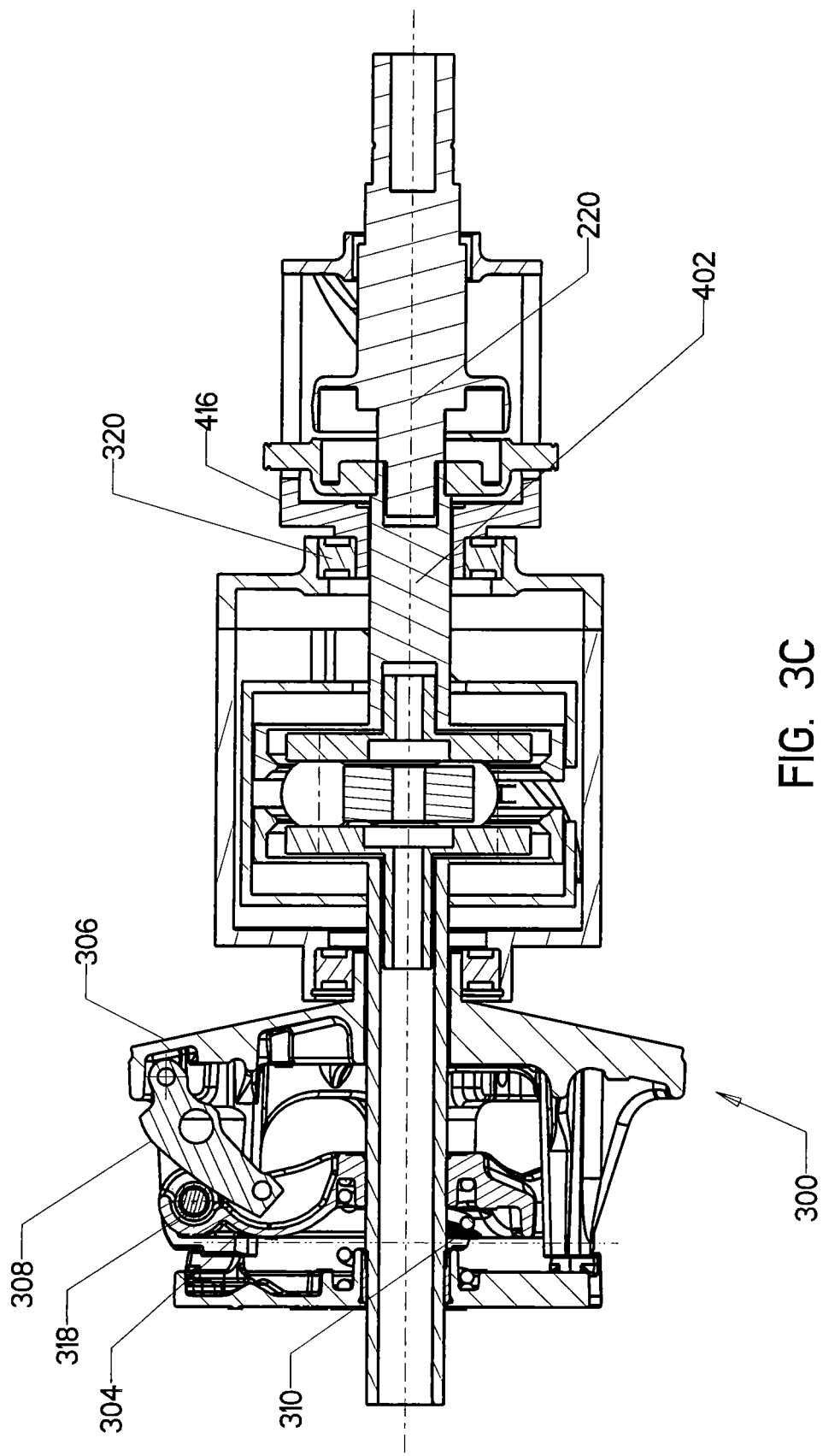
FIG. 3C is a cross-sectional side view of the input speed feedback control assembly of FIG. 3A positioned to provide a second high speed shift position.
Figure 8A:
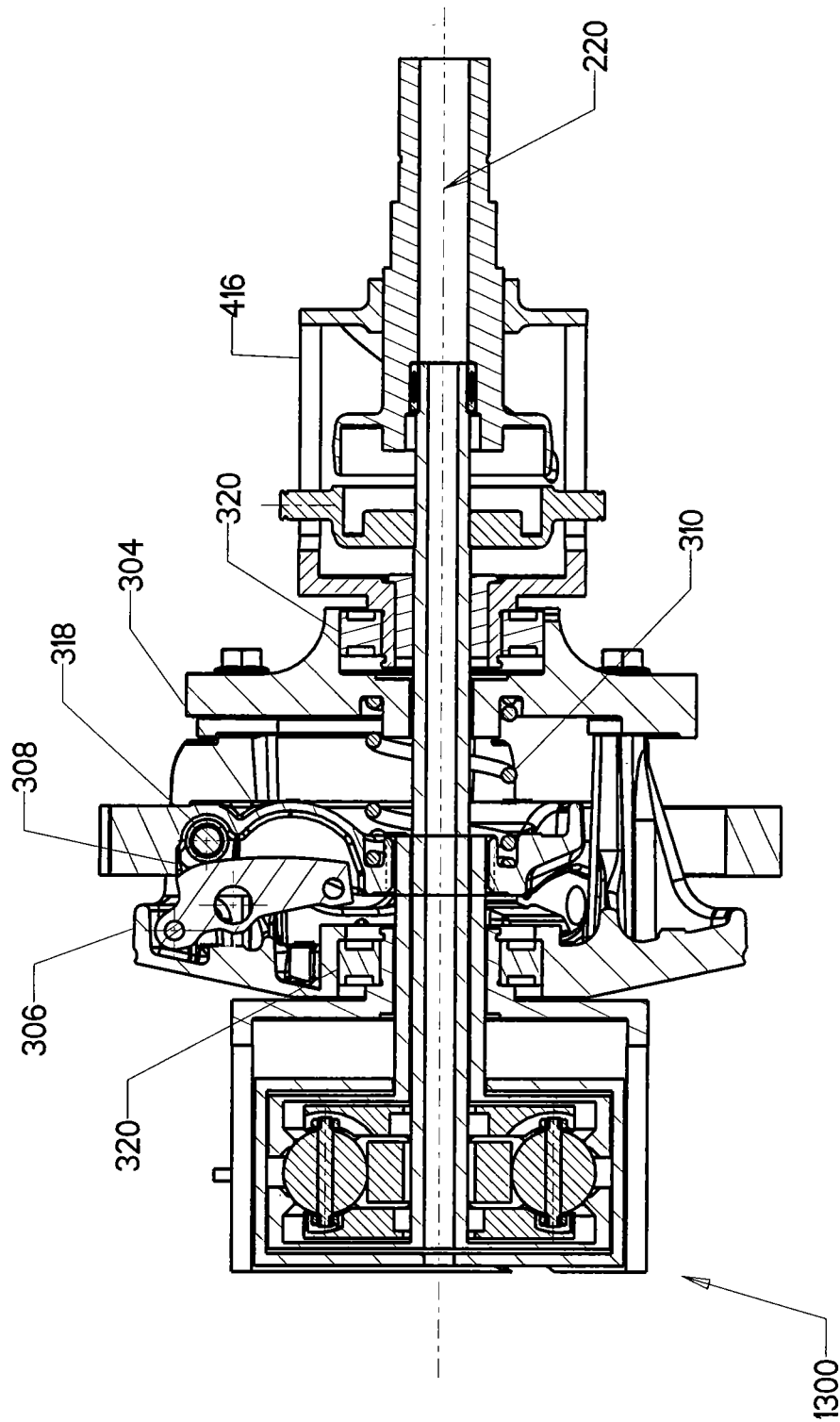
FIG. 8A is a cross-sectional side view of a input speed feedback control assembly of the CVT of FIG. 6.
Figure 8B:
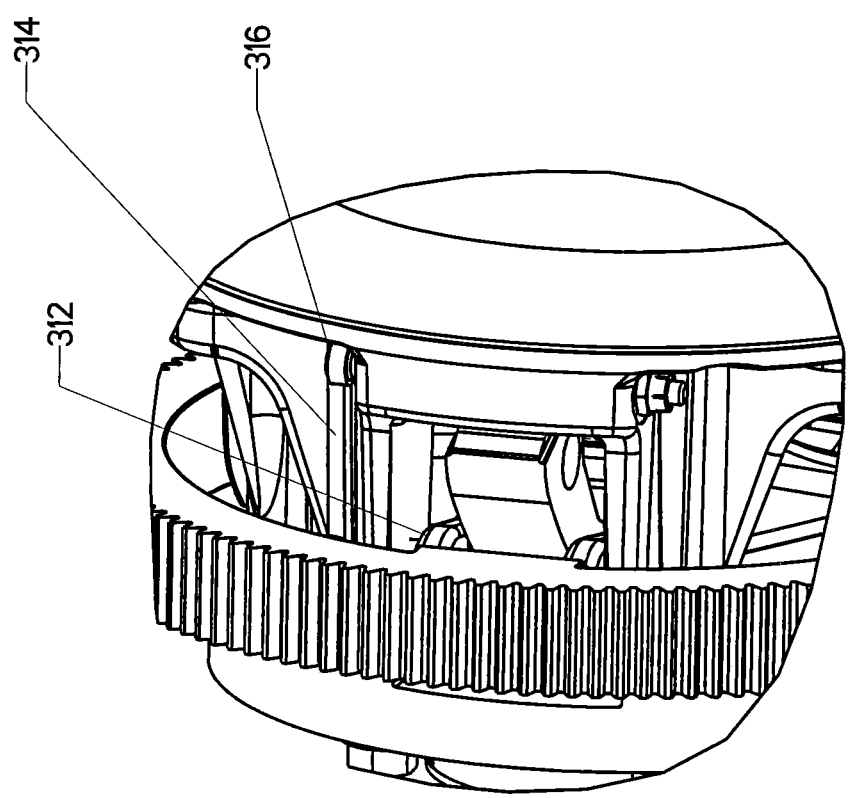
FIG. 8B is a perspective view of a portion of the input speed feedback control assembly of FIG. 8A.
Figure 8C:
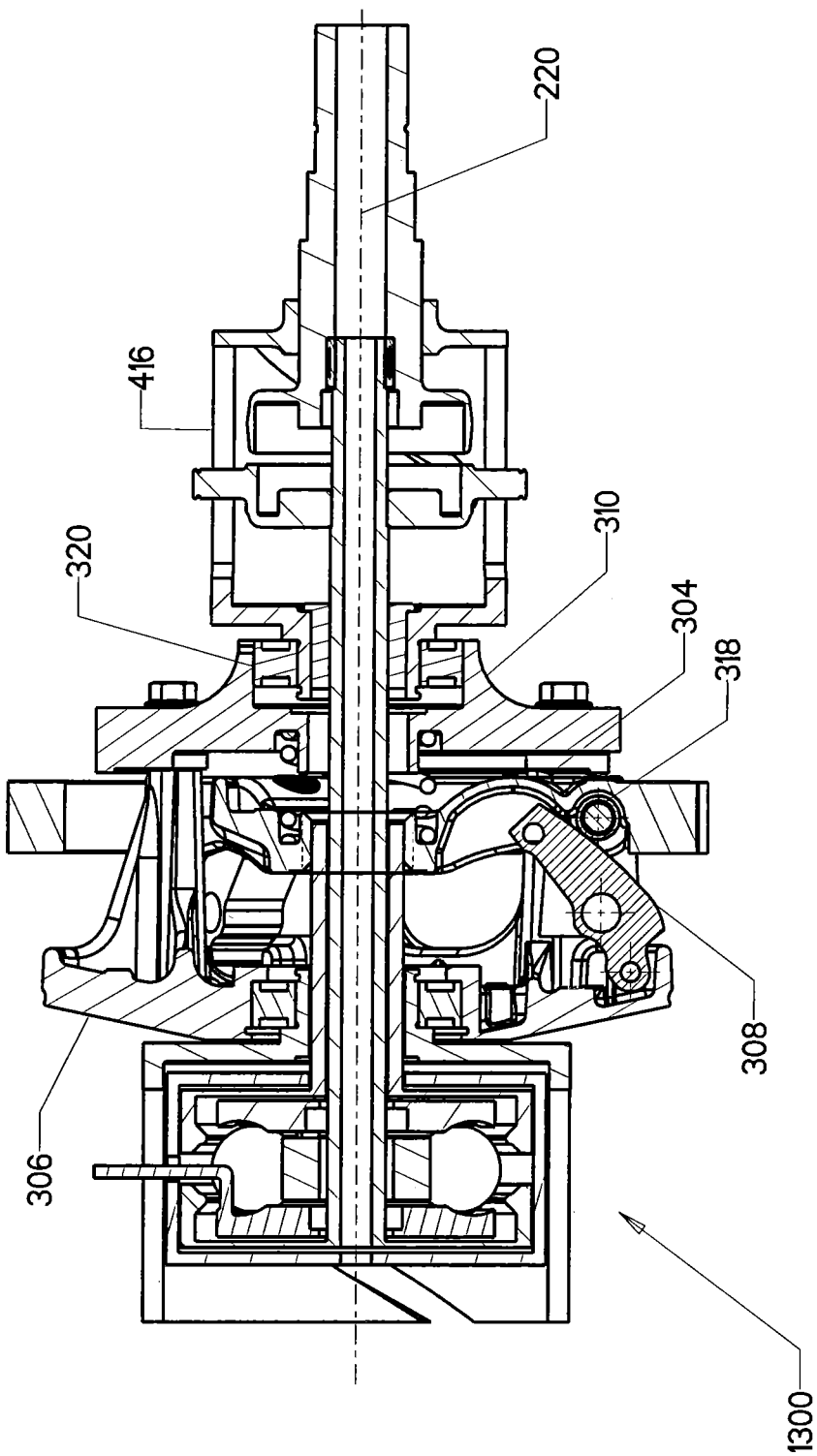
FIG. 8C is a cross-sectional side view of the input speed feedback control assembly of FIG. 8A.
Figure 13A:
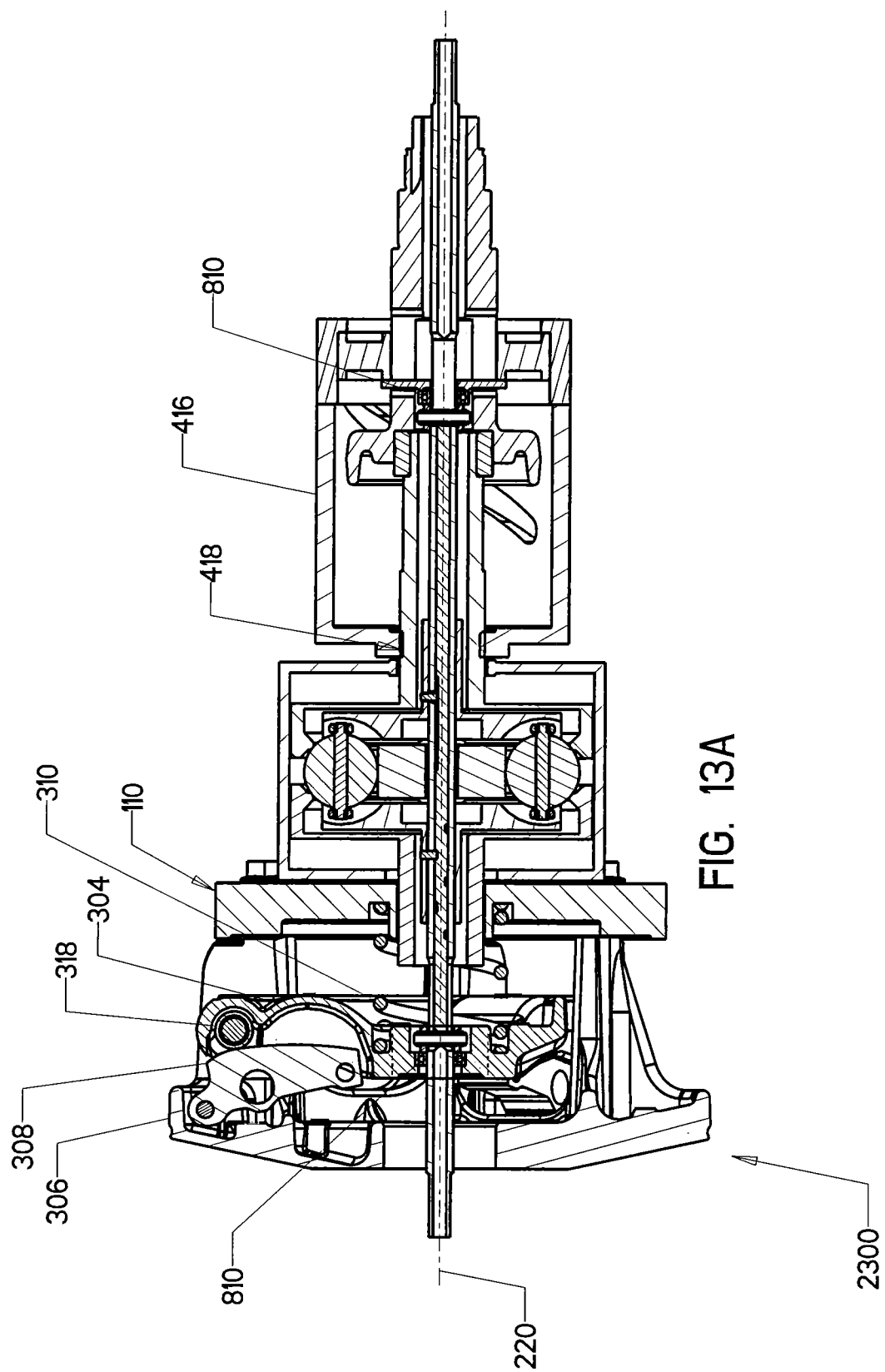
FIG. 13A is a cross-sectional side view of a input speed feedback control assembly of the CVT of FIG. 11.
Figure 13B:
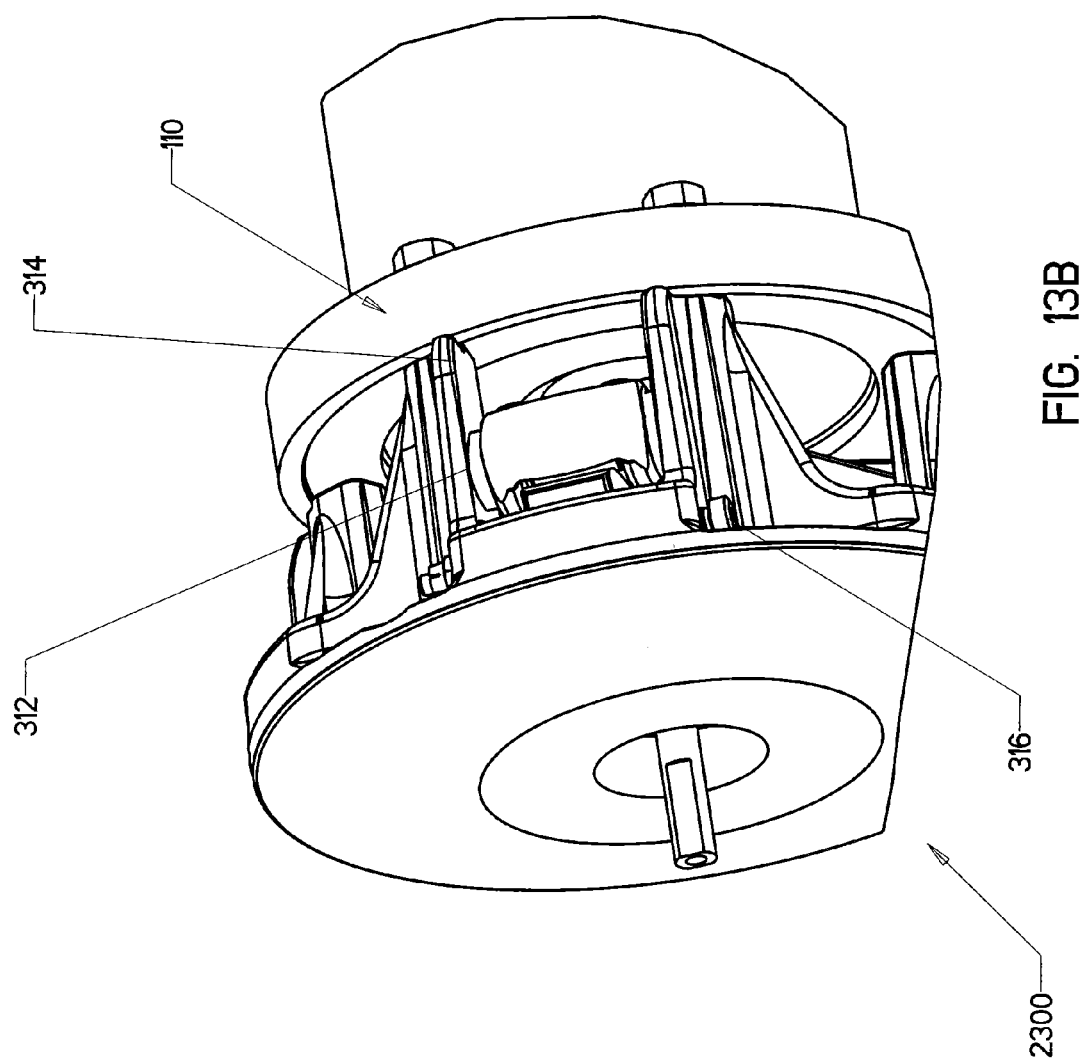
FIG. 13B is a perspective view of a portion of the input speed feedback control assembly of FIG. 13A.
Figure 13C:
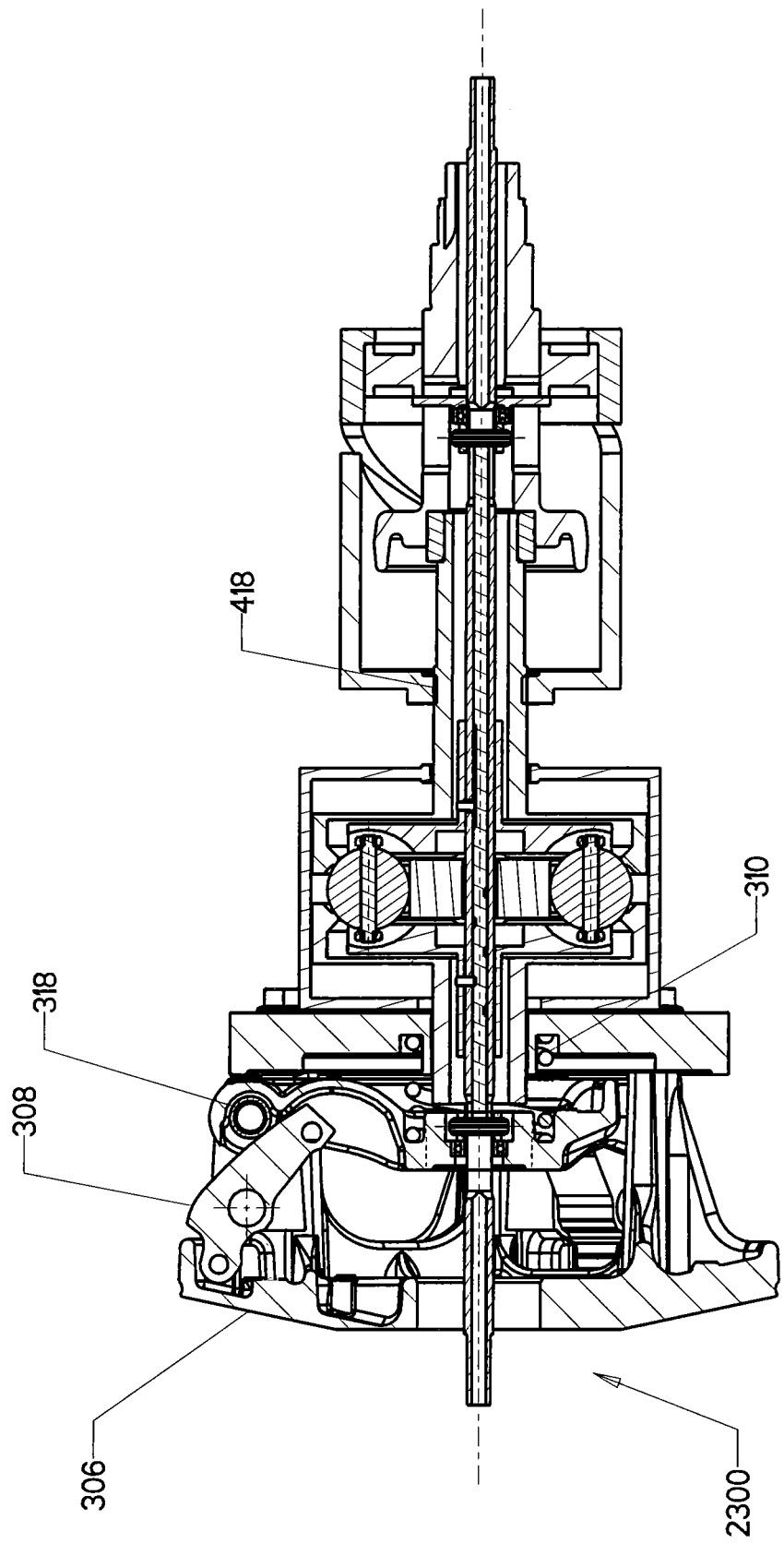
FIG. 13C is a side view of a portion of the input speed feedback control assembly of FIG. 13A.
Figure 14A:
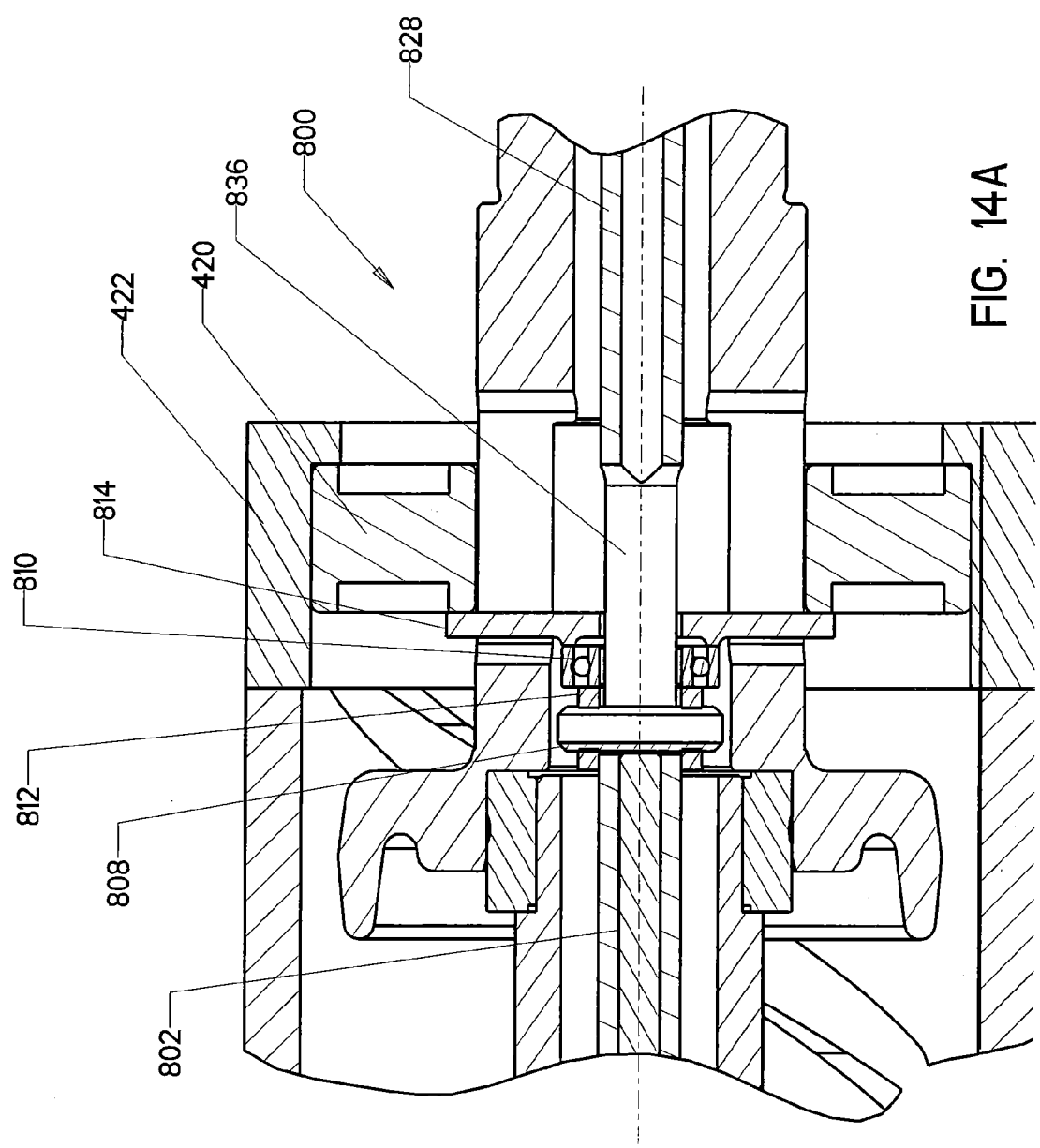
FIG. 14A is a cross-sectional side view of a portion of the input speed feedback control assembly of FIG. 13A.
Figure 14B:
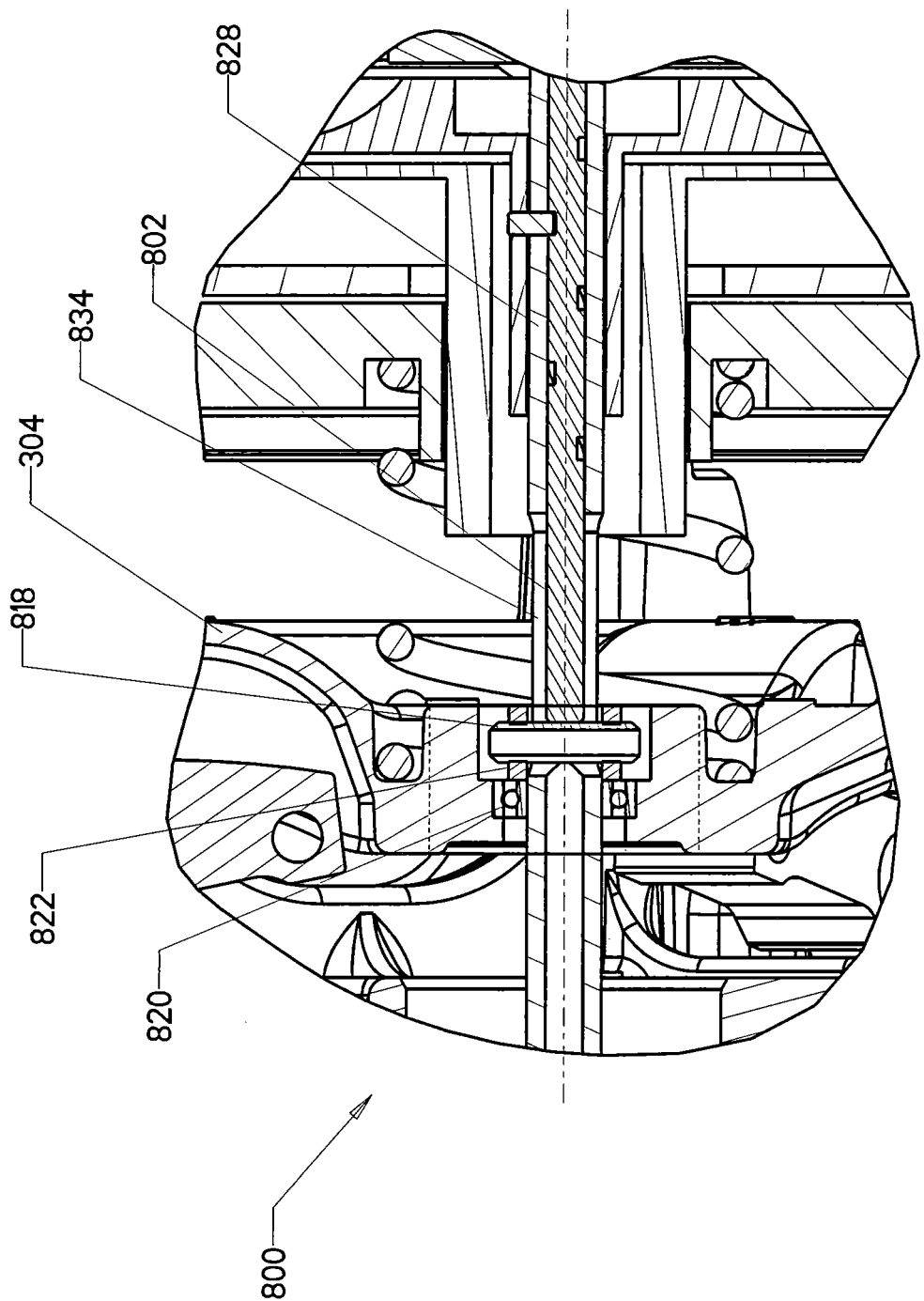
FIG. 14B is a cross-sectional side view of a portion of the input speed feedback control assembly of FIG. 13A.

A mechanism that controls the rotation between the first and second stators 208 and 210 is described below. Referring to the input speed feedback control assemblies 300, 1300, 2300 illustrated in FIGS. 3A, 8A, and 13A, respectively, input member 110 is an input to assemblies 300, 1300, 2300, respectively. Input member 110 may be a shaft, gear, pulley or the like. Member 110 can be operatively connected directly to an engine crankshaft, or be operatively connected to the engine through a starter clutch, torque convertor, torque dampener, gear set and the like. Member 110 delivers rotational motion to the input speed feedback control assemblies 300, 1300, 2300. Spider 304 is operatively attached to input member 110 in assembly 100 and 1100 while in assembly 2100, spider 304 is slidably movable. Spider 304 includes pucks 312 (illustrated in FIGS. 3B, 8B and 13B) that contact a tower 314 on a member 306. In FIGS. 3B and 8B, member 306 is a slidably movable, while in FIG. 13B member 306 is stationary and operatively connected to input member 110. A shift weight 308 is pivotally attached to the assembly by pin 316. Pin 316 could be any fasteners such as a pin or bolt. As the member 306 spins with spider 304, the shift weight 308 spins about axis 220. The faster the member 306 spins, the more centrifugal force is asserted on the shift weight 308. The shift weight 308 is designed such that its center of gravity is above the pivot point of pin 316, so it imparts a force onto the roller 318, which is operatively connective to spider 304. The mechanics of the shift weight 308 to roller 318 creates an axial force along the X axis. The faster the input speed feedback control assembly portion 300 spins, the more axial force created by the shift weight 308. A plurality of shift weights, arranged about the axis 220, may also be utilized to the same effect. The input speed feedback control assemblies 300, 1300, and 2300 further includes a spring 310. The spring 310 is pre-loaded to a predetermined force. Its purpose is to bias the input speed feedback control assemblies 300, 1300, and 2300 toward a respective input/output planetary ratio assembly 200, 1200, and 2200 ratio extreme. In practice, this is typically a "low ratio" which is shown in FIGS. 3A, 8A and 13A. Additionally, a spring, pre-loaded to a pre-determined force may be placed anywhere in the system with the purpose of biasing a respective input/output planetary ratio assembly 200, 1200, or 2200 towards "low ratio". As the input speed feedback control assemblies 300, 1300, and 2300 spins faster, the shift weight 308 creates more axial force. In embodiments 100, 1100, and 2100, once this axial force gets higher than the spring 310 force, the member 306 starts to move translationally and will shift the respective input/output ratio assembly 200 and 1200 into a higher ratio. In embodiment 2100, once this axial force gets higher than the spring force, the member 304 starts to move translationally and will shift the input/output ratio assembly 2200 of the CVT into a higher ratio. This shifting is further described below. FIGS. 3C, 8C and 13C depict the input speed feedback control assembly 300, 1300 and 2300 in "high ratio," respectively. The input to output torque path for CVT embodiment 100 goes through the input/output ratio assembly 200 and into the torque feedback control assembly 400. The input to output torque path for CVT embodiment 1100 goes through the input/output ratio assembly 1200 and into the torque feedback control assembly 1400. The input to output torque path for CVT embodiment 2100 goes through the input/output ratio assembly 2200 and into the torque feedback control assembly 2400. The input to output torque path for CVT embodiment 3100 goes through the input/output ratio assembly 3200 and into the torque feedback control assembly 3400. Additionally, in CVT embodiments 100 and 2100, drive torque does not go through any part of the input speed feedback control assembly 300 and 2300 while in embodiment 1100, drive torque goes through the input speed feedback control assembly 1300. In CVT embodiment 3100, drive torque does not go through any part of the input speed feedback control assembly 3300. The rotational motion is used to shift the input/output planetary ratio assemblies 200, 1200, 2200, and 3200. In embodiment 100, the axial force created by the input speed feedback control assembly 300 gets transmitted to the torque feedback control assembly 400 through bearing 320. In embodiment 1100, the axial force created by the input speed feedback control assembly 1300 gets transmitted to the torque feedback control assembly 1400 through bearing 320. As illustrated in FIGS. 14A and 14B, in embodiment 2100, the axial force created by the input speed feedback control assembly 2300 gets transmitted to the torque feedback control assembly 400 through shift control assembly 800.

Figure 18A:
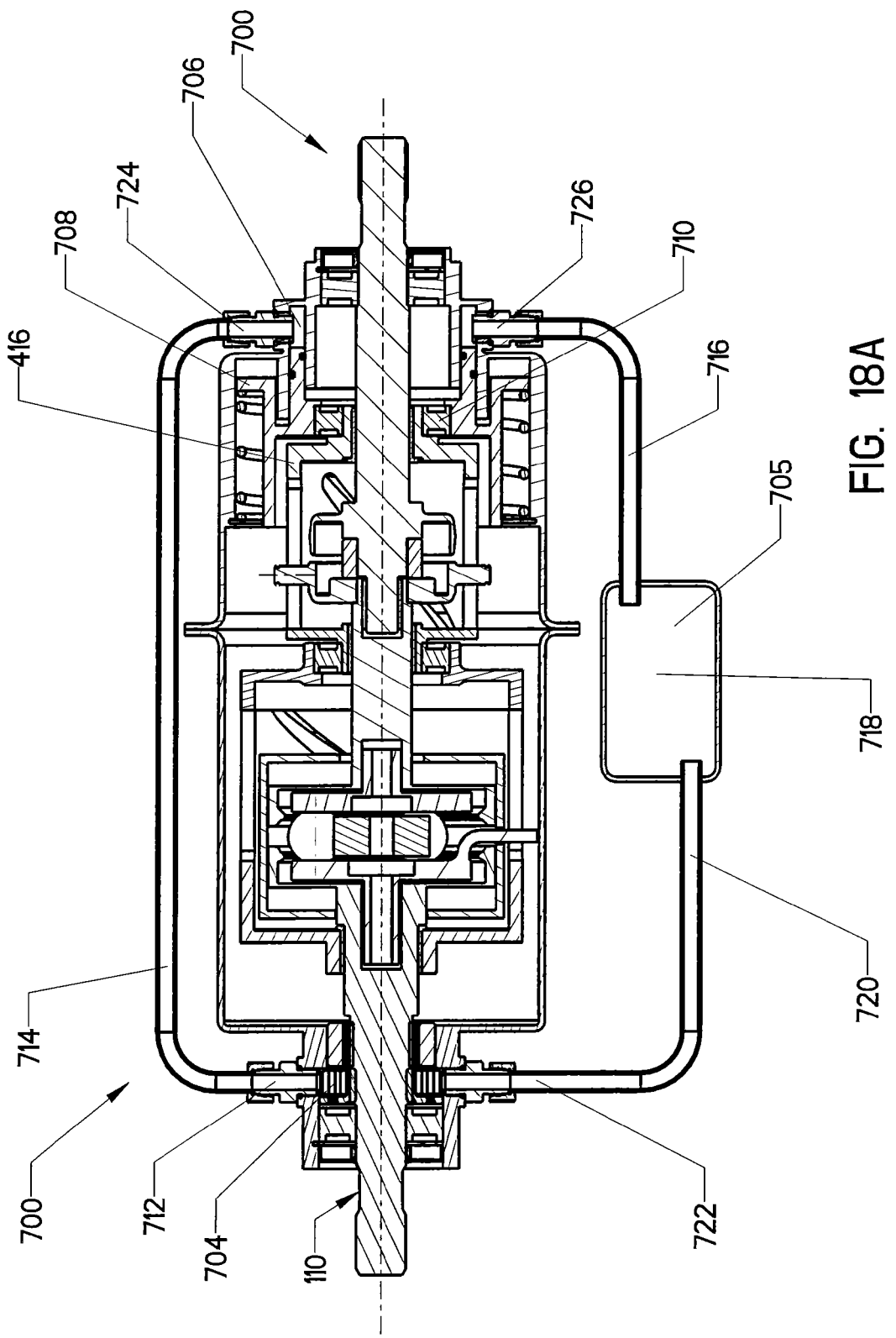
FIG. 18A is a cross-sectional side view of a input speed feedback control assembly of the CVT of FIG. 16.
Figure 18B:
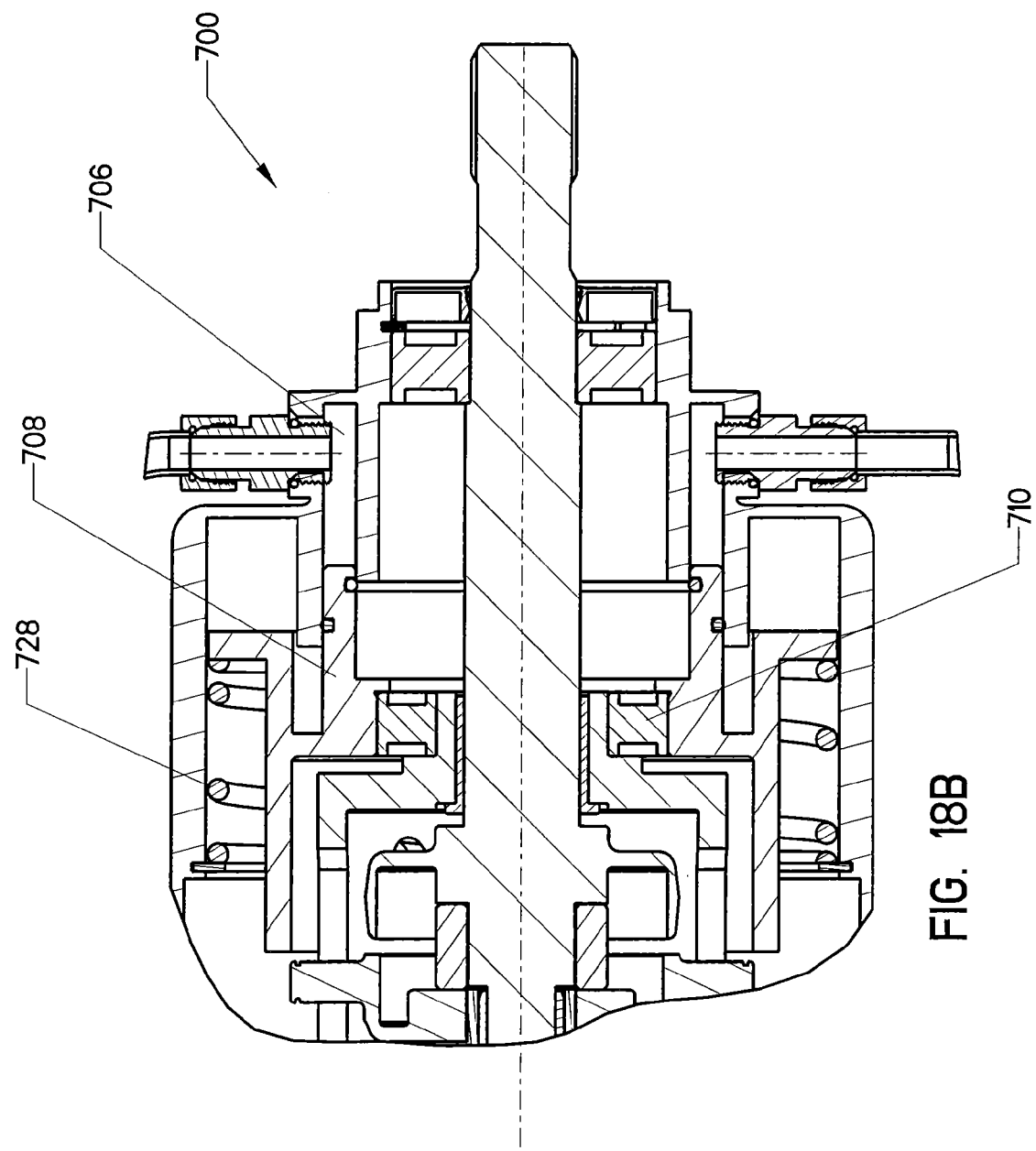
FIG. 18B is a side view of a portion of the input speed feedback control assembly of FIG. 18A

A mechanism that controls the rotation between the first and second stators 208 and 210 is described below. The input feedback speed control assembly of CVT embodiment 3100 is generally designated as 700. Referring to FIG. 18A, input member 110 is an input shaft to assembly 700. Input member 110 can be operatively connected directly to an engine crankshaft, or be operatively connected to the engine through a starter clutch, torque converter, torque dampener, gear set and the like. Member 110 delivers rotational motion to the input speed feedback control assembly 700. Member 110 is operatively connected to a hydraulic pump 704 of the input speed feedback control assembly 700. The input speed feedback control assembly 700 includes a chamber 706 that is in part defined by a piston 708, which may be annular or a set of one or more of cylindrical geometry. The shape is not essential to the operation but merely for packaging or manufacturing considerations. Additionally, the piston or pistons may be operatively connected to bearing 710 directly as shown or through a mechanism such as a pivot fork or other similar mechanical transformer. Hydraulic oil 705 is pumped through passages from the hydraulic pump outlet 712 to the chamber 706 through a passage 714. Hydraulic oil 705 exits the chamber 706 through a passage 716 and is returned to a sump 718, which supplies the hydraulic oil to the hydraulic pump 704 through a passage 720 and inlet 722. The flow of hydraulic oil 705 may be impeded by fixed or variable means before or after the chamber 706, such as at the chamber 706 inlet 724 and chamber 706 outlet 726. As the input of the hydraulic pump 704 of the input speed feedback control assembly 700 rotates, hydraulic fluid flow is generated and supplied to the chamber 706. The faster the input of the hydraulic pump 704 rotates, the greater the hydraulic flow. As the hydraulic flow is impeded by fixed or variable means before or after the chamber 706, hydraulic pressure in the chamber 706 results, and creates an axial force along the X axis against the piston 708. This axial force is a function of input assembly member 110 rotational rate. As the pressure in chamber 706 increases, the piston 708 axial force increases in response. The input speed feedback control assembly 700 further includes a spring 728. The spring 728 is pre-loaded to a predetermined force. Its purpose is to bias the input speed feedback control assembly 700 toward an input/output planetary ratio assembly 3200 ratio extreme. In practice, this is typically a "low ratio" which is shown in FIG. 18A. Additionally, a spring pre-loaded to a pre-determined force may be placed anywhere in the system with the purpose of biasing the input/output planetary ratio assembly 3200 towards a ratio extreme. As the input speed feedback control assembly 700 member 110 spins faster, the hydraulic pressure of chamber 706 exerts more axial force on the piston 708. Once this axial force gets higher than the spring force, the piston 708 starts to move towards the cam 416 of the torque feedback control assembly 3400 and will shift the input/output ratio assembly 3200 of the CVT into a different ratio. FIG. 18B depicts the input speed feedback control assembly 700 in "high ratio". The axial force created by the input speed feedback control assembly 700 gets transmitted to the torque feedback control assembly 3400 through bearing 710. In addition, they hydraulic oil 705 can be a wide variety of oils that are in common use specifically for current commercial hydraulic systems including those formulated primarily for lubrication, traction, and cooling.

In an additional embodiment, shift-weights that travel radially between the spider and the movable member produce a centrifugal radial force as a function of input rotational speed that is transformed into an axial force as a result of the angles of contact between the shift-weights and the spider and movable member. In yet another embodiment a generator output such as a magneto electrically operatively connected to an electromagnetic actuator such as a DC motor or solenoid exerts an axial force in opposing direction to the torque feedback control assembly. In yet another embodiment an electronic proximity sensor such as a hall-effect, reed, variable reluctance can be interfaced with a microprocessor to detect and calculate input shaft rotational rate and deliver an electrical power signal to an electrically controlled actuator. This electrical power signal may be a linear or non-linear function of input shaft rotational rate. The algorithm may also be a function of atmospheric barometric pressure in order to compensate for engine power output changes that occur as a result of altitude changes. An electrically controlled actuator may apply an axial force directly or indirectly to the torque feedback control assembly or may control a valve in a hydraulic circuit that regulates the hydraulic pressure and thus control the axial force. An electrically controlled actuator may apply piston hydraulic pressure that is in communication with a piston that may exert an axial force in opposing direction to the torque feedback control assembly.

Figure 4A:
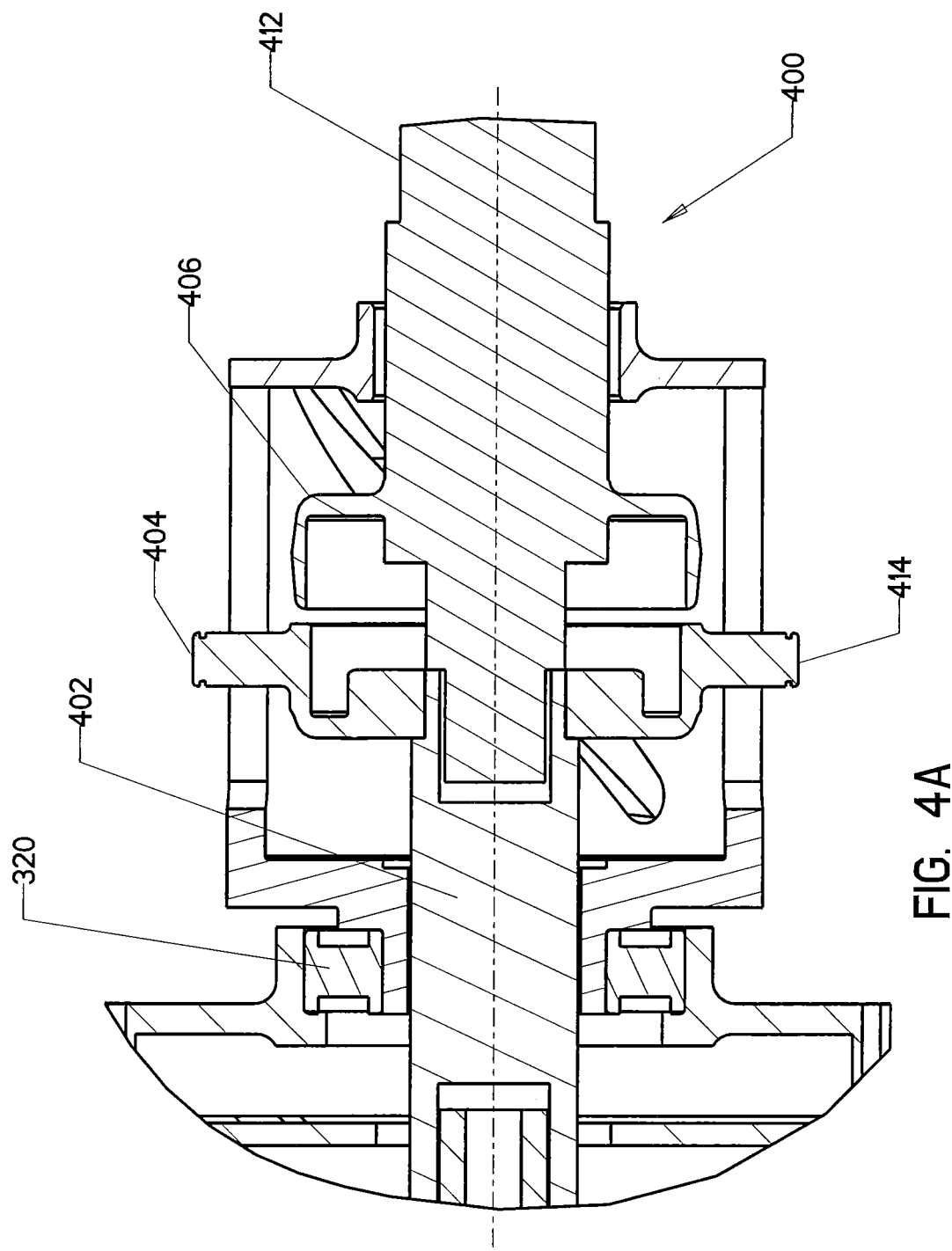
FIG. 4A is a cross-sectional side view of the torque feedback control assembly of the CVT of FIG. 1.
Figure 4B:
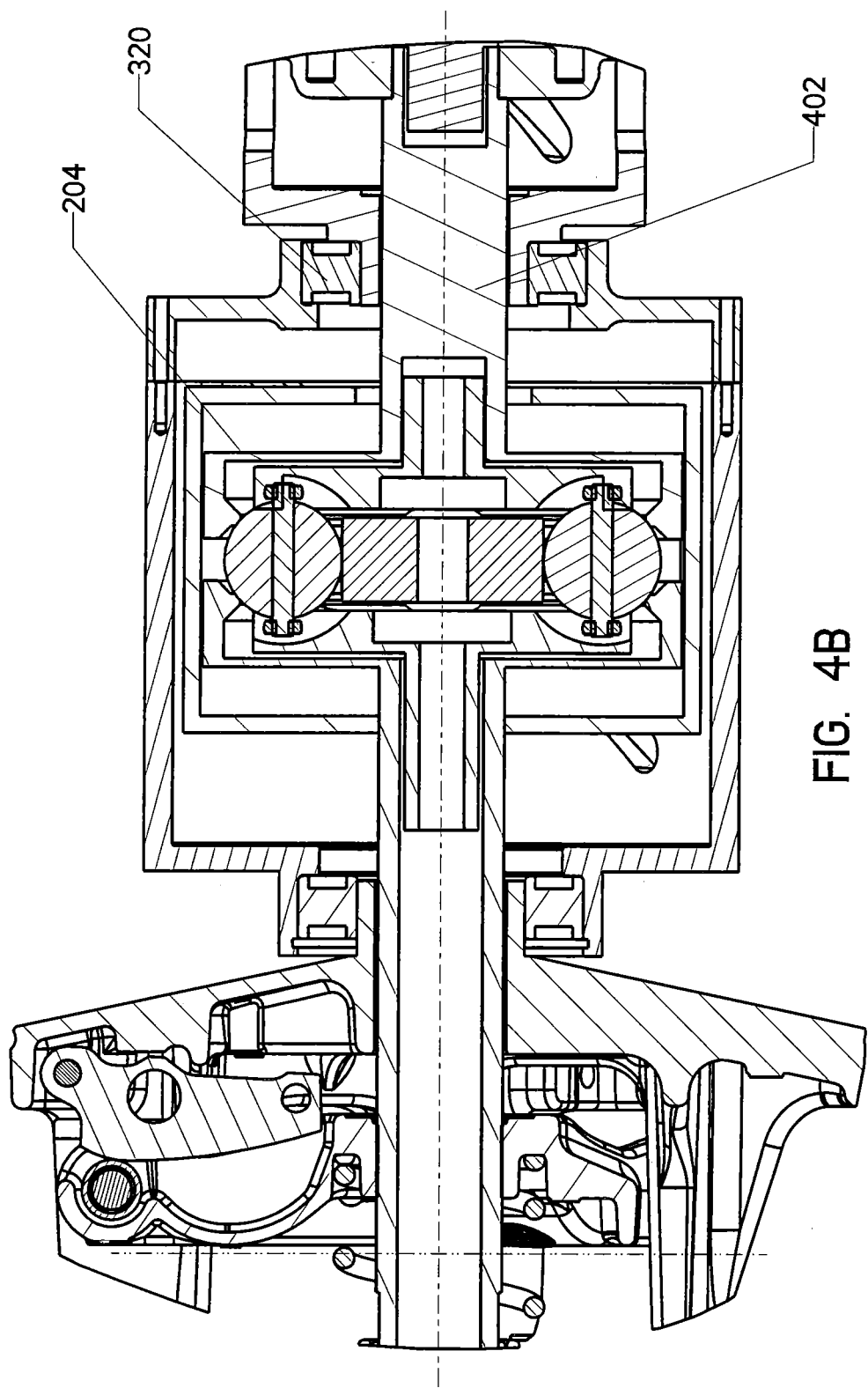
FIG. 4B is a cross-sectional side view of a portion of the torque feedback control assembly of FIG. 4A.
Figure 4C:
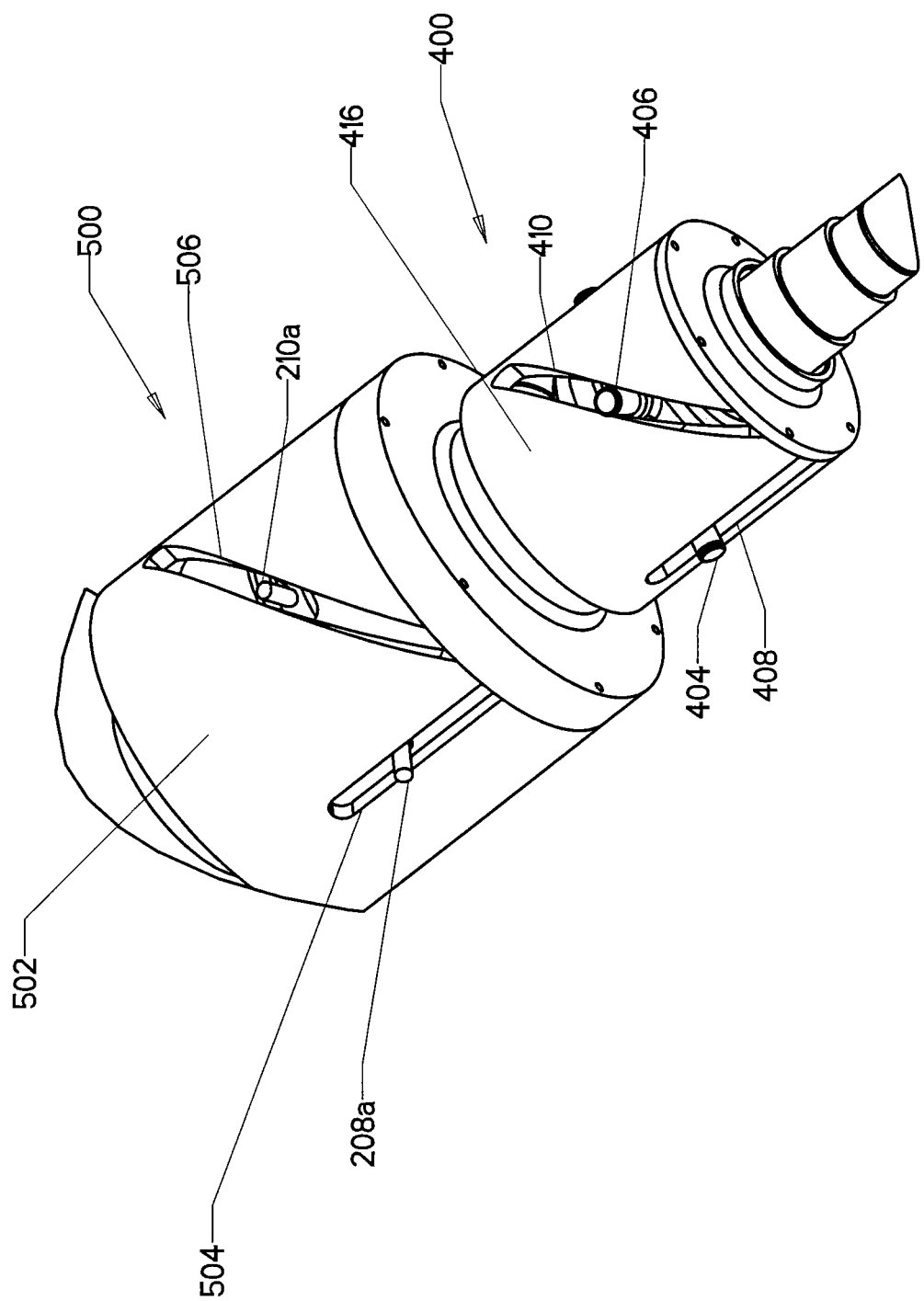
FIG. 4C is a perspective view of the torque feedback control assembly of FIG. 4A and a partial perspective view of the helical shift control assembly of the CVT of FIG. 1.
Figure 5:
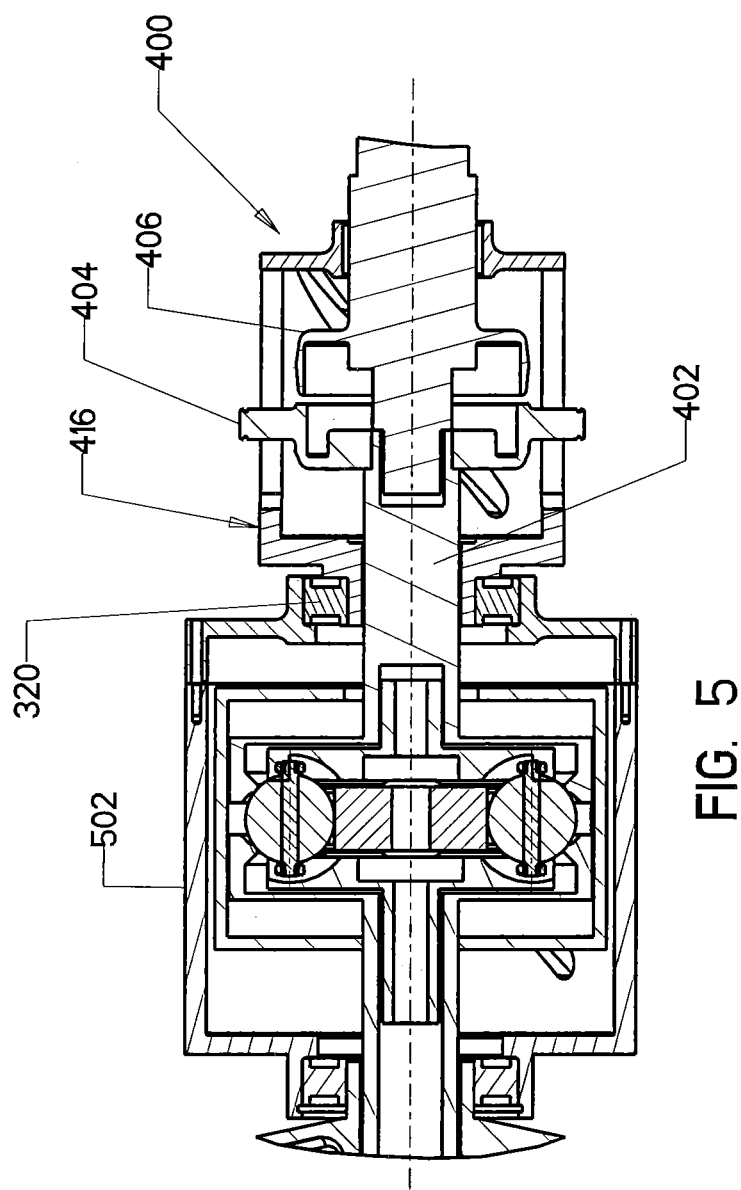
FIG. 5 is a cross-sectional side view of the of helical shift control assembly of the CVT of FIG. 1.
Figure 9A:
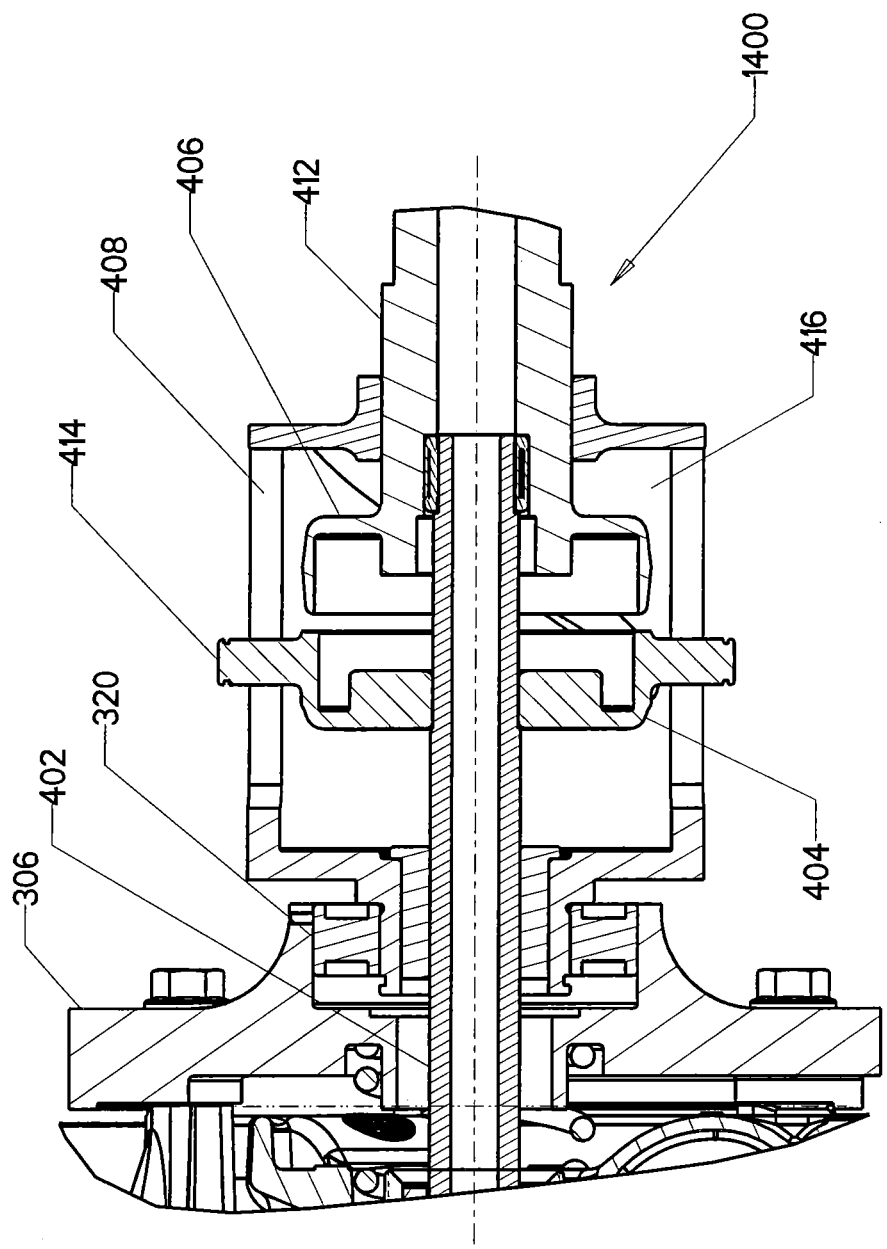
FIG. 9A is a cross-sectional side view of the torque feedback control assembly of the CVT of FIG. 6.
Figure 9B:
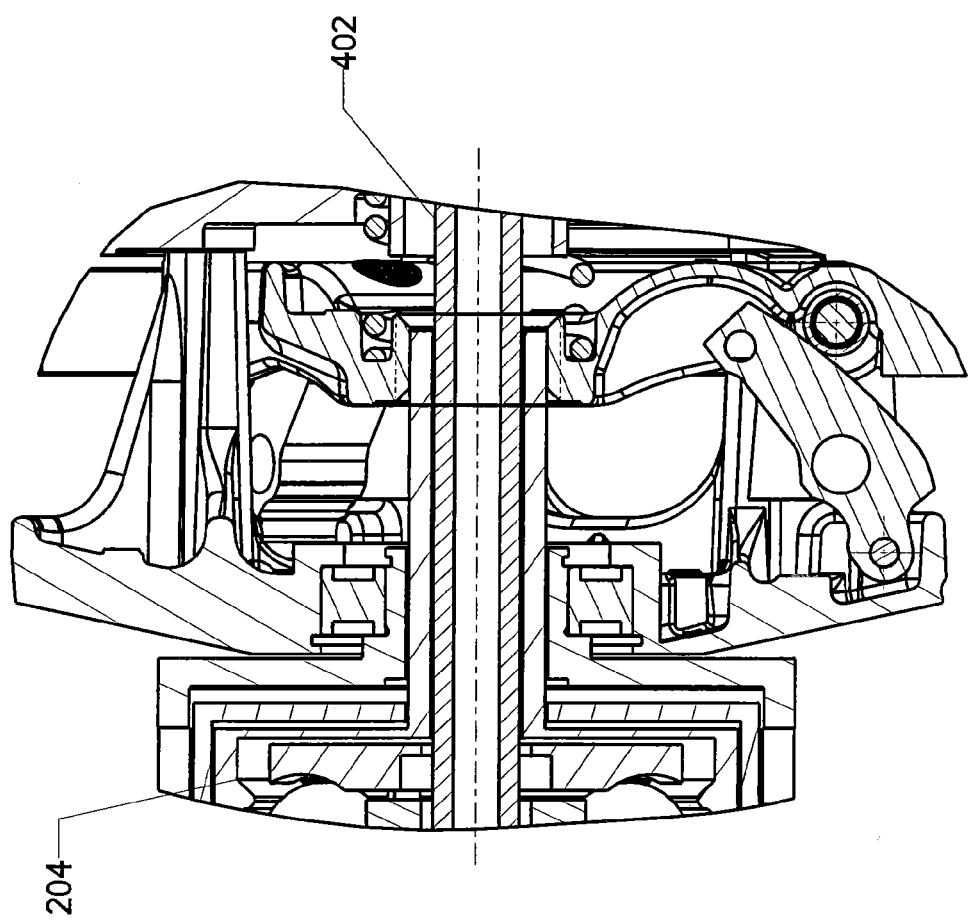
FIG. 9B is a cross-sectional side view of a portion of the torque feedback control assembly of FIG. 9A.
Figure 9C:
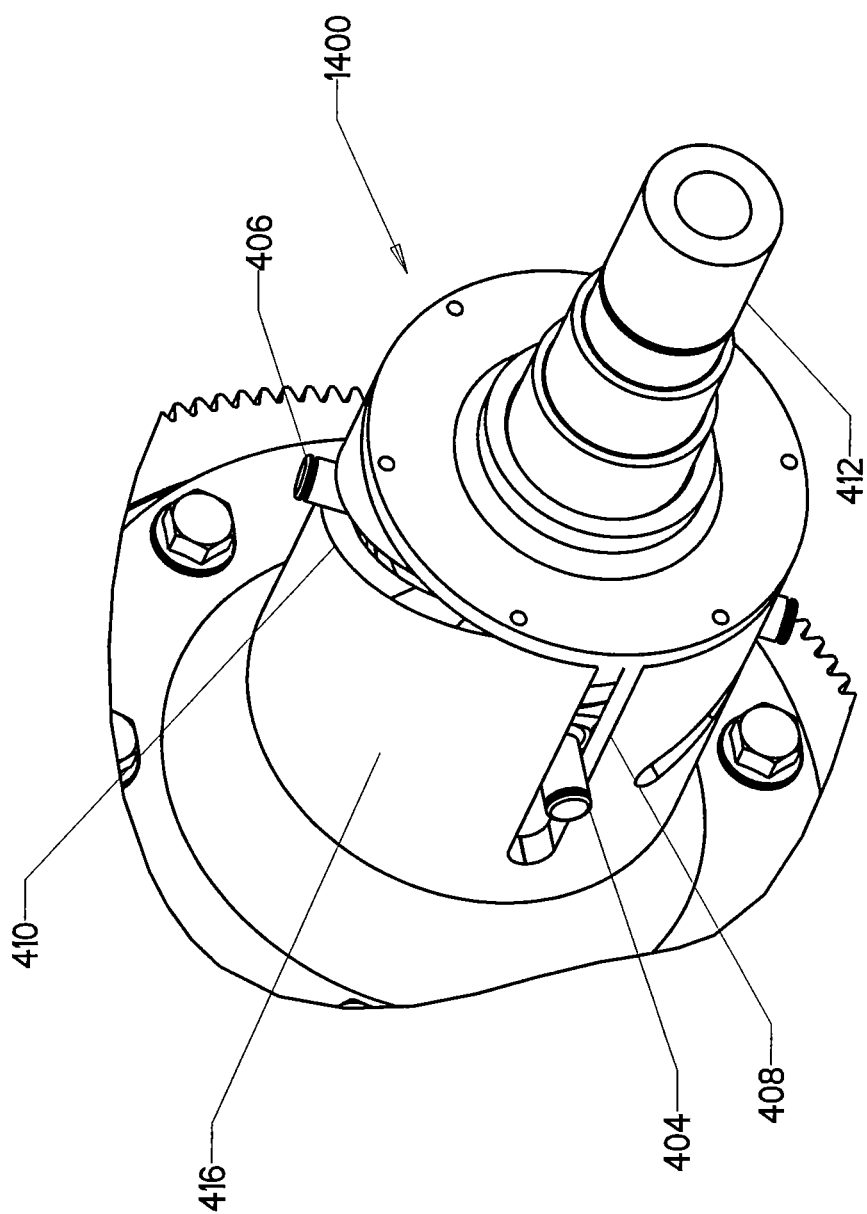
FIG. 9C is a perspective view of the torque feedback control assembly of FIG. 9A.
Figure 19A:
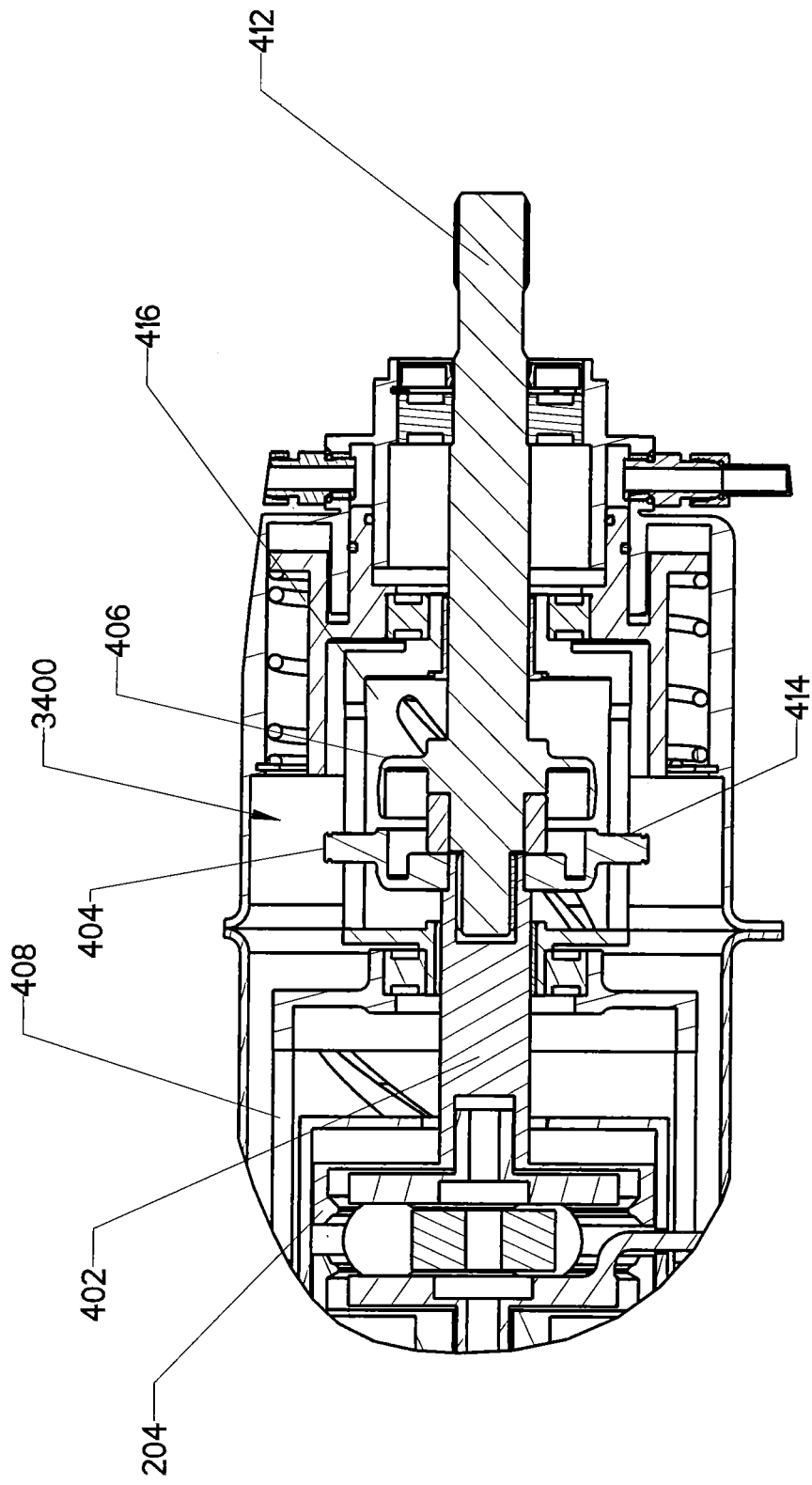
FIG. 19A is a cross-sectional side view of the torque feedback control assembly of the CVT of FIG. 16.
Figure 19B:
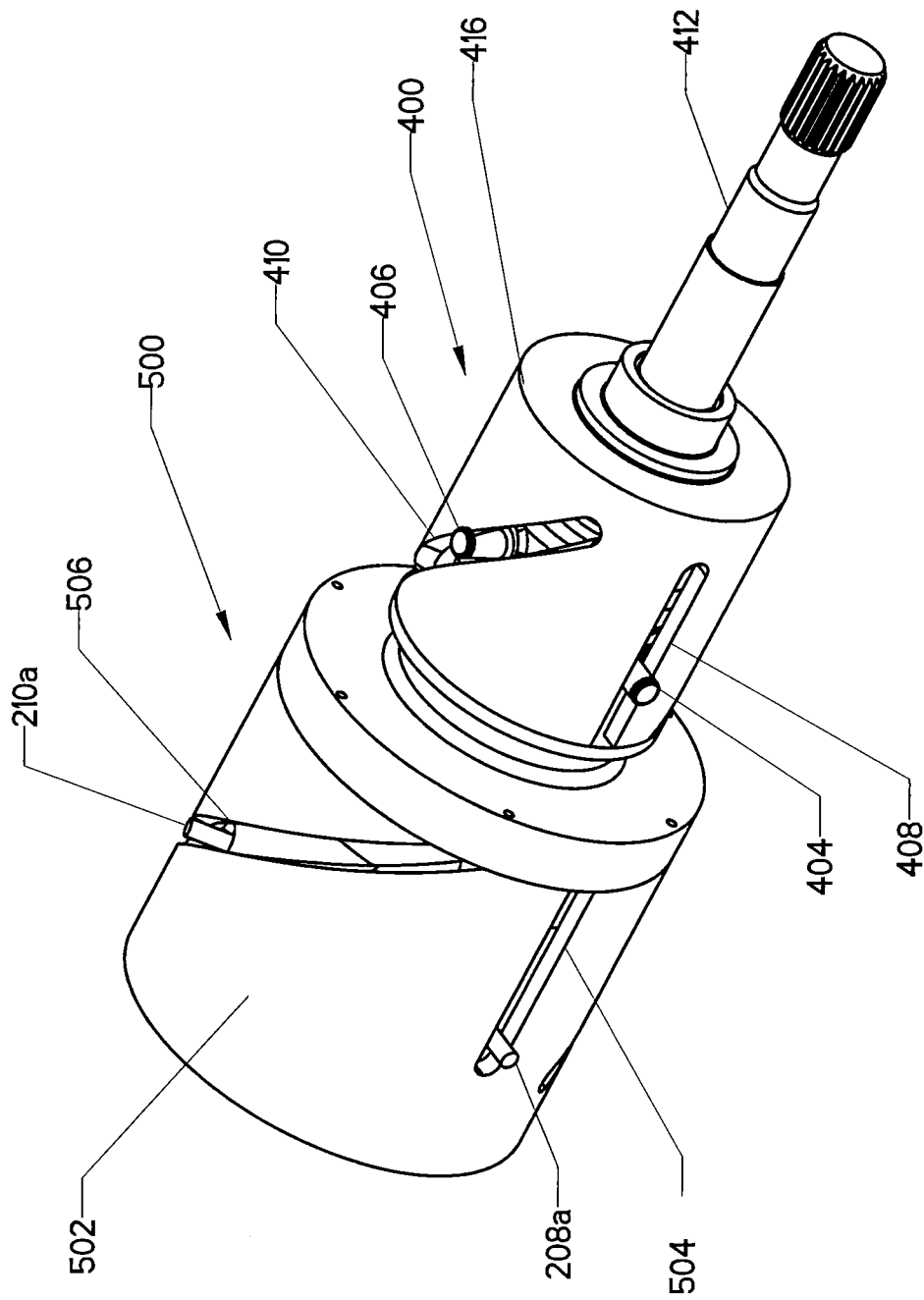
FIG. 19B is a perspective view of the torque feedback control assembly of the CVT of FIG. 16 and a perspective view of the helical shift control assembly of the CVT of FIG. 16.

Shaft 402 is the output shaft from the input/output planetary ratio assemblies 200, 1200, 2200 and 3200. Shaft 402 is operatively connected to a second traction ring 204 as best illustrated in FIGS. 4B, 9B, 15B and 19A. Shaft 402 transmits torque and rotational motion. As illustrated in FIGS. 4A, 9A, 15A and 19A, shaft 402 goes into the torque feedback control assemblies 400, 1400, 2400, and 3400. The purpose of the torque feedback control assemblies 400, 1400, 2400, and 3400 is to transmit torque and using this vehicle torque, create a proportional axial force along the X axis back to the input speed feedback control assembly 300, 1300, 2300 in embodiments 100, 1100 and 2100, respectively, or input speed feedback control assembly 700 in embodiment 3100. The cam's axial location dictates the phase relationship between two cam spiders 404 and 406 which controls the shifting mechanism inside the input/output planetary ratio assemblies 200, 1200, 2200 and 3200. The torque comes into the respective torque feedback control assemblies 400, 1400, 2400, and 3400 from shaft 402. This shaft 402 is operatively connected to the cam 416 through the first spider 404 in CVT embodiments 100, 1100 and 3100. This first spider 404 transmits torque to a straight (or generally straight) cam track 408 (which is really a set of cam tracks 408) as best illustrated in FIGS. 4C, 9C, and 19B. The torque and rotational motion are then in the cam 416 of the torque feedback control assembly 400, 1400, and 3400. In embodiment 2100, shaft 402 is connected to the cam 416 through the splined track interface 418. The torque and rotational motion are then in the cam 416 of the torque feedback control assembly 2400. This torque and rotational motion then go to helix cam track 410 (which is really a set of cam tracks 410) and to a second spider 406. Because the set of cams track 408 and the splined track interface 418 is straight in the cam 416, there is little to no axial force. Because of the helical nature of the set of cam tracks 410 in the cam 416, an axial force is created in the contact area with the second spider 406. Rollers could be put on the spider pins 414 to reduce friction. This axial force opposes the force created by the input speed feedback control assemblies 300, 1300, 2300, or 700. Therefore the lower the torque load from the vehicle, the lower the axial force created by the torque feedback control assembly 400, 1400, 2400, or 3400 and the higher the torque load from the vehicle, the higher the axial force created by the torque feedback control assemblies 400, 1400, 2400, or 3400. The torque and rotational motion then goes from the second spider 406 into the CVT output shaft 412. Output shaft 412 is operatively connected to the load, such as the tires of a vehicle. The first and second spider functions are interchanged in another embodiment. Moreover, other ways of accomplishing the functions of the cam and spider functions are contemplated such as having a cut track in a shaft with a cam follower connected to the cam. The torque and rotational motion are operatively connected to the load, such as the tires of a vehicle. Forces between input speed feedback control assemblies 300, 1300, 2300, or 700 and respective torque feedback control assemblies 400, 1400, 2400 and 3400, balance at a unique axial location for any given combination of input speed and output torque. If there is relatively high engine speed, the input speed feedback control assemblies 300, 1300, 2300, or 700 input spins at a relatively high rotational motion creating relatively high axial force. If there is low vehicle torque, the respective torque feedback control assembly 400, 1400, 2400, and 3400 has relatively low axial force and the mechanism shifts into a higher ratio meaning the vehicle will go relatively faster.

Figure 10:
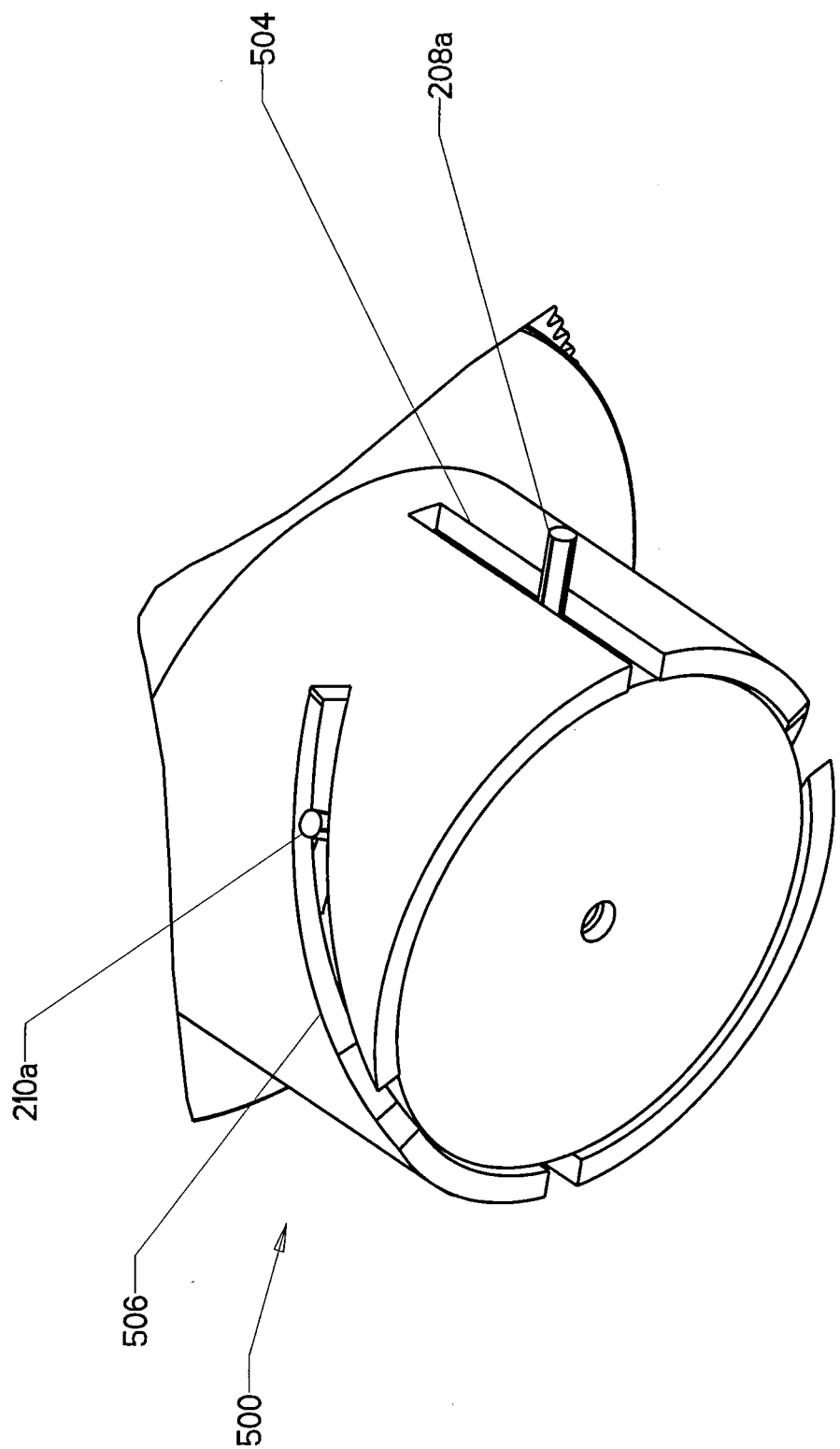
FIG. 10 is a perspective view of the of helical shift control assembly of the CVT of FIG. 6.

Discussing embodiments 100, 1100, and 3100, if you have relatively high engine speed, you have relatively high input speed feedback control assembly 300, 1300 and 700 rotational motion and hence relatively high axial force. For a given input RPM, if the load increases (i.e. more torque is transmitted through the respective torque feedback control assembly 400, 1400 or 3400) a larger torque feedback axial force will be created, opposing the respective input speed feedback control assembly 300, 1300 or 700, the torque feedback control assembly 400, 1400 or 3400, respectively, moves until forces balance. This change in axial location of the respective torque feedback control assembly 400, 1400, 2400 or 3400 results in an axial location change in the helical shift control assembly 500 which in turn results in a relative rotational phase change between stators 208 and 210 that results in a change in CVT ratio as subsequently discussed below in detail. The helical shift control assembly 500 is further illustrated in FIGS. 4C, 10, and 19B. The helical shift control assembly 500 includes a straight track and helical track system (or first track and second track system) that includes tracks 504 and 506 in the helical cam 502 that create a relative phase change in the stators 208 and 210 of the respective input/output planetary ratio assemblies 200, 1200 and 3200 in response to a change in axial position of the helical shift control assembly 500. Additionally the two tracks 504 and 506 may both be helical with different angles where the difference in the angles will provide the phase change between relative phase change in the stators 208 and 210. Hence, in embodiments, the two tracks 504 and 506 are in a non-parallel configuration in relation to each other. First stator 208 is operatively grounded. With the arm 208a of the first stator 208 connected to helical cam 502 through straight track 504, helical cam 502 cannot rotate. Thus as the helical cam 502 of the helical shift control assembly 500 changes axial position, the arm 210a of the second stator 210, slideably connected to the helical track 506 of helical cam 502, rotates in response. Thus a change in axial position of the helical shift control assembly 500 results in a relative phase change between stators 208 and 210 and thus a change in ratio of the input/output planetary ratio assemblies 200, 1200 and 3200 and thus a ratio change of CVTs 100, 1100 and 3100. The forces from the input speed feedback control assemblies 300, 1300 or 700 and torque feedback control assemblies 400, 1400 and 3400 can be reversed so that the respective input speed feedback control assembly 300, 1300 or 700 pulls against the respective torque feedback control assembly 400, 1400 or 3400 and the respective torque feedback control assembly 400, 1400 or 3400 pulls back against the respective input speed feedback control assembly 300, 1300 or 700.

Figure 14C:
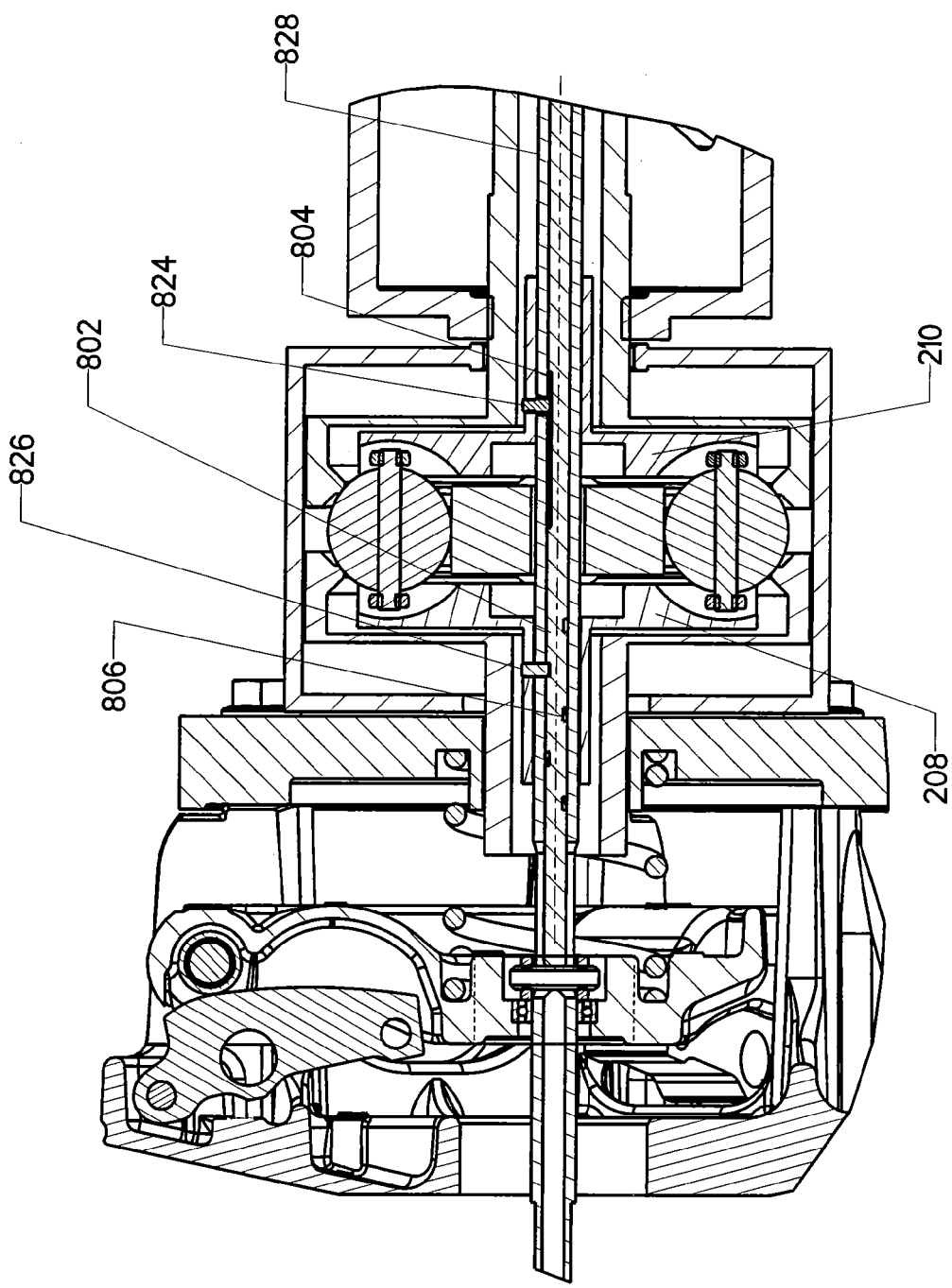
FIG. 14C is a cross-sectional side view of a portion of the helical shift control assembly of the CVT of FIG. 11.
Figure 14D:
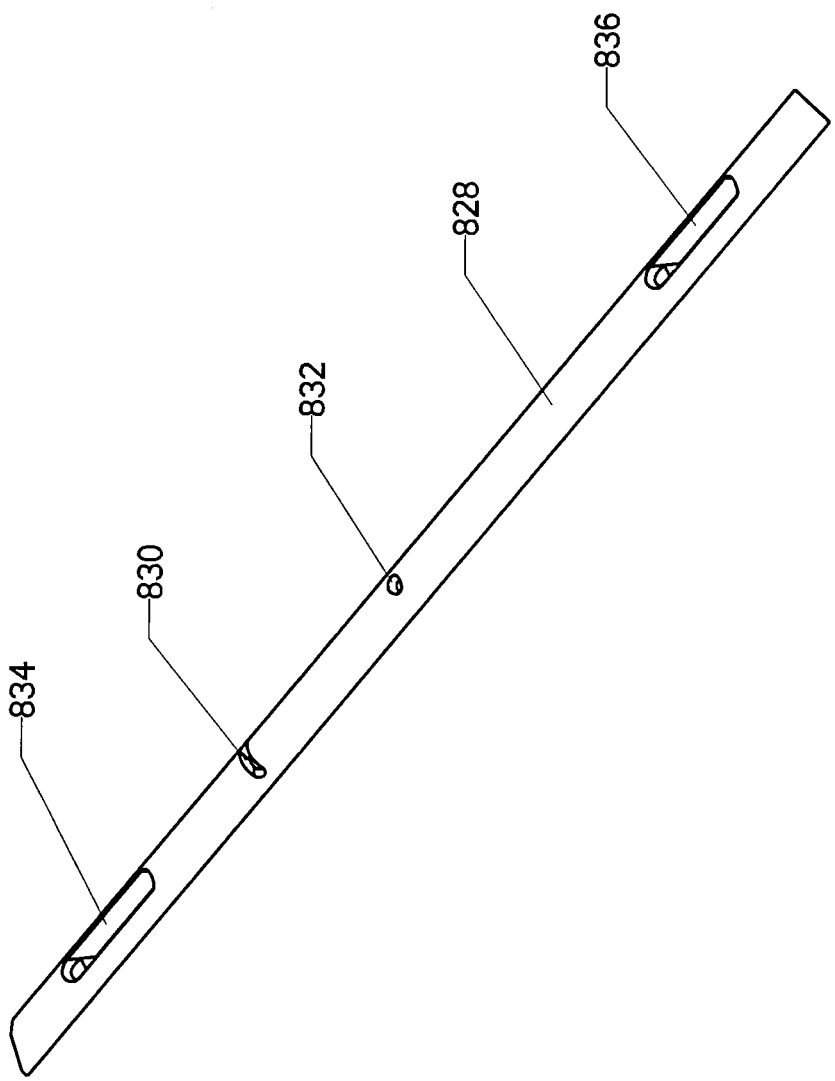
FIG. 14D is a partial perspective view of a portion of the helical shift control assembly of the CVT of FIG. 11.
Figure 15A:
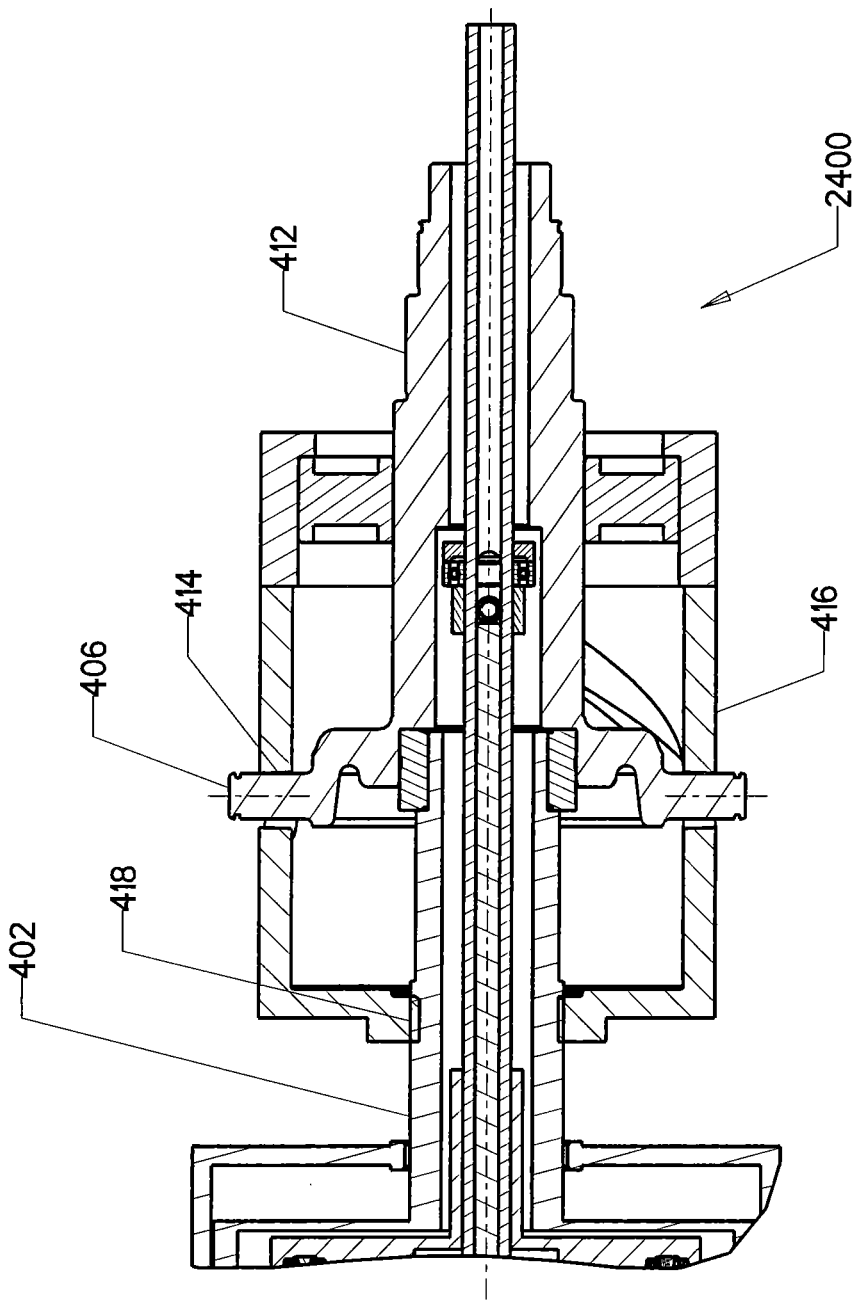
FIG. 15A is a cross-sectional side view of the torque feedback control assembly of the CVT of FIG. 11.
Figure 15B:
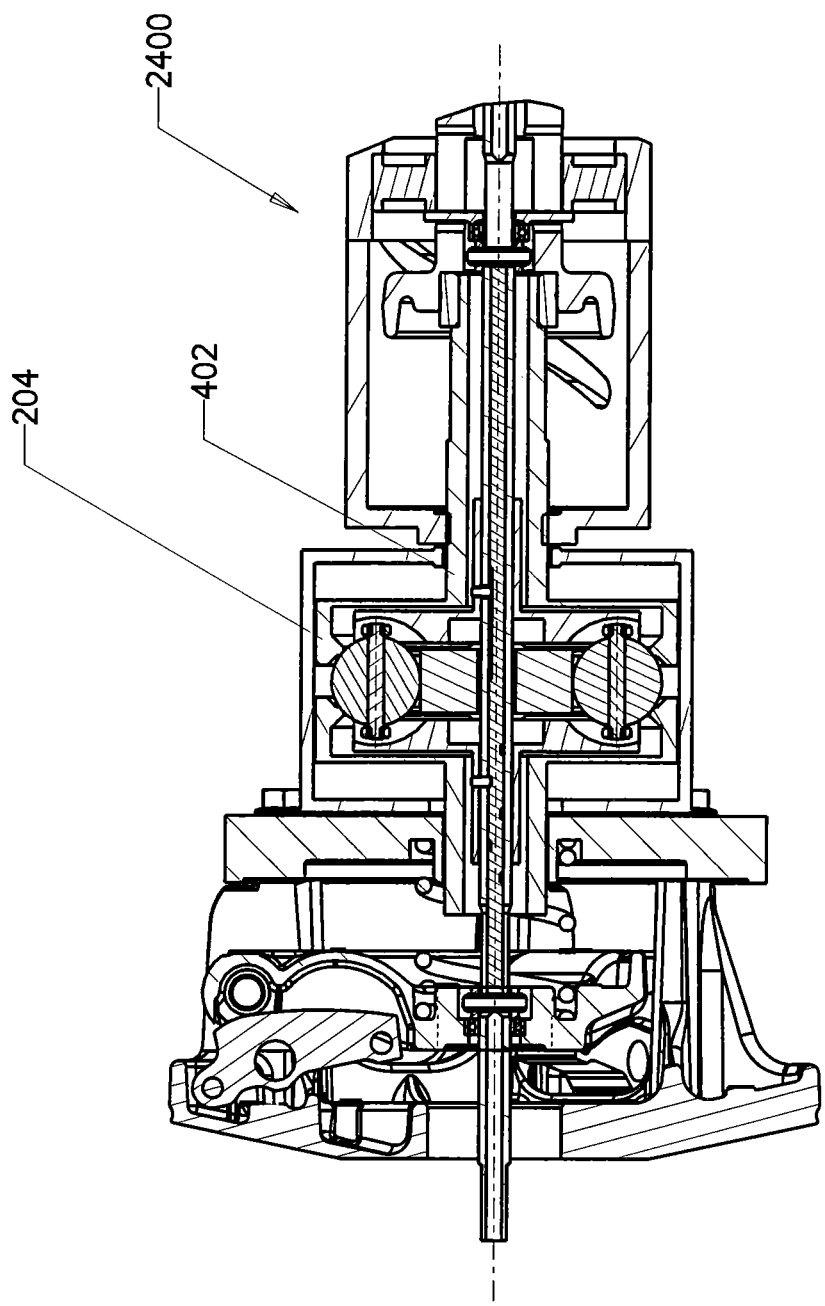
FIG. 15B is a cross-sectional side view of a portion of the torque feedback control assembly of FIG. 15A.
Figure 15C:
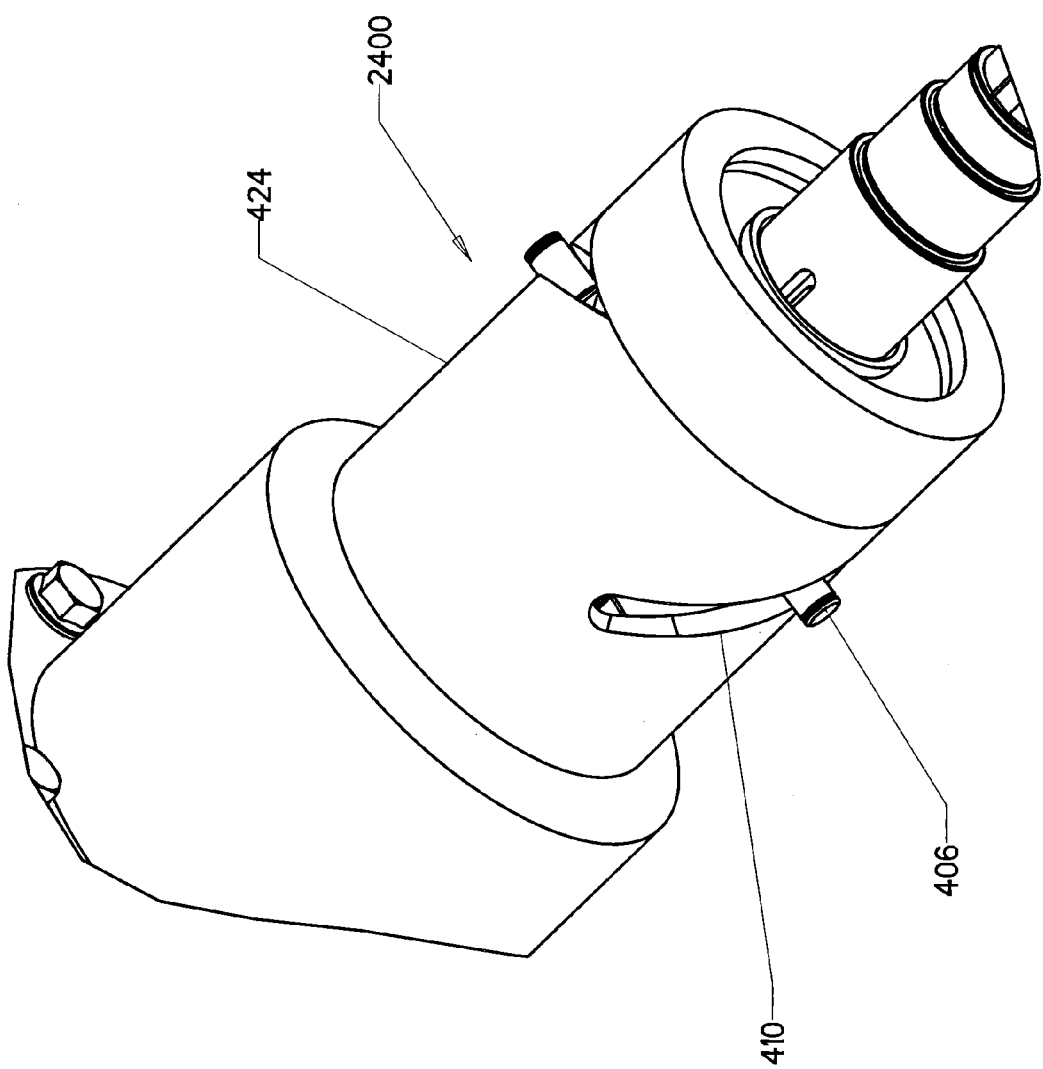
FIG. 15C is a perspective view of the torque feedback control assembly of FIG. 15A.

Discussing embodiment 2100, if you have relatively high engine speed, you have relatively high input speed feedback control assembly 2300 axial force. For a given input RPM, if the load increases (i.e. more torque is transmitted through the torque feedback control assembly 2400) a larger axial force will be created, opposing the input speed feedback control assembly 2300, the torque feedback control assembly 2400 moves until forces balance. This change in axial location of the torque feedback control assembly 400 results in an axial location change in the helical shift control assembly 800 which in turn results in a relative rotational phase change between stators 208 and 210 that results in a change in CVT ratio as subsequently discussed below. The shift control assembly 800 illustrated in FIG. 14A shows the connection between the torque feedback control assembly 2400 and the shift control assembly 800. CVT output shaft 412 is radially but not axially connected to plate 814. The axial force and axial translation from torque feedback control assembly 2400 transfers from cap 422 through bearing 420 and into plate 814. Plate 814 pushes against bearing 810 which pushes against collar 812. Collar 812 is connected to the shift rod 802 by pin 808. Slot 836 provides a slideable connection between pin 808 and support tube 828. FIG. 14B shows the connection between the input speed feedback control assembly 2300 and the shift control assembly 800. Spider 304 pushes against bearing 320 which in turn pushes against collar 822. Collar 822 has a pin 818 that goes through the pin and pushes against shift rod 802. Slot 834 provides a slideable connection between pin 818 and support tube 828. The axial force and axial translation from spider 304 gets transmitted through these parts into shift rod 802. In another embodiment, the order of these parts can be reversed. Additionally a hole could be in shift rod 802 for pin 818 to connect through. The helical shift control assembly 800 is further illustrated in FIG. 14C. This embodiment includes a straight track and helical track system (or first track and second track system) that includes track 804 and track 806 in shift rod 802. Track 804 is a straight or relatively straight slot in shift rod 802. Track 806 is a helical track in shift rod 802. Tracks 804 and 806 of the helical shift control assembly 800 create a relative phase change in the stators 208 and 210 of the input/output planetary ratio assembly 2200 in response to a change in axial position of the helical shift control assembly 800. Additionally the two tracks 804 and 806 may both be helical with different angles where the difference in the angles will provide the phase change between relative phase change in the stators 208 and 210. Second stator 210 is operatively grounded to prevent rotation and is also connected to track 804 in shift rod 802 via pin 824. The first stator 208 is rotationally connected to the helical track 806 of helical rod 802 via pin 826. Thus as the shift rod 802 of the helical shift control assembly 800 changes axial position, stator 210 does not rotate and stator 208 does rotate in response. Support tube 828 is operatively locked to ground and operatively connected to stator 210. Support tube 828 has a slot 830 to allow for the relative rotation of stator 208 as well as a hole 832 feature to operatively connect with pin 816 as shown in FIG. 14D. Stator 208 has a rotational degree of freedom about the axis 220 but is not allowed additional degrees of freedom. As the force balance between input speed feedback control assembly 2300 and torque feedback control assembly 2400 occurs, the axial location of shift control assembly 800 changes. With a change in axial position of the helical shift control assembly 800 a relative phase change between stators 208 and 210 occurs and thus a change in ratio of the input/output planetary ratio assembly 2200 and thus a ratio change of the CVT 2100. The forces from the input speed feedback control assembly 2300 and torque feedback control assembly, 2400 can be reversed so the input speed feedback control assembly 2300 pulls against the torque feedback control assembly 2400 and the torque feedback control assembly 2400 pulls back against the input speed feedback control assembly 2300.

The preferred embodiments have been shown and described above. An additional embodiment interchanges the straight 408 and helical 410 tracks. Additionally the two tracks may both be helical with different angles where the difference in the angles will provide the phase change between the two spiders 404 and 406. An additional embodiment interchanges the straight 804 and helical 806 tracks. Additionally the two tracks may both be helical with different angles where the difference in the angles will provide the phase change between the two stators 208 and 210. Moreover, additional embodiments include using splines, screw threads, face cams, ball-ramp cams or tracks cut into the operative shafts along with cam followers, mating splines, mating threads to realize the function of the spiders and straight and helical tracks previously described.

Figure 20:
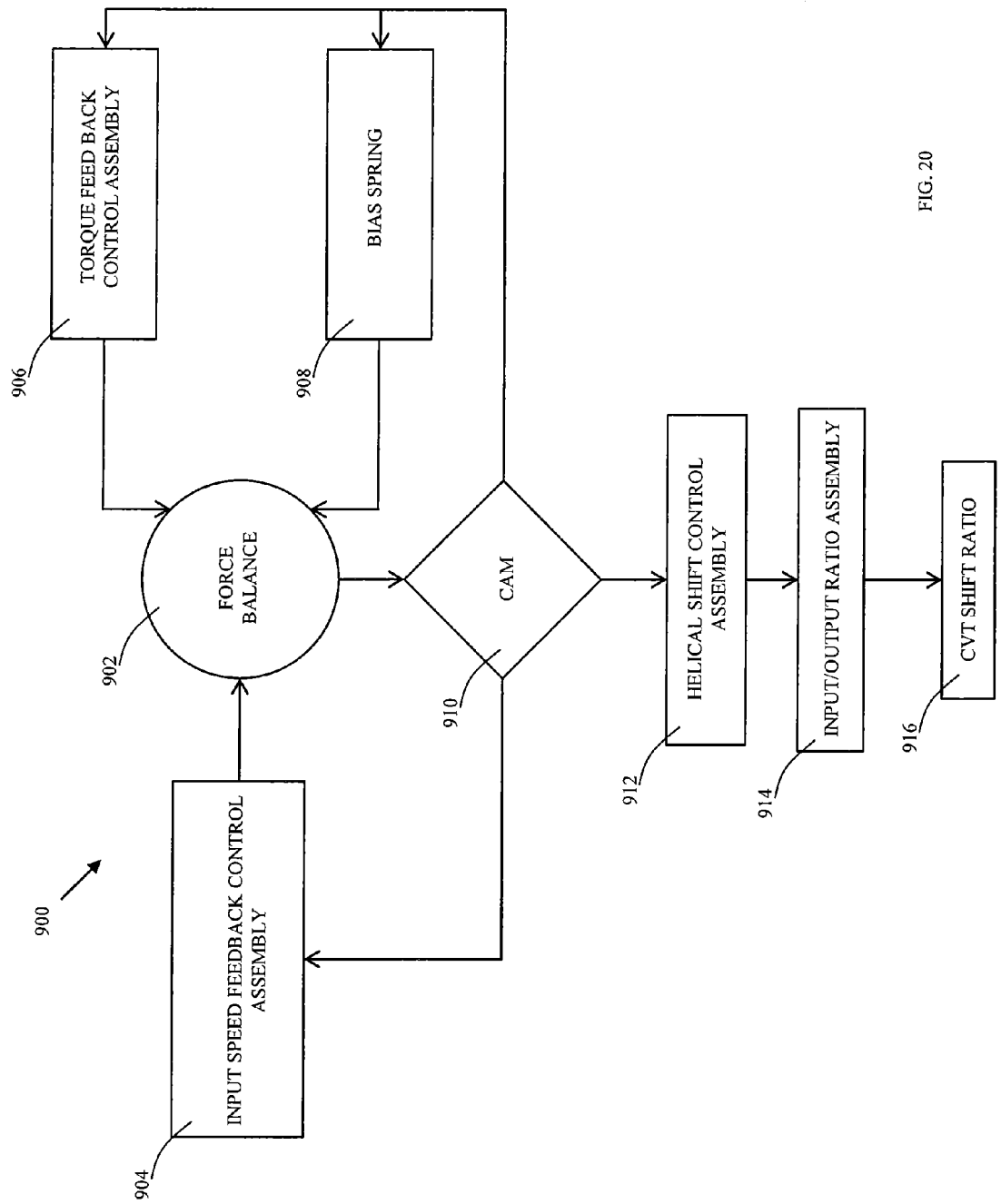
FIG. 20 is a functional block diagram of a CVT embodiment of the present invention.

FIG. 20 is a functional block diagram 900 of the present invention. Input speed feedback control assembly 904 produces a translational force as a linear or non-linear function of input shaft 110 rotational rate and as a constant, linear or non-linear function of translational position. Torque feedback control assembly 906 produces a translational force as a linear or non-linear function of output shaft 120 torque and as a constant, linear or non-linear function of translational position. Bias spring 908 produces a force as a constant, linear, or non-linear function of translational position. Translational force balance 902 outputs a translational position of cam 910 in accordance with the following equation:

Input Speed Feedback Control Assembly Force[Input Assembly 110 Rotational Speed,Translational Position]−Torque Feedback Control Assembly Force[Output Assembly 120 Torque,Translational Position]−Bias Spring Force[Translational Position]=0.

The input speed feedback control assembly 904, the torque feedback control assembly 906, the bias spring 908 and the cam 910 are translationally operatively connected. The translational position of cam 910 dictates the translational position of the helical shift control assembly 912, which outputs a phase relationship of the first and second stators of a input/output planetary ratio assembly 914 that in turn dictates a specific shift ratio of a CVT 916. In summary, as the force balance of the input speed feedback control assembly 300, 1300, 2300, or 700 and torque feedback control assembly 400 balance at a particular axial location, the second stator 210 will correspond and rotate relative to the first stator 208 changing the ratio of the input/output planetary ratio assembly 200, 1200, 2200 or 3200. The first 208 and second 210 stator functions are interchanged in another embodiment. With the change in phase between these two stators, the CVT 100, 1100, 2100 or 3100 change ratio. In embodiments, shifting of the CVT 100, 1100, 2100 or 3100 is accomplished with a input speed feedback control assembly 300, 1300, 2300 or input speed feedback control assembly 700 that uses rotational motion from an engine or other input to create an axial force that force balances with a torque feedback control assembly 400 that is operatively connected to the torque load, such as the tires of a vehicle. This shifting design, has applications to other transmission devices such as Infinitely Variable Transmission (IVT) of similar designs as well as a CVT system where the input and output are both coaxial to the CVT 100, 1100, 2100 and 3100 and on the same side of the CVT 100, 1100, 2100 and 3100. Additionally, it is noted that this system also has applications that utilize a geared planetary system coupled to the input/output planetary ratio assembly 200. Configurations of this nature are well understood by those skilled in the art for expanding the shift dynamic range of a CVT system as well as to devise an IVT system as characterized by having a geared neutral condition.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A continuously variable transmission comprising:
   an input assembly configured to be coupled to receive input rotational motion;
   an output assembly to provide a rotational output, the output assembly configured to be rotationally coupled to a load;
   an input/output planetary ratio assembly configured and arranged to set an input to output speed ratio, the input/output planetary ratio assembly having a first portion that is in rotational communication with the input assembly and a second portion that is in rotational communication with the output assembly; and
   a torque feedback control assembly configured and arranged to provide an axial load force in response to a torque of a load coupled to the output assembly, the torque feedback control assembly coupled to provide torque feedback to the input/output planetary ratio assembly to at least in part control the input to output speed ratio of the input/output planetary ratio assembly.

2. The continuously variable transmission of claim 1, further comprising:
   an input speed feedback control assembly configured and arranged to provide an axial force in response to a rotation from the input assembly;
   a helical shift control assembly configured and arranged to set the input to output speed ratio of the input/output ratio assembly based at least in part on an axial force of the torque feedback control assembly, the helical shift control assembly including a first track and a second track system configured and arranged to control the input/output planetary ratio assembly;
   the input/output planetary ratio assembly including a first stator, a second stator and a plurality of planets movably engaged between the first and second stator, the input output ratio based on a rotation of the second stator and the first stator in relation to each other; and
   the first track and second track system of the helical shift control assembly configured and arranged to control the rotation of the second stator in relation to the first stator of the input/output ratio assembly.

3. The continuously variable transmission of claim 2, wherein the first track and second track system of the helical shift control assembly further comprises:
   a first track and second track, the first and second tracks being in a non-parallel configuration.

4. The continuously variable transmission of claim 2, further comprising:
   the input/output planetary ratio assembly further including,
      the first stator having a first disk portion with a plurality of first tracks, the first stator further having a first arm that extends from the first disk portion;
      the second stator having a second disk portion with a plurality of second tracks, the second stator further having a second arm that extends from the second disk portion;
      an axle extending through an axis of each planet,
      rollers coupled to first and second ends of each axle, the first end of each axle received in one of the first tracks of the first stator and the second end of each axle received in one of the second tracks of the second stator; and
   the helical shift control assembly further including,
      the first track and second track system of the helical shift control assembly including a helical cam having a straight track and a helical track, the helical track being non-parallel to the straight track at a desired angle, the input/output planetary ratio assembly received within the helical cam, the first arm of the first stator received in the first track of the helical cam and the second arm of the second stator received in the second track of the helical cam.

5. The continuously variable transmission of claim 2, further comprising:
   a shift rod including the first track and second track system of the helical shift control assembly, the shift rod coupled to receive an axial force from the torque feedback control assembly;
   a first pin connecting the first stator to one of the first track and the second track of the helical shift control assembly; and
   a second pin connecting the second stator to the other of the first track and the second track of the helical shift control assembly.

6. The continuously variable transmission of claim 5, wherein the second stator is operatively grounded to prevent rotation via the second pin in the first track of the helical shift control assembly and the first stator is rotationally connected to the second track of the helical shift control assembly via the first pin.

7. The continuously variable transmission of claim 1, wherein the input speed feedback control assembly further comprises:
   an input shaft operationally coupled to the input assembly;

an input speed feedback control assembly spider operationally coupled to the input shaft;
a moveable member slideably positioned along an axis of the input assembly; and
a shift weight configured and arranged to assert a force on the input speed feedback control assembly spider such that as the input speed feedback control assembly spins an axial force is generated to axially move the moveable member along the input/output ratio output shaft and apply a force on the torque feedback control assembly.

8. The continuously variable transmission of claim 1, wherein the input speed feedback control assembly further comprises:
a hydraulic pump in rotational communication with the input assembly; and
a piston in fluid communication with the hydraulic pump, the piston further in mechanical communication with the torque feedback control assembly such that a hydraulic pressure over a predetermined hydraulic pressure from the hydraulic pump moves the piston therein effecting the torque feedback control assembly; and
a biasing member asserting a biasing force on the piston to bias the input/output planetary ratio assembly in a low ratio when the hydraulic pressure by the hydraulic pump has not reached the predetermined hydraulic pressure.

9. The continuously variable transmission of claim 1, wherein the torque feedback control assembly further comprises:
an input/output ratio output shaft operationally coupled to input/output ratio assembly;
a cam slidably mounted on the input/output ratio shaft, the cam in operational communication with the movable member of the input speed feedback control assembly, the cam having at least one first set of cam tracks and at least one second set of cam tracks, the at least one first set of cam tracks being in a non-parallel configuration with the at least one second set of cam tracks;
a first cam spider, the first cam spider operationally connected to the input/output ratio output shaft, at least a portion of the first cam spider received in the at least one first set of cam tracks of the cam, the first cam spider transmitting torque to the cam via the at least a portion of the first cam spider in the at least one first set of cam tracks; and
a second cam spider, the second cam spider operationally connected to an output shaft of the output assembly, at least a portion of the second cam spider received in the at least one second set of cam tracks, wherein the second cam spider rotates relative to the first spider which operates in the at least one first set of cam tracks causing a phase change between first and second spiders when a change in axial position of the torque feedback control assembly occurs.

10. The continuously variable transmission of claim 9, wherein the at least one first set of cam tracks and the at least one second set of cam tracks include one of a straight set of tracks and a set of helix tracks.

11. A continuously variable transmission comprising:
an input assembly configured to be coupled to receive input rotational motion;
an output assembly to provide a rotational output, the output assembly configured to be rotationally coupled to a load;
an input/output planetary ratio assembly configured and arranged to set an input to output speed ratio, the input/output planetary ratio assembly having a first portion that is in rotational communication with the input assembly and a second portion that is in rotational communication with the output assembly, the input/output planetary ratio assembly including a first stator, a second stator and a plurality of planets movably engaged between the first and second stator, the input output ratio based on a rotation of the second stator and the first stator in relation to each other;
a torque feedback control assembly configured and arranged to provide an axial load force in response to a torque of a load coupled to the output assembly;
an input speed feedback control assembly configured and arranged to provide an axial force in response to a rotation from the input assembly; and
a helical shift control assembly configured and arranged to set the input to output speed ratio of the input/output planetary ratio assembly based on the balancing of the axial force of the input speed feedback control assembly force with the axial force of the torque feedback control assembly, the helical shift control assembly including a first track and second track system to control the rotation of the second stator in relation to the first stator of the input/output planetary ratio assembly.

12. The continuously variable transmission of claim 11, wherein the helical shift control assembly is configured and arranged to be in mechanical communication with an axial position of the torque feedback control assembly.

13. The continuously variable transmission of claim 11, wherein the input speed feedback control assembly further comprises:
an input shaft operationally coupled to the input assembly;
an input speed feedback control assembly spider operationally coupled to the input shaft;
a moveable member slideably positioned along an axis of the input assembly; and
a shift weight configured and arranged to assert a force on the input speed feedback control assembly spider such that as the input speed feedback control assembly spins an axial force is generated to axially move the moveable member along the input/output ratio output shaft and apply a force on the torque feedback control assembly.

14. The continuously variable transmission of claim 11, wherein the input speed feedback control assembly further comprises:
a hydraulic pump in rotational communication with the input assembly; and
a piston in fluid communication with the hydraulic pump, the piston further in mechanical communication with the torque feedback control assembly such that a hydraulic pressure over a predetermined hydraulic pressure from the hydraulic pump moves the piston therein effecting the torque feedback control assembly.

15. The continuously variable transmission of claim 11, further comprising:
the input/output planetary ratio assembly further including,
the first stator having a first disk portion with a plurality of first tracks, the first stator further having a first arm that extends from the first disk portion,
the second stator having a second disk portion with a plurality of second tracks, the second stator further having a second arm that extends from the second disk portion;
an axle extending through an axis of each planet,
rollers coupled to first and second ends of each axle, the first end of each axle received in one of the first tracks of the first stator and the second end of each axle received in one of the second tracks of the second stator; and the helical shift control assembly further including, the first track and second track system including a helical cam having a straight track and a helical track, the helical track being in a non-parallel configuration in relation to the straight track at a desired angle, the input/output planetary ratio assembly received within the helical cam, the first arm of the first stator received in the first track of the helical cam and the second arm of the second stator received in the second track of the helical cam.

16. The continuously variable transmission of claim 11, further comprising:

a shift rod including the first track and second track system, the shift rod coupled to receive an axial force from the torque feedback control assembly;

a first pin connecting the first stator to one of the first track and the second track of the torque feedback system; and a second pin connecting the second stator to the other of the first track and the second track of the torque feedback system, the second track being in a non-parallel configuration in relation to the first track at a desired angle.

17. The continuously variable transmission of claim 16, wherein the second stator is operatively grounded to prevent rotation via the second pin in the other of the first track and the second track and the first stator is rotationally connected to the one of the first track and the second track via the first pin.

18. A continuously variable transmission comprising:

an input assembly configured to be coupled to receive input rotational motion;

an output assembly to provide a rotational output, the output assembly configured to be rotationally coupled to a load;

an input/output planetary ratio assembly configured and arranged to set an input to output speed ratio, the input/output planetary ratio assembly having a first portion that is in rotational communication with the input assembly and a second portion that is in rotational communication with the output assembly, the input/output planetary ratio assembly including a first stator, a second stator and a plurality of planets movably engaged between the first and second stator, the input output ratio based on a rotation of the second stator and the first stator in relation to each other;

a torque feedback control assembly configured and arranged to provide an axial load force in response to a torque of a load coupled to the output assembly;

an input speed feedback control assembly configured and arranged to provide an axial force in response to a rotation from the input assembly; and a helical shift control assembly in mechanical communication with an axial position of the torque feedback control assembly, the helical control assembly configured and arranged to set the input to output speed ratio of the input/output planetary ratio assembly based on the balancing of the axial force of the input speed feedback control assembly force with the axial force of the torque feedback control assembly, the helical shift control assembly including a straight track and helical track system to control the rotation of the second stator in relation to the first stator of the input/output planetary ratio assembly.

19. The continuously variable transmission of claim 18, wherein the input speed feedback control assembly further comprises:

an input shaft operationally coupled to the input assembly;

an input speed feedback control assembly spider operationally coupled to the input shaft;

a moveable member slideably positioned along an axis of the input assembly; and a shift weight configured and arranged to assert a force on the input speed feedback control assembly spider such that as the input speed feedback control assembly spins an axial force is generated to axially move the moveable member along the input/output ratio output shaft and apply a force on the torque feedback control assembly.

20. The continuously variable transmission of claim 18, wherein the input speed feedback control assembly further comprises:

a hydraulic pump in rotational communication with the input assembly; and a piston in fluid communication with the hydraulic pump, the piston further in mechanical communication with the torque feedback control assembly such that a hydraulic pressure over a predetermined hydraulic pressure from the hydraulic pump moves the piston therein effecting the torque feedback control assembly.

\* \* \* \* \*